(12) United States Patent
McCorkle et al.

(10) Patent No.: US 7,280,607 B2
(45) Date of Patent: Oct. 9, 2007

(54) ULTRA WIDE BANDWIDTH COMMUNICATIONS METHOD AND SYSTEM

(75) Inventors: John W. McCorkle, Vienna, VA (US); Martin Rofheart, Washington, DC (US)

(73) Assignee: Freescale Semiconductor, Inc., Austin, TX (US)

( * ) Notice: Subject to any disclaimer, the term of this patent is extended or adjusted under 35 U.S.C. 154(b) by 634 days.

(21) Appl. No.: 10/305,109

(22) Filed: Nov. 27, 2002

(65) Prior Publication Data

US 2003/0161411 A1    Aug. 28, 2003

Related U.S. Application Data

(63) Continuation-in-part of application No. 09/684,782, filed on Oct. 10, 2000, now Pat. No. 6,859,506, and a continuation-in-part of application No. 09/209,460, filed on Dec. 11, 1998, now Pat. No. 6,700,939.

(60) Provisional application No. 60/217,099, filed on Jul. 10, 2000, provisional application No. 60/207,225, filed on May 26, 2000, provisional application No. 60/069,594, filed on Dec. 12, 1997.

(51) Int. Cl.
*H04L 27/04* (2006.01)
(52) U.S. Cl. .............. 375/295; 375/354; 375/130; 375/140; 375/146; 370/207; 370/324; 342/28; 382/240; 714/776
(58) Field of Classification Search ........... 375/295, 375/130, 131, 140, 146, 147, 149, 200, 210, 375/354; 370/207, 324; 342/28; 382/340; 714/776
See application file for complete search history.

(56) References Cited

U.S. PATENT DOCUMENTS

| | | | | |
|---|---|---|---|---|
| 4,930,140 | A * | 5/1990 | Cripps et al. | 370/342 |
| 5,151,702 | A * | 9/1992 | Urkowitz | 342/134 |
| 5,504,479 | A * | 4/1996 | Doyle et al. | 340/854.9 |
| 5,583,892 | A * | 12/1996 | Drakul et al. | 375/353 |
| 5,677,927 | A * | 10/1997 | Fullerton et al. | 375/130 |
| 5,812,081 | A * | 9/1998 | Fullerton | 342/21 |
| 5,983,388 | A * | 11/1999 | Friedman et al. | 714/776 |
| 6,539,122 | B1 * | 3/2003 | Abousleman | 382/240 |
| 6,690,741 | B1 * | 2/2004 | Larrick et al. | 375/295 |
| 6,700,939 | B1 * | 3/2004 | McCorkle et al. | 375/295 |

\* cited by examiner

*Primary Examiner*—Chieh M. Fan
*Assistant Examiner*—Eva Zheng

(57) ABSTRACT

An ultra wide bandwidth, high speed, spread spectrum communications system uses short wavelets of electromagnetic energy to transmit information through objects such as walls or earth. The communication system uses baseband codes formed from time shifted and inverted wavelets to encode data on a RF signal. Typical wavelet pulse durations are on the order of 100 to 1000 picoseconds with a bandwidth of approximately 8 GHz to 1 GHz, respectively. The combination of short duration wavelets and encoding techniques are used to spread the signal energy over a an ultra wide frequency band such that the energy is not concentrated in any particular narrow band (e.g. VHF: 30-300 MHz or UHF: 300-1000 MHz) and is not detected by conventional narrow band receivers so it does not interfere with those communication systems. The use of pulse codes composed of time shifted and inverted wavelets gives the system according to the present invention has a spatial resolution on the order of 1 foot which is sufficient to minimize the negative effects of multipath interference and permit time domain rake processing.

18 Claims, 46 Drawing Sheets

500ps

RANDOMIZED TIME CODING

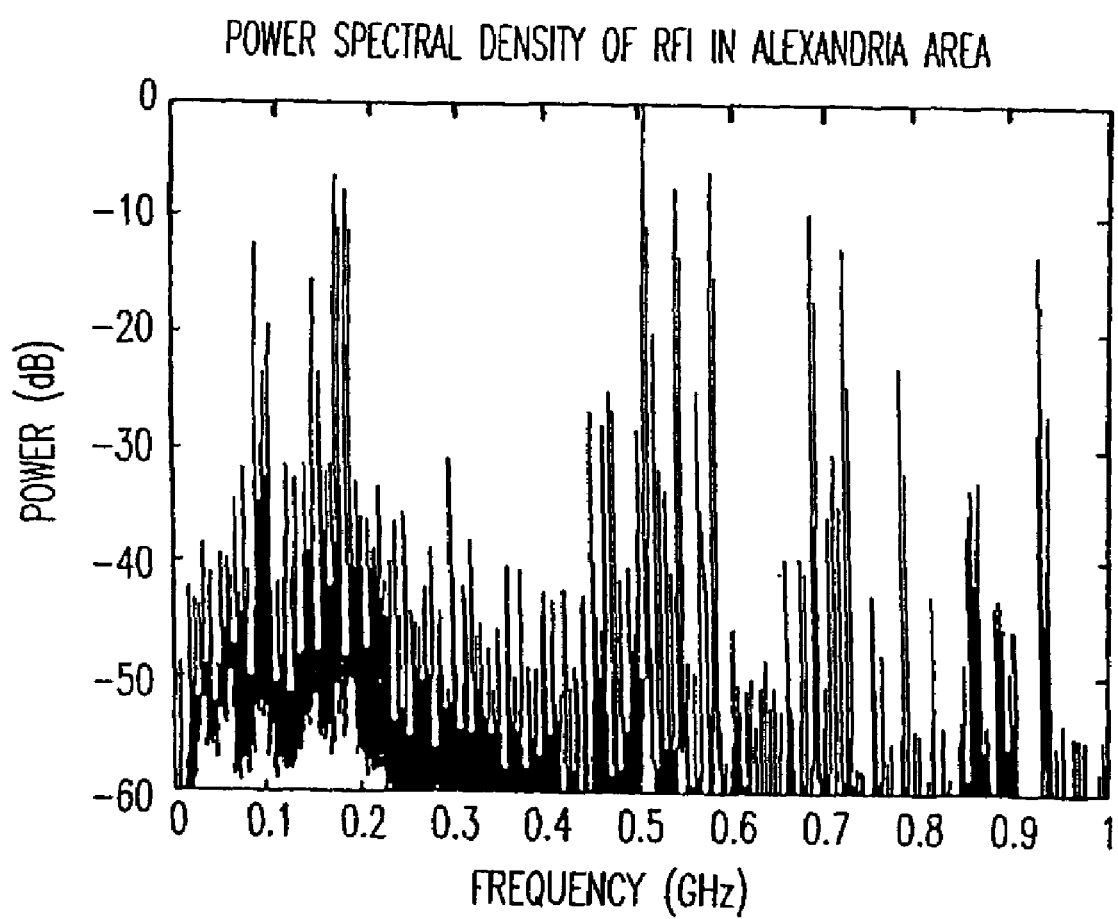

COLLECTED SIGNAL WITH DATA PULSE CONCEALED UNDER RFI

SIGNAL AFTER RFI EXTRACTION

TIME (NANO-SECONDS)

RESOLVED IN TIME WITH UWB

FADES IN FREQUENCY WITH CONVENTIONAL

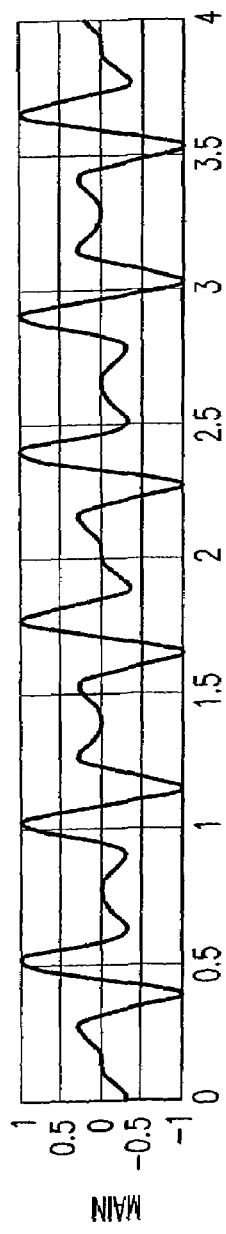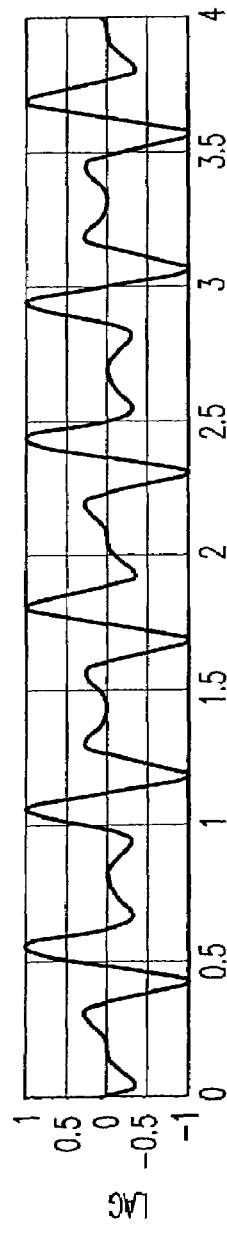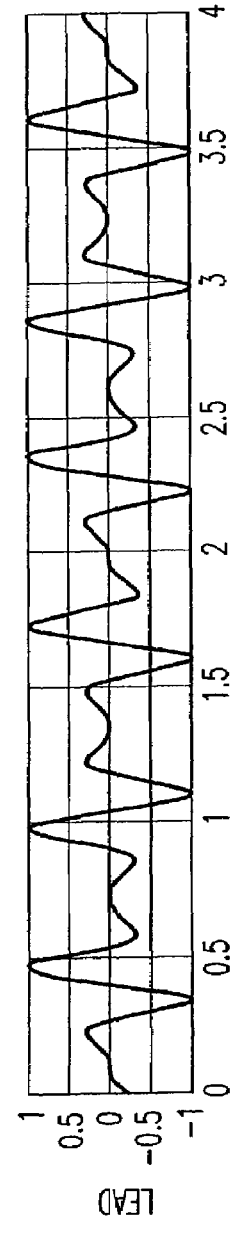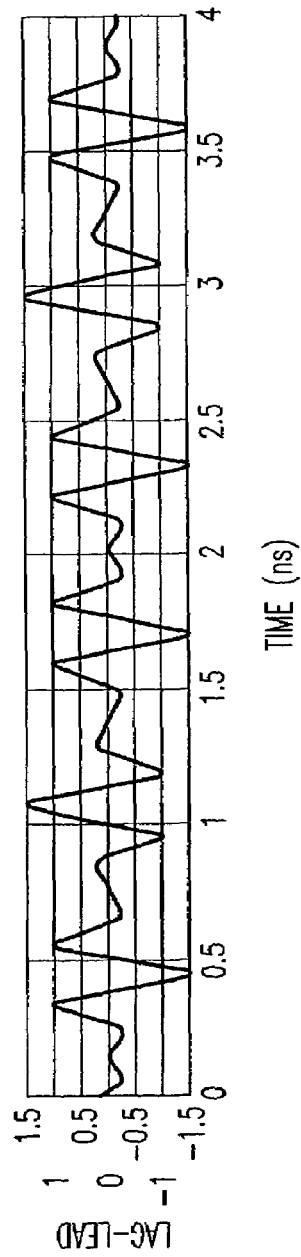

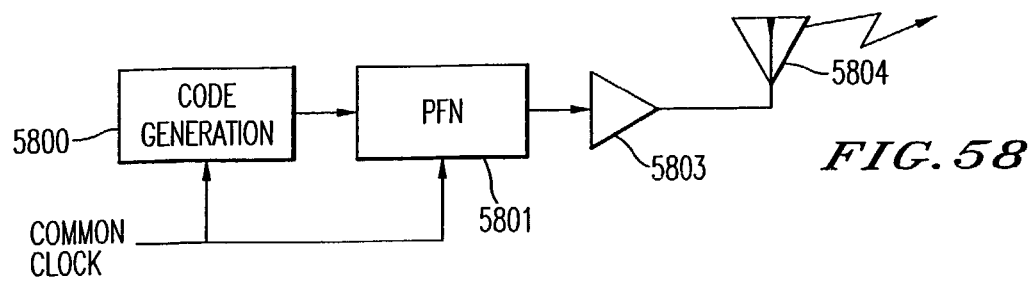
FIG. 58
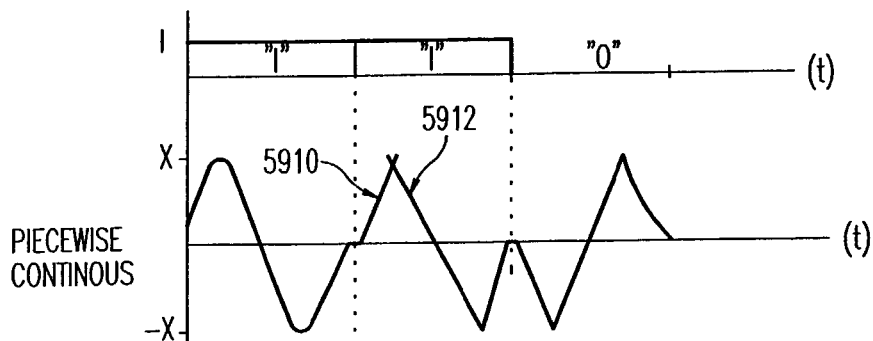
FIG. 59
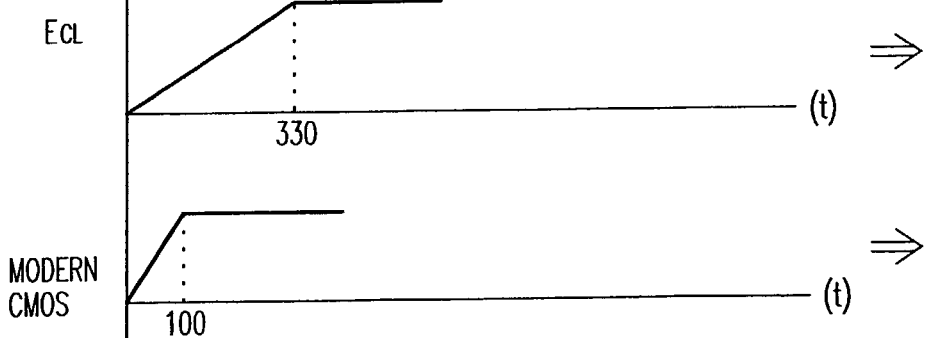
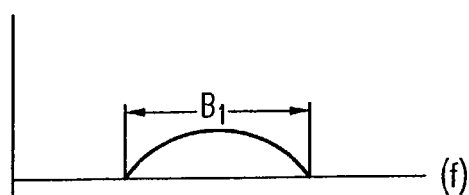
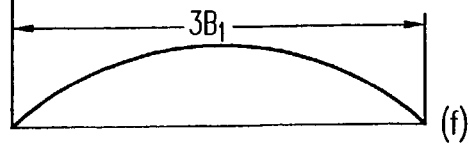
FIG. 60

ULTRA WIDE BANDWIDTH COMMUNICATIONS METHOD AND SYSTEM

CROSS-REFERENCE TO RELATED PATENT DOCUMENTS

This application is a continuation-in-part of commonly owned, application Ser. No. 09/209,460, filed Dec. 11, 1998, entitled ULTRA WIDE BANDWIDTH SPREAD-SPECTRUM COMMUNICATIONS SYSTEM, now issued as U.S. Pat. No. 6,700,939, which claims priority to provisional application Ser. No. 60/069,594, filed Dec. 12, 1997, entitled ULTRA WIDE BANDWIDTH (UWB) SPREAD-SPECTRUM DIGITAL COMMUNICATIONS SYSTEM. This application is also a continuation-in-part of commonly owned, application Ser. No., 09/684,782, filed Oct. 10, 2000, entitled ULTRA WIDEBAND COMMUNICATION SYSTEM, METHOD, AND DEVICE WITH LOW NOISE RECEPTION, now issued as U.S. Pat. No. 6,859,506, which claims priority to provisional application Ser. No. 60/207,225, filed May 26, 2000, entitled ULTRA WIDEBAND COMMUNICATIONS SYSTEM AND METHOD, and provisional application Ser. No. 60/217,099, filed Jul. 10, 2000, entitled MULTIMEDIA WIRELESS PERSONAL AREA SYSTEM NETWORK (WPAN) PHYSICAL LAYER SYSTEM AND METHOD. The entire contents of each of these four applications is hereby incorporated by reference.

STATEMENT REGARDING GOVERNMENT INTEREST

The Government of the United States of America, as represented by the Secretary of the Army, has certain non-exclusive license rights to the Invention as set forth in rights determination ARL No. 998-679-16.

BACKGROUND OF THE INVENTION

1. Field of the Invention

The present invention relates to radio communication transmitters, receivers, systems and methods employing wireless digital communications using ultra wide band (UWB) signaling techniques.

2. Description of the Background

There are numerous radio communications techniques for digital data. Most recently, wireless digital communications have been applied to mobile telephone systems, pagers, remote data collection, and wireless networking of computers as well as other applications. One book on the subject is "Wireless Digital Communications, Modulation & Spread Spectrum Applications," by Kamilo Feher and another is "Digital Communications Fundamentals and Applications" by Bernard Sklar, Prentice-Hall, Englewood Cliffs, N.J., ISBN 0-13-211939-0, the entire contents of both being incorporated herein by reference. Among other things, these books deal with conventional modulation of a carrier with, for example, phase or frequency shift keying (i.e. FSK, MSK, GMSK, BPSK, DBPSK, QPSK, O-QPSK, FQPSK, π/4-DEQPSK, and pulse position modulation (PPM)). The American and Japanese cellular standard, for example, uses π/4-DEQPSK.

These systems conventionally use either time division multiple access (TDMA) or code division multiple access (CDMA) to share an allocated bandwidth between multiple users. Spread spectrum variants of these systems They use either FHSS (frequency hop spread spectrum) or the CDMA codes (a direct sequence approach) to spread the spectrum. "Spread spectrum" provides a way of sharing bandwidth between multiple users and also providing a robust signal that is relatively immune to background noise.

The spread spectrum technique improves the robustness of the signal being sent through a predetermined amount of repetition in the signal, relative to the data that is contained in the signal. Often, this redundancy is described in terms of the number of "chips" per data bit. Conventional spread spectrum systems, codes and techniques are described in "Spread Spectrum Signal Design LPE and AJ Systems", by David L. Nicholson, Computer Science Press, 1988, ISBN 0-88175-102-2, the entire contents of which being incorporated herein by reference.

In such spread spectrum signals, the infraction of information in the chip is embodied in a predetermined number of carrier cycles such that conventional frequency analysis (spectral analysis such as FFT techniques) may be used in analyzing or receiving the signals. Such analysis and reception techniques presume a persistence of a time-continuous signal in order to provide optimum detection.

In any of these conventional radio frequency communication schemes, the data is used to modulate a carrier wave, typically in the microwave frequencies, so that the transmissions may be generated with relatively compact equipment and propagate efficiency in line of sight (LOS) communication channels. However, when the transmitted energy is concentrated at such high frequencies, the energy is easily blocked by terrain or other intervening objects that are present between the transmitter and the receiver. To appreciate why the blocking of radio frequency energy is relevant in the communication system, a brief review of the interaction of radio frequency energy with objects is in order.

To communicate at higher data rates, through a wireless channel and simultaneously have the ability for that energy to communicate through physical barriers such as buildings, walls, foliage, soil or even through tunnels, the spectral energy should have a fair amount of "color" to minimize the risk of having a particular frequency, or band of frequencies, blocked. There are two general advantages to including low frequencies in the transmitted signal. A first advantage is that low frequencies are able to penetrate lossy medium. This is why the United States Navy uses very low frequency radio frequency transmissions to communicate through sea water to submarines. This penetration phenomena may be viewed as a "skin effect", where attenuation is proportional in decibels to the frequency of the transmission. An example of the effectiveness with which lower frequencies penetrate structures as compared to high frequencies is shown in FIG. 1. In FIG. 1, the amount of attenuation in dB is shown to be related to frequency of the radio frequency energy for a variety of different materials. One way to view this is that the attenuation of lower frequencies minimizes the amount of reflection. Generally objects must be sizable (larger than a quarter of the wavelength) to reflect the wave. Accordingly, many smaller objects reflect higher frequency microwaves, but the same small objects do not interact with the lower frequency waves because they are too small relative to the wavelength of the transmitted signal.

Therefore, as recognized by the present inventors, there is a need to have a communication system that can include a spectral component where penetration occurs. Current spread-spectrum and narrowband systems cannot coexist with other narrow bandwidth users of the same spectrum due to mutual interference (DMA, overlaps, spectrums for user's, but strict power control must be adhered to. Too much interference is impinged on the other users, who themselves cause too much interference to the communication system. Typically, high-speed links operate on microwave carriers that are easily blocked by terrain and intervening objects. Such systems rely on all components (e.g. the antenna) having a reasonably flat frequency response over the bandwidth used, and therefore do not affect the waveform. They also assume that there are several to many cycles of the carrier between transitions (e.g. zero crossings) in the modulating waveform.

These conventional narrowband modulation schemes (narrowband including traditional direct sequence and frequency hopping spread spectrum system) are considered to be narrowband because at most only 10 or 20% of the carrier frequency is reflected in a spectrum of the modulated waveform. The bandwidth then is a narrow frequency range containing 90% of the energy spanning $F_l$ (the lowest frequency) to $F_h$ (the highest frequency). If the center frequency is $F_c$, and considered to be $(F_l+F_h)/2$ and referred to as "the carrier" frequency, then the bandwidth that may be employed in a UWB system can exceed 100%, a seemingly impossible number for conventional "narrowband systems." It is the recognition of this fact by the present inventors that allows the present invention to operate simultaneously at low, penetrating frequencies, yet still be able to resolve multipath (reflected signals) and maintain high data rates.

It is the recognition by the present inventors of these phenomena that allows the present invention to simultaneously operate at low frequencies, yet resolve multipath, and maintain high data rates. This combination has substantial benefits because low frequencies both penetrate lossy media and minimize reflections off objects because they become smaller relative to the wavelength. In contrast, conventional systems typically have less than 10% bandwidth, and therefore have poor resolution at low frequencies.

Other UWB systems have been based on producing and receiving short one-to two cycle impulses at a relatively low duty cycle. Examples include deRosa (U.S. Pat. No. 2,671,896), Robbins (U.S. Pat. No. 3,662,316), Morey (U.S. Pat. No. 3,806,795), Ross and Mara (U.S. Pat. No. 5,337,054), and Fullerton and Kowie (U.S. Pat. No. 5,677,927). Impulses on the order of 1 ns are emitted at a 1 to 10 MHZ rate, giving rise to a 100:1 to 1000:1 duty cycle.

As presently recognized, this low duty cycle causes two problems. First, it is difficult, or nearly impossible, to generate significant average power efficiently due to high peaks. For example, because the peak voltages are higher than breakdown voltage of state-of-the-art components, low-voltage (1.8 V) CMOS in bipolar processes, standard low cost implementations are limited. Second, the high peaks disrupt "crystal detector" receivers, which are sensitive to time-domain space.

In contrast, the waveform used in the present invention is constructed from sequences of shape-modulated wavelets (i.e. short, spatially compact, impulsive, electromagnetic wavelets) with an energy envelope resembling a single smooth Gaussian pulse. Transmission of this high duty cycle waveform solves both problems. Low voltage parts can easily create the required waveforms, and the transmitted energy is spread in both time and frequency so that it looks like noise in all domains. Analysis procedures like JTFA (joint time-frequency analysis) often plot an image of the signal energy where time is along the x-axis, frequency is along the y-axis, and bright spots represent high energy at a particular time and frequency. Often several images are made, each with different trades between frequency resolution for time resolution. In low duty-cycle UWB systems, these images appear as vertical bars of somewhat random spacing. In other higher duty cycle UWB systems, like Fleming and Kushner (U.S. Pat. No. 5,748,891), these images have a structured appearance, for example, like a moray pattern. Using a bi-phase waveform according to the present invention, the transmitted signal appears smooth in these images.

Conventional systems also use pseudo-random time intervals between unchanging (essentially identical) pulses, for the purpose of spreading the spectrum and conveying information. Moreover, these systems use pulse position modulation (PPM) to convey information. As presently recognized, this way of communicating information, however, is sub-optimal for several reasons. PPM is sub-optimal in a multipath channel because the demodulator can mistake an illegitimate time shift done by a multipath reflection, for a legitimate time shift done by the modulator. By contrast, the present invention communicates information by changing the pulse shape. Therefore, all multipath is stationary relative a pulse conveying information. Thus, multipath is not confused with data modulation.

Another reason PPM is sub-optimal is that the error probability is high for a PPM detector given a signal with added noise. Analysis of conventional systems using coherent BPSK and PPM shows that for identical bandwidth channels and equal data-rate and bit-error-rate (BER), BPSK can tolerate approximately 6 dB greater noise. Even in its simplest form (a single wavelet coded by inverting or not inverting) the present invention captures the same 6 dB advantage. Part of the reason for this is that a single pulse is necessarily shorter than a window in which one can sense a pulse in two positions. In the present invention, the duration of a single pulse represents a time slot to convey information. In PPM systems, approximately 1.4 to 2 pulse widths represent a time slot to convey information. Another reason is that the difference in voltage, between a detected "one" and a detected "zero", is smaller than that of the BPSK signal. Consequently, it takes more signal power to get over the noise.

Whitening the transmitted spectrum from a UWB system is imperative if it is to not interfere with other users of the same spectrum. Yet another difference between conventional systems and the present invention is the interference generated by the transmitter. While the present invention allows the pulse position to be randomized for the purposes of spectrum control (i.e. to make the output power spectrum smooth), it does not require it, nor does it use it in the preferred embodiment. Instead, the spectrum is smoothed by generating random-looking sequences of shape-modulated pulses such that the waveform as a whole appears random. A transmitter according to the present invention transmits a "symbol" from one of a family of sequences of pulse shapes, where each "symbol" may communicate more that one bit of information, and the series of information bearing "symbols", creates an overall waveform that is "whiter" than conventional systems. As a result, transmissions from transmitters according to the present invention will cause less interference than conventional systems, even if both systems were broadcasting identical average power over essentially identical bandwidths. When added to the aforementioned 6 dB advantage over PPM, the present invention can offer equal communication rates and bit-error-rates, BER, at far less interference levels.

The flip side of whitening the transmitted spectrum for a UWB system is the impact it has on reception. To spectrally whiten the transmitted spectrum, conventional UWB systems jitter the time spacing between pulses. This jittering has severe consequences that are avoided in the present invention. To explain by example, a sine wave that is sampled at random times appears to be "noise." Similarly, any spectral peaks (i.e. tones, or near sine waves such as all conventional narrowband emissions) entering conventional UWB receivers appears as noise in the data samples. To communicate, the desired signal must be strong enough to overcome this "noise." The preferred embodiment of the present invention does not jitter the pulse position. Instead, pulses are identically spaced according to a precise clock. Consequently, tones entering the receiver are captured such that they appear as a pattern in the data samples. As discussed herein, this pattern can be recognized, estimated, and subtracted such that interference caused by the tones is largely removed. Even in the case where the tone entering the receiver is above a Nyquist cutoff (i.e. at a frequency higher than half that of the data samples), frequency folding occurs such that a pattern still occurs. This feature allows the present invention to operate in high noise environments at ranges and data rates far beyond that of conventional UWB systems because the receiver operates with equivalently, less noise.

As presently recognized, it is desirable to have a high data rate in a channel with a high degree of multipath. Conventional systems are limited by intersymbol interference caused by multipath. Buildings, for example, give rise to particularly bad multipath (i.e., interfering echo signals) occurring out to about 500 ns after the direct path signal. Therefore, sending pulses spaced closer that 500 ns to obtain higher data rate, only serves to introduce greater intersymbol interference. The present invention solves this difficult problem by transmitting symbols that communicate more that one bit of information. Since each symbol is itself, spectrally white (meaning its autocorrelation is a spike with low sidelobes), multipath continues to be resolved over the duration of the symbol. Therefore, high data rates can be obtained without intersymbol interference even in the presence of high multipath.

A feature of present invention is that by transmitting one of a family of pulse shapes, each pulse may communicate more that one bit of information, yet not lose any of the aforementioned benefits. To communicate more than one bit per pulse in a PPM system, more time-slots could be used. The multipath degradation described earlier, however, would be severely aggravated, plus the other problems accentuated too. Conventional UWB systems lack control over the shape of their waveform, and are unable to transmit multiple bits per pulse.

Prior art UWB communication systems require high precision clocks to reduce the time it takes to acquire synchronization. Even with precision clocks, acquisition times are often measured in tens of seconds. This reduces the realized data rate and makes the devices difficult to use. A feature of present invention is that synchronization can be obtained quickly, often measured in ms.

SUMMARY OF THE INVENTION

Consistent with the title of this section, only a brief description of selected features of the present invention are presented. A more complete description of the present invention is the subject of this entire document.

An object of the present invention is to provide an ultra wide bandwidth (UWB) high-speed digital communications system as well as supporting system components, and methods that directly produce short, spatially compact, electromagnetic wavelets, (or impulses, or energy packets). A wave-shape of these wavelets is tailored to propagate in free space and communicate information, for example, through use of inverted or non-inverted copies of the wavelets. A system according to the present invention is able to communicate information by sending sequences of these impulses, where the associated spectrum is constrained by both the selection of the sequence coding (sequence coding), and the shape of the wavelet (wavelet selection). A waveform constructed according to the present invention is also able to penetrate through obstructing objects (e.g. walls), or media (e.g. earth).

It is another object of the present invention to construct a UWB high-speed digital communications system and method that directly produce a piecewise continuous wave made up of a sequence of shape-modulated wavelets (i.e. short, spatially compact, impulsive, electromagnetic wavelets), each with an energy envelope resembling a single smooth Gaussian-like pulse.

It is another object of the present invention to make the piecewise continuous wave directly from an digital logic circuitry, where a characteristic shape of the wavelet is at least partially formed from a voltage rise time characteristic of a logic gate embodied in an integrated circuit.

The wave-shape of these wavelets is tailored to propagate in free space and communicate information. The wavelets are made as a weighted sum of master wavelets that are nearly orthogonal.

Thus, for the case of two master wavelets, the transmitted signal is $$s(t) = \sum_i a_i W_1(t - i \cdot T) + b_i W_2(t - i \cdot T),$$

where information is contained in the wavelet coefficients $a_i$ and $b_i$, the functions $W_1$ and $W_2$ represent the master wavelet functions T represents the time spacing between wavelets, and i represents an index to a particular data element in a sequence of data elements.

The master orthogonal wavelets can, for example, be an odd and even derivative of a Gaussian (i.e., Gaussian shaped pulse), as in $$W_1(t) = \frac{d^r}{dt^r} e^{-(k\_t)^2} \text{ and } W_2(t) = \frac{d^s}{dt^s} e^{-(k\_t)^2},$$

where r and s are odd and even respectively and set the relative bandwidth of the wavelet, t represents time, and k is a time scaling parameter. The master wavelets could also be the real and imaginary parts of a Rayleigh wavelet, as in $$\Psi(t) = \frac{j \cdot (-1)^{\frac{(n+2)^2}{4}} + 1}{\left(j + \frac{k \cdot t}{\sqrt{\frac{(n+2)^2}{4} - 1}}\right)^{\frac{(n+2)^2}{2} - 1}}, W_1 = \text{Re}(\Psi), W_2 = \text{Im}(\Psi).$$

where n is a parameter that sets the relative bandwidth, and as before, t represents time, and k is a time scaling parameter. The set of master wavelets could also be made up of wavelets of where the time scaling parameter k, and/or the relative bandwidth parameters, r, s, and n are different.

It is another object of the present invention to communicate one or more bits per wavelet by constructing each wavelet from a family of master wavelet shapes. It is an object of the present invention to convey information by allowing the wavelet coefficients (e.g. the $a_i$ and $b_i$) to vary between +1 and −1 such that inverted or non-inverted copies of a family of wave-shapes are transmitted and received.

It is still another object of the present invention to simultaneously communicate information and control the transmitted spectrum by sending sequences of these impulsive wavelets where both the selection of the sequence coding, and the shape of the wavelets are used to shape the spectrum.

It is yet another object of the present invention to construct a family of $2^P$ spectrally white sequences, any one sequence being called a symbol, such that P+1 bits of information are communicated upon reception of a single symbol (i.e. one sequence from the family). It is an object of the present invention to construct the family of $2^P$ sequence-codes (or symbols) such that a decoder for the family can operate with order $P \cdot 2^P$ computational complexity.

It is also an object of the present invention to exploit multipath effects to enhanced UWB signal reception.

It is also an object of the present invention to provide the above objectives in a device that can be largely constructed with a large-scale integrated-circuit (LSI) semiconductor technology.

It is also an object of the present invention to provide a piece-wise continuous waveform constructed from inherent rise-times (or fall times, generically referred to as "edges") of semiconductor logic circuits.

It is still another object of the present invention to provide a scalable radio, able to communicate over a broader spectrum as a function of the speed at which semiconductor circuits operate.

Moreover, a feature of the present invention is that as new semiconductor circuitry is introduced, according to Gordon Moore's hypothesis that processing power will double approximately every eighteen months, the communications efficiencies of the present invention also increase according to "Moore's law".

Moreover, the present invention produces waveforms based on rise and fall times (edges) of logic circuitry. Thus, as the speed and performance of logic circuitry increases with time, so does the bandwidth available for transmission according to the present invention, thereby allowing increase in data rate based on a power spectral density limited channel, to be implemented according to the present invention.

The foregoing and other objects and advantages of the invention will appear from the following description. In the description reference is made to the accompanying drawings which form a part hereof, and in which there is shown by way of illustration and not of limitation a preferred embodiment. Such description does not represent the full extent of the invention, but rather the invention may be employed in different arrangements according to the breadth of the invention.

BRIEF DESCRIPTION OF THE DRAWINGS

A more complete appreciation of the invention and its many attendant advantages will be readily obtained as it becomes better understood with reference to the following detailed description when considered in connection with the accompanying drawings, in which:

FIG. 18 is a power versus frequency spectral plot of power spectrum in the zero to 1 GHz frequency band in an exemplary environment;

FIGS. 53A-53D show time waveforms of UWB waveforms through various portions of the block diagram shown in FIG. 52;

FIG. 58 is a general block diagram, showing that the performance improvement obtained by the present invention will increase when semiconductor switching speeds increase;

FIG. 59 shows a variety of time waveforms illustrating how a piece-wise continuous waveform may be constructed from "edges" of semiconductor logic gates and how the speed at which the logic gates transition will affect the pulse width of UWB waveforms constructed by the use of concatenating edges according to the present invention; and FIG. 60 shows two spectral plots of spectral occupancy of signals produced when using slower ECL logic versus more modern digital logic with faster rise and fall times.

DETAILED DESCRIPTION OF THE PREFERRED EMBODIMENTS

Figure 1:
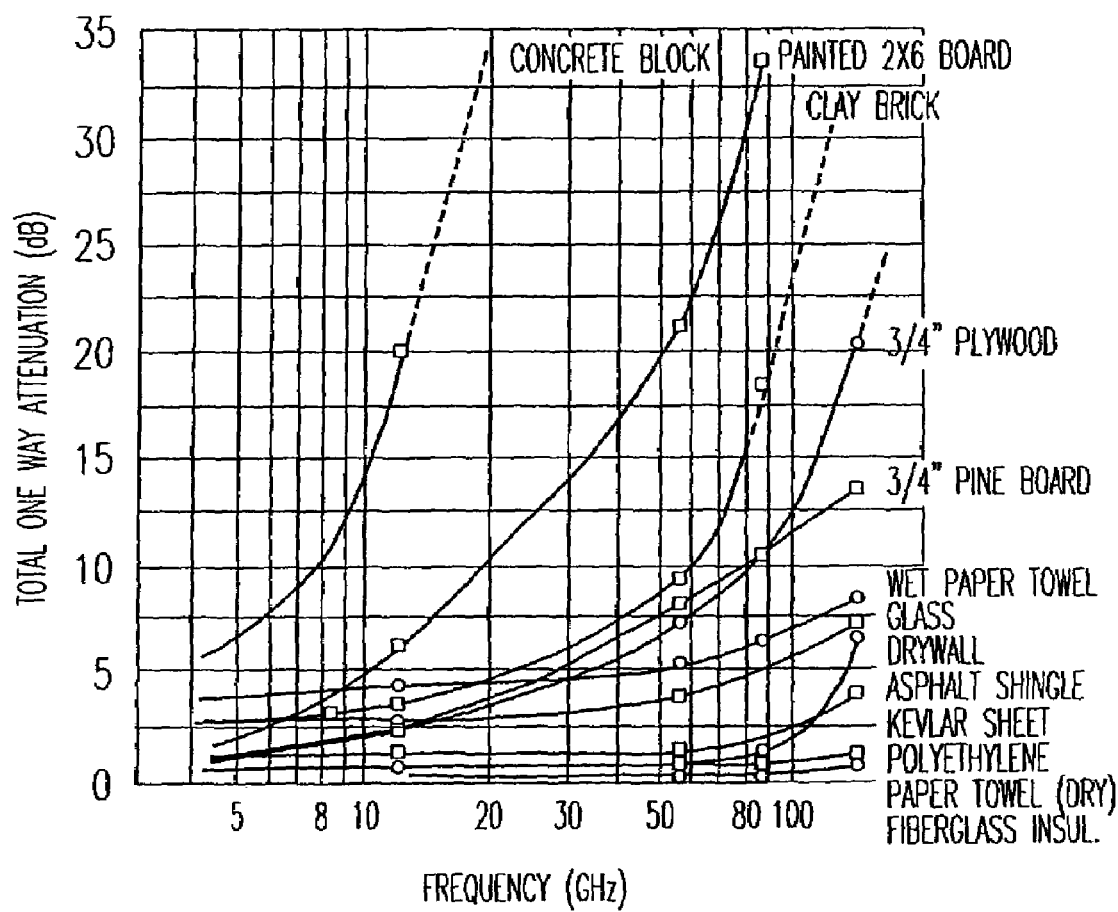
FIG. 1 is a graph showing an amount of attenuation versus frequency of a RF signal when propagating through different materials.

Preferred embodiments of the present invention will now be described with reference to the drawings. Throughout the several views, like reference numerals designate identical or corresponding parts.

Defining UWB

From an energy spreading perspective, or from a resolution perspective, bandwidth and center frequency can be treated independently. However, the term "relative bandwidth" is helpful in defining ultra wide bandwidth (UWB) transmissions.

As recognized by the present inventors, the motivations for preferring definitions based on bandwidth relative to center frequency follow from three primary desirable features. The first is immunity to scintillation and multipath fading. The only way to prevent scintillation, speckle, and multipath fading is to have resolution that is approximately equal to the wavelength. The second is penetrating materials with high bandwidth signals. To communicate at the highest data rates through lossy media, or to do the highest resolution radar imaging through or within lossy media, requires both low frequencies (to penetrate) and wide bandwidths (to resolve), which when taken together require wide relative bandwidth. In this case, losses at higher frequencies are so great that these higher frequencies cannot be used. The definition is based on relative bandwidth because these benefits derive specifically from wide relative bandwidth and cannot be obtained with narrowband systems.

If B is the bandwidth of a waveform, $f_c$ is the center frequency of the waveform, and $f_h$ and $f_l$ are the high and low frequency cutoffs (e.g. −6 dB from peak, −10 dB from peak, −20 dB from peak, etc.) of the waveform, then the fractional bandwidth $B_f$ of the waveform is defined as $$B_f = \frac{B}{f_c} = \frac{(f_h - f_l)}{(f_h + f_l)/2}. \quad (1)$$

A UWB waveform is one that has a fractional bandwidth $B_f$ approximately equal to its center frequency, or said another way, matches resolution to wavelength. In one preferred embodiment, the fractional bandwidth is in the range of 0.25 to 2.0. However, this range may vary in alternate embodiments. For example, the FCC in a ruling on Feb. 14, 2002, adopted a definition of UWB that included a fractional bandwidth in the range of 0.2 to 2.0 at a drop of −10 dB from peak.

Furthermore, other indicia can be used to define a UWB signal, such as a signal's total bandwidth. For example, the FCC in its February 2002 ruling defined UWB to also include any signal whose total bandwidth is 500 MHz or greater.

As used in this description, a waveform can be a single wavelet or a plurality of wavelets combined together to form a UWB signal.

Analytic UWB Waveforms

Figure 2A:
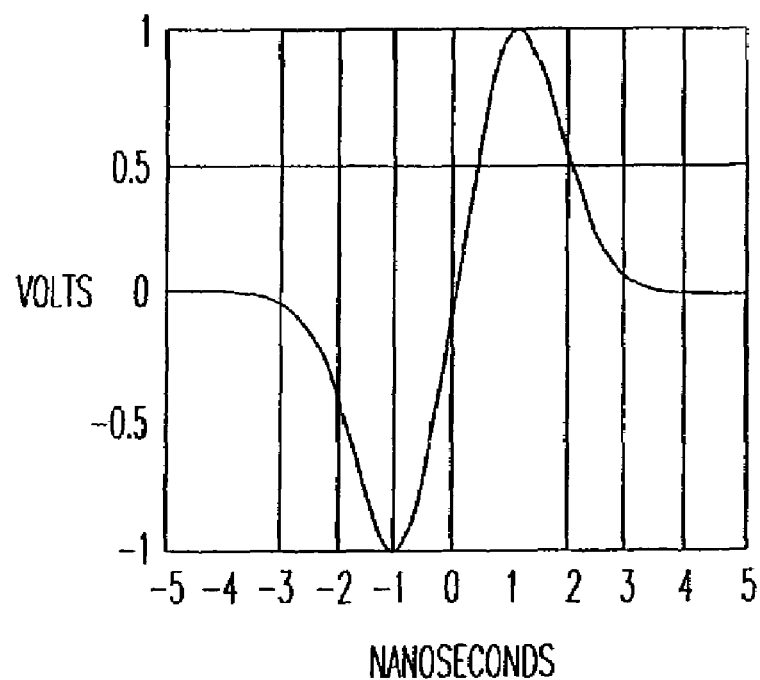
FIGS. 2A and 2B are time and frequency waveforms respectively of a bi-phase pulse according to the present invention.

The present invention preferably employs analytic transmit excitation waveforms (i.e. signals) that are derivatives of a Gaussian-shaped waveform because such signals have optimal time resolution for a given occupied bandwidth. These signals are also continuous and infinitely differentiable. While higher order derivatives are used in the present invention, for clarity, the first derivative, a Gaussian monocycle as shown in the time domain in FIG. 2A, is defined as $$s(t) = \frac{A\sqrt{e}}{t_p} \cdot t \cdot e^{-\frac{1}{2}\left(\frac{t}{t_p}\right)^2} \quad (2)$$

Here, A is the peak amplitude and $2t_p$ is the peak-to-peak pulse width. The energy is, $$p = A^2 t_p \frac{e\sqrt{\pi}}{2} \quad (3)$$

Figure 2B:
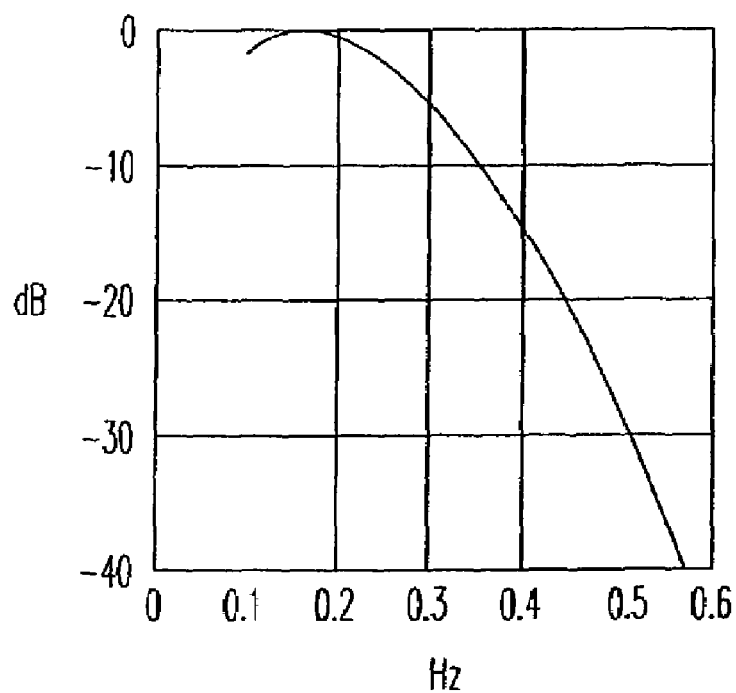

The spectrum of s(t), shown in FIG. 2B, given by equation (4), is also a Gaussian.

$$S(\omega) = A\sqrt{2\pi e} \cdot t_p \omega^{-\frac{1}{2}(t_p\omega)^2} \quad (4)$$

The spectral peak occurs a $$\omega_{max} = \pm\frac{1}{t_p} \text{ rad/s or } f_{max} = \pm\frac{1}{2\pi t_p} \text{ Hz.}$$

The bandwidth is determined by the upper and lower frequencies at the −6 dB power levels $$f_{lo} = 0.3191057 \, f_{max}$$
$$f_{hi} = 1.9216229 \, f_{max}, \quad (5)$$

and the center frequency is $$f_c \frac{f_{lo} + f_{hi}}{2} = 1.12 f_{max}. \quad (6)$$

Since each derivative puts a zero at direct current (DC) in the power spectrum, as higher order derivatives are taken, there are more zero crossings in the time domain, the bandwidth narrows, and the low frequency cutoff and center frequency are pushed up.

Computation of Peak to Average Power or Crest-Factor for XI Bi-Phase Modulation According to Present Invention To have efficient transmitters, it is preferable to operate in a class-C or switching mode. In order to operate in standard low-voltage high-speed CMOS, minimizing peak power is desired. Therefore, it is preferable to have a low crest factor (i.e. ratio of peak power to average power). The crest factor for a waveform employed by the present invention can be computed as follows: A signaling interval, or pulse repetition frequency (PRF), is defined to avoid significant energy overlap between adjacent pulses. It can be shown that |s(t)|<0.05 for |t|>α $t_p$ with α=3.0342. By setting the minimum pulse amplitude to 26 dB down from the peak amplitude, the maximum pulse repetition interval (PRI), T, and pulse repetition frequency (PRF), $F_{prf\_max}$, are $$T = 2\alpha t_p \text{ and } F_{prf\_max} = \frac{1}{T}. \quad (7)$$

The average power is computed as $$P_{mono} = \frac{1}{T}\int_{-\frac{T}{2}}^{\frac{T}{2}} s(t)\partial t \approx \frac{1}{T} \int from -\infty^{\infty} s(t) \partial t = \quad (8)$$
$$\frac{1}{T}\frac{e\sqrt{\pi}}{2}A^2 t_p = \frac{e\sqrt{\pi} A^2}{4\alpha} = \frac{A^2}{2.519}$$

Since the peak power is $A^2$, the peak to average ratio is 2.519. For comparison, a sine wave of amplitude A has a peak power of $A^2$ and an average power of $A^2/2$, giving a peak to average ratio of 2.

This analysis shows that a bi-phase signal employed in the present invention is similar to a continuous wave CW tone in efficiency. This low crest factor leads to significant benefits. Unlike conventional PPM systems, transceivers, receivers or transmitters according to the present invention can attach its antenna directly to a pin on a low-voltage CMOS IC. Furthermore, since the pulse voltages are low rather than large spikes, cross-talk between traces on the circuit board are readily managed.

Spectral Spreading

While conventional systems are based on using a carrier, the present invention uses a form of VSB technology and thus has none. A derivation of its spectral character is provided below.

Let the basic pulse waveform s(t) be described as above. Let a user code h(t) be represented by an $N_c$ length sequence of equispaced positive and negative going impulses indexed by n, given by, $$h(t) = \sum_{n=0}^{N_c-1} h_n \delta(t - \tau_c) \qquad (9)$$

where $\tau_c$ is the spacing between the code's changes. Let the binary data be encoded with compression, forward error correction, and a whitening scrambler, with the mapping $\{0,1\} \to \{-1,1\}$ applied, so that the data, d(t), is represented by a stream of equispaced positive and negative going impulses, one per data bit, indexed by k. Also, let there be $N_b$ code impulses per data bit (i.e. a chip comprised of $N_b$ impulses which together make up a single bit). For example, $d_k$=[1, −1, 1, 1, −1, 1, −1 . . . ], and $$d(t) = \sum_k d_k \delta(t - k\tau_d) \qquad (10)$$

where $\tau_d = N_b \tau_c$ is the spacing between the data changes. Let the combination of the code and the data be represented by $$g(t) = \sum_{k=0}^{\infty} \sum_{n=0}^{N_b-1} h_{(k N_b + n) \bmod (N_c)} d_k \delta(t - (k N_b + n)\tau_c). \qquad (11)$$

The radiated waveform x(t) is thus the convolution, $$x(t) = g(t) \otimes s(t). \qquad (12)$$

Since convolution in time is multiplication in the frequency domain, the transmitted spectrum is $$X(\omega) = G(\omega)S(\omega). \qquad (13)$$

Since G(ω) is whitened, the transmitted spectrum is essentially that of the basic impulse waveform s(t). In the simplest case where the code length and chip are the same length (i.e., $N_c=N_b$), g(t)=h(t)⊗d(t), so the transmitted spectrum is simply, $$X(\omega) = H(\omega)D(\omega)S(\omega) \qquad (14)$$

Again, the transmitted spectrum is like that of the basic impulse waveform s(t), because both h(t) and d(t) are reasonably white. The same codes that are typically used in direct sequence spread spectrum (DSSS) and code division multiple access (CDMA) systems (e.g. Kasami, Gold, Walsh-Haddamard, PN, etc.) may thus be used as part of the present invention.

Information Theory Benefits From Shannon's Theoretical Channel Capacity Limits

The technical rationale for preferring the UWB waveform according to the present invention for short range, high data rate applications, from an information theory and regulatory point of view, follows from Shannon's channel capacity equation, $$C = B \log\left(1 + \frac{S}{N}\right), \qquad (15)$$

which relates the bit rate, C, to channel bandwidth, B, and signal-to-noise ratio (SNR). There are two key pieces of information can be gleaned from Equation (15). The first key is to see that, at low SNR, the log function is nearly linear. So if the power is doubled, then the data-rate almost doubles. But at high SNR, the log function is severely non-linear so only marginal gains occur in the data rate with huge power increases. Recognizing that complex modulation schemes (i.e. those that provide more than 1-bit/Hz) require high SNR, it can be concluded that obtaining a high data-rate with narrowband systems is fundamentally difficult because the SNR must be increased by using more power, but the power is traded for data rate in an undesirable log relation.

The second key observation relates to how the signal power is defined. For UWB systems, there is a presumed regulatory limit on radiation imposed as Po=Watts/Hz limit on radiation. Therefore, the signal power scales with bandwidth, and Shannon's equation becomes $$C = B \log\left(1 + \frac{S}{N}\right) = \qquad (16)$$
$$B \log\left(1 + \frac{P_0 B}{KTB}\right) = B \log\left(1 + \frac{P_0}{KT}\right) = B \log\left(1 + \frac{P_t G_t A_e}{KT(4\pi r^2)}\right).$$

This analysis shows that the data-rate scales with bandwidth. It also shows that the data-rate scales with power provided that a low SNR modulation technique is employed, which is a feature of the present invention. Since the bandwidth exceeds the required data-rate, integration with CDMA codes is used to trade data-rate for reduced power, or for extra range. By using different length codes, the UWB system according to the present invention is scalable from 100 Kbits/sec to 100 Mbits/sec and from a few users to many users, all under software control.

Natural Fit To WPAN

While on the one hand, UWB has a competitive advantage in short range high data-rate applications like WPAN, the same advantage is not available for longer range low data-rate applications like cell-phone systems. Conventional systems have the advantage outdoors for several reasons. First the conventional cell phone systems have much more power-which is crucial to overcome 1/r2 path losses. UWB systems have severe power restrictions because they must coexist on a non-interfering basis with other users. The natural shielding a building provides is ideal for indoor UWB applications. Outdoor broadcast applications are the worst fit as it maximizes interference.

Second, in addition to more raw power, narrowband systems also enjoy higher antenna gains-directive arrays and dishes optimized for a narrow band. Antenna gain in a UWB system works against it because rather than limiting transmit power, the FCC (or regulatory equivalent in other countries) limit the peak V/m at 3 m at any angle. So increasing the transmit antenna gain does not allow a UWB system to operate at greater ranges, it only reduces the already low transmitter output power requirements. Furthermore, UWB systems do not benefit from using most classic constructions (e.g. log-periodic, spiral, etc.) because they are dispersive.

Thirdly, the advantage UWB systems have in resolving closely spaced multipath typical of indoor environments, is wasted in outdoor systems because the multipath delay spreads are much longer. Whereas narrowband RAKE processing cannot be applied indoors (giving UWB the advantage indoors), narrowband RAKE can be applied outdoors. UWB technology enjoys a competitive advantage in indoor applications where their superior capabilities in severe close-in multipath and superior capability to provide high data rates can be brought to bear in short-range, high data rate, very low power applications like WPAN.

Modulation Benefits of the Bi-phase UWB Waveform of the Present Invention

The present invention includes a modem that can be described as a fully coherent, bi-phase, baseband, direct sequence, spread spectrum radio, architected to be chiefly implemented in low power CMOS circuitry. This implementation is in contrast to the video impulse pairs, and the pulse position modulation (PPM/time hopping) implemented in conventional systems. Several benefits of the present approach are enumerated below.

1) Bi-phase modulation yields a 3 dB to 6 dB advantage over PPM (time-hopping) in multipath-free environments, depending on assumptions, as discussed in the next section. A greater advantage is realized when multipath is considered, since multipath often appears like data modulation in a PPM system.

2) Bi-phase modulation gives optimal material penetration by employing the lowest spectral content for a given multipath resolution and data-rate. If assumed that bi-phase modulation and PPM have equal data-rates, then both modulation techniques must use the same amount of time to encode a bit. PPM must be able to fit two pulses into the same time window that contains one bi-phase pulse (see FIGS. 3A, 3B, 4A and 4B). Therefore, the bi-phase pulse can have ½ the bandwidth (i.e. twice the width) of a PPM pulse. Half the bandwidth equates to half the center frequency in a UWB system. This gives bi-phase modulation an advantage in data-rate through lossy materials because it can operate at the lower frequencies that penetrate better.

3) Bi-phase modulation provides optimal multipath resolution. The bi-phase system has a bit time-window that matches its pulse width, whereas the time-window for a bit in PPM is twice the width of its pulse. A PPM system is sensitive to multipath reflections because they lead to pulse position ambiguity. The multipath reflections actually show up in the data modulation domain. By contrast, the bi-phase system optimally minimizes sensitivity to multipath because both a "1" and a "0" use exactly the same path, and that path is optimally resolved-in a single pulse-width time-widow. See FIGS. 5A and 5B.

4) Similar to 3) above, bi-phase modulation is insensitive to the number of zero-crossings in a pulse waveform. Extra zero-crossing caused by filters, multipath, antennas, etc. confuse a PPM system because the energy in a "1" is smeared into the "0" position at some arbitrary phase as a function of where the extra zero crossings lie. By contrast, since phase is preserved in all linear processes (i.e. like filters, multipath, antennas, etc) the phase detector in a bi-phase system continues to detect the phase encoded data.

5) Bi-phase modulation exhibits a peak-power to average-power ratio of less than 3 (for reference, a sine wave is 2). This leads to efficient "switching" transmitters and a natural fit into low cost, low voltage CMOS implementation. Only one volt peak-to-peak is needed at the antenna,—which is within the capabilities of low-voltage CMOS.

6) Bi-phase modulation has reduced jitter requirements, which allows CMOS to meet the radio jitter requirements, for clocking purposes. In PPM, one must accurately control arbitrary time positions on a fast (i.e. pulse to pulse) basis. This control requires a series of wide bandwidth circuits where jitter accumulates. By contrast, a bi-phase system needs only a stable clock—a low cost high-Q low jitter clock—since the pulses occur on a constant spacing.

Theoretical Derivation of the Bi-Phase Advantages over PPM.

The superiority of bi-phase modulation over PPM is now demonstrated mathematically. Assuming that both modulation techniques have equal bandwidth, equal average power, and high peak RF's producing time-packed pulses, and that the PPM pulses are non-overlapping, bi-phase modulation has a 3 dB advantage in data rate and requires 3 dB less peak-power compared to PPM. First, non-coherent PPM is discussed, and it is pointed out that the resulting correlation coefficient leads to performance degradation. Second, the impractical implementation of optimal PPM is discussed. This case again assumes that both modulation techniques have equal bandwidths, equal average powers, and high PRF's producing time-packed pulses. However, for this case, the PPM pulses overlap in such a way as to minimize the value of the cross-correlation. It is found that optimal PPM is 0.9 dB inferior in performance to bi-phase modulation, and optimal PPM requires 0.8 dB larger peak power. In a final comparison, both modulation techniques have equal bandwidths, equal average powers, equal peak powers, and low PRF's resulting in low duty cycle transmitters. Under these circumstances, it is shown that bi-phase modulation is 3 dB superior to PPM. The analysis is concluded with a comparison of modulation techniques by considering the practical matter of spectral whitening. Differences in whitening techniques lead to large implementation advantages of bi-phase systems over PPM systems.

The analysis that follows does not include the effects of random multipath. Since multipath appears in the modulation domain of the PPM system, in practice, one would expect there to be even more advantage to the bi-phase system in a multipath channel.

Theoretical Construction

A transmit signal of a general UWB system may be modeled as $$x(t) = V_t s(t, b) \tag{17}$$

where t represents time, b represents the bit value, $b \in \{0, 1\}$, $V_t$ represents the amplitude of the transmit waveform, and $s(t,b)$ represents the energy-normalized waveform. Therefore, the signaling alphabet is $\{s(t,0), s(t,1)\}$, which has inner products (i.e. cross-correlations).

$$\langle s(t,0), s(t,0) \rangle = 1$$

$$\langle s(t,1), s(t,1) \rangle = 1$$

$$\langle s(t,0), s(t,1) \rangle = \rho \tag{18}$$

These cross-correlations represent the output of a coherent detector, sampled at its peak (i.e. the ideal matched filter receiver). The above transmit model applies to both bi-phase and pulse-position-modulation (PPM) techniques. For bi-phase modulation, s(t,0)=−s(t,1) so ρ=<s(t,1), s(t,1)>=−1. For pulse position modulation, assuming the two pulses do not overlap, ρ=0.

Assuming an additive-white-Gaussian-noise (AWGN) channel, the received signal is $$r(t) = V_t s(t,b) + n(t) \quad (19)$$

where n(t) is the AWGN with mean 0 and standard deviation σ. The probability of incorrectly identifying the bit, b, given the receive signal, r(t), is $$P_e = Q\left(\frac{V_t}{\sigma}\sqrt{\frac{1-\rho}{2}}\right) \quad (20)$$

Equation (20) was shown in B. P. Lathi, Modern digital and analog communication systems. Holt, Rinehart, and Winston, 1989, and H. L. Van Trees, Detection, Estimation, and Modulation Theory Part 1. John Wiley and Sons, Inc., 1968, the entire contents of each of which being incorporated herein by reference, where Q( ) is the error function defined as $$Q(x) = \int_x^\infty \frac{1}{\sqrt{2\pi}} e^{-y^2/2} \partial y \quad (21)$$

Using Equation (20) for the probability of error, the relative performance of bi-phase and pulse-position modulation can be examined.

Figure 3A:
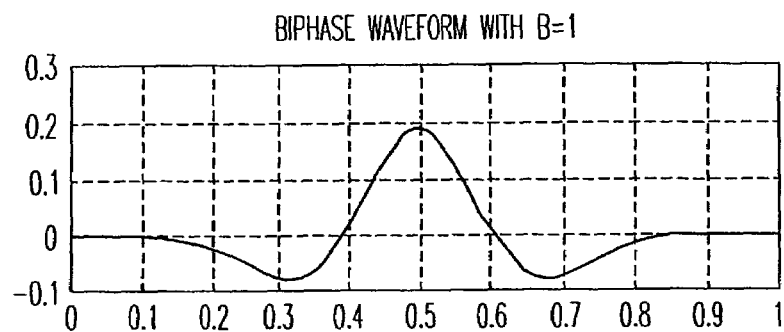
FIGS. 3A and 3B are time waveforms for a bi-phase UWB waveform representing information bit of "1" in an information bit of "0" according to the present invention.
Figure 3B:
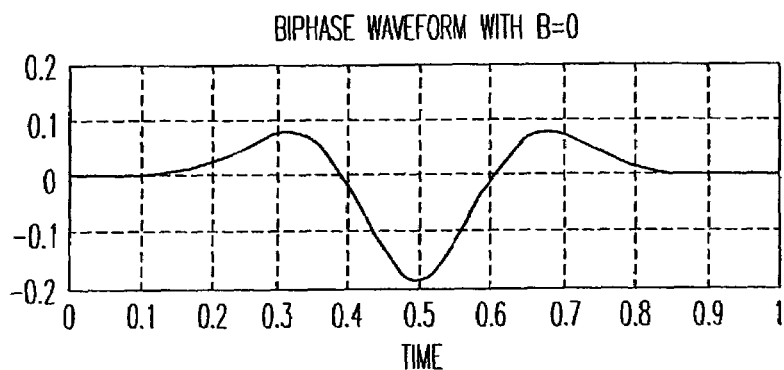

FIGS. 3A, 3B show the signaling waveforms for a bi-phase system. For bi-phase systems, ρ=−1 and the probability of error is $$P_e^{biphase} = Q\left(\frac{V_t}{\sigma}\sqrt{\frac{1-\rho}{2}}\right) = Q\left(\frac{V_t}{\sigma}\right). \quad (22)$$

In the following sections, Equation (16) is compared to various PPM transmission schemes.

Comparison of PPM with Bi-Phase—Case 1

There are several ways to approach the comparison of the two modulation forms. One can assume peak-power or average-power equivalence. Average power makes sense from a theoretical point of view, but the efficiency of an implementation depends on peak power. Performance comparisons also depend on the correlation coefficients of the PPM signaling waveforms. One must also choose between data-rate equivalence and bandwidth equivalence. As mentioned previously, when the systems have an equal data-rate, the bi-phase pulse can have half the bandwidth (i.e. twice the time width) of a PPM pulse. This fact gives bi-phase an advantage in data-rate through lossy materials.

Figure 4A:
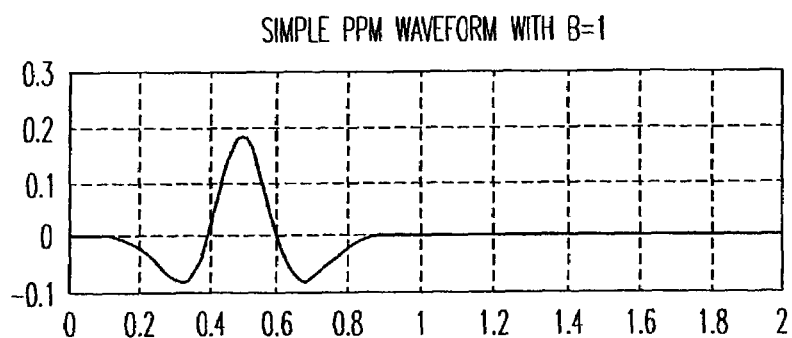
FIGS. 4A and 4B show respectively pulse position modulation (PPM) waveforms showing information bits of "1" and "0" respectively.
Figure 4B:
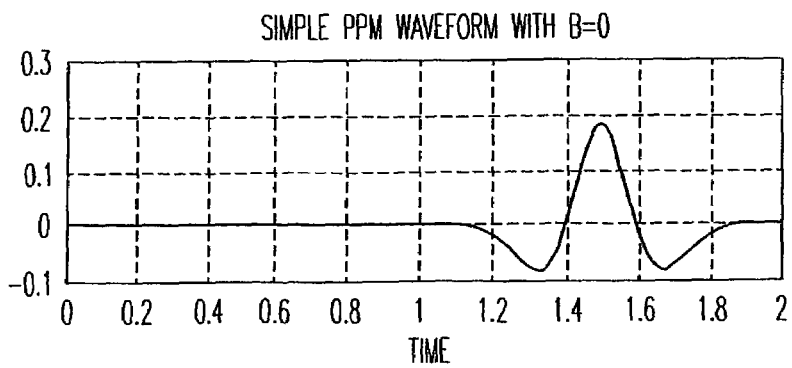

For case 1, it is assumed that the bi-phase and PPM systems have equivalent bandwidths (i.e. pulse widths are equal) and that the PPM waveforms are non-overlapping. As a result, the data-rate of the PPM system is half of the data-rate that the bi-phase system is since two bits of bi-phase fit in the same time window as one bit of PPM. The PPM waveforms are illustrated in FIGS. 4A, 4B with the PPM time axis now twice as long as the time axis of the bi-phase waveforms illustrated in FIGS. 3A, 3B. Since the bi-phase system is sending 2 pulses for every PPM pulse, twice the power on a PPM pulse is used to maintain an equivalent average power. The two PPM waveforms are orthogonal, ρ=0, and the probability of error is $$P_e^{PPM} = Q\left(\frac{\sqrt{2V_t}}{\sigma}\sqrt{\frac{1-\rho}{2}}\right) = Q\left(\frac{\sqrt{2V_t}}{\sigma\sqrt{2}}\right) = Q\left(\frac{V_t}{\sigma}\right). \quad (23)$$

Equations (22) and (23) give identical results, thus, the bi-phase and PPM signaling techniques have equal probabilities of error, but the data rate of the bi-phase technique is twice the data rate of PPM. This doubling of data rate is equivalent to a 3 dB power advantage.

Note that the peak power required by PPM is 3 dB larger than the peak power required for bi-phase signaling. Therefore, by normalizing to peak power instead of average power, bi-phase modulation is 6 dB superior to PPM.

Comparison of PPM with Bi-Phase—Cases 2 and 3

While the above gives a reasonable comparison metric, the analysis can be adjusted to evaluate a particular implementation. For example, if non-coherent detection is used (case 2), then ρ>0 due to the video filter settling time, and PPM performance is slightly worse. On the other hand, the coherent detector performance can be optimized by overlapping the PPM pulses (case 3) to minimize the correlation coefficient, ρ. The optimum form of PPM is typically not used because performance becomes sensitive to phase jitter and pulse spreading due to filters and antennas. Also, a sampler with enough bandwidth to capture the peak of the UWB pulse is needed.

Figure 5A:
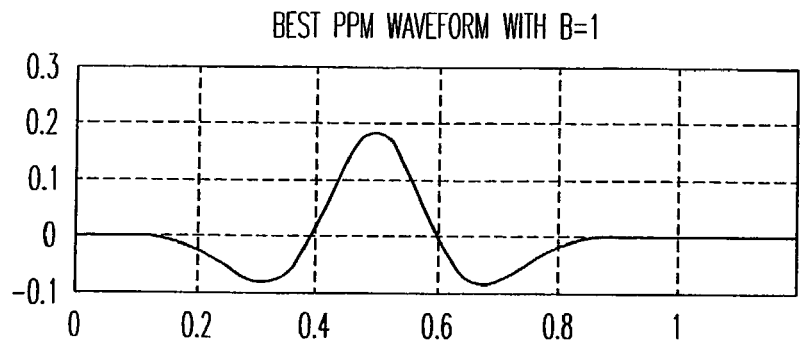
FIGS. 5A and 5B are graphs of best case PPM waveforms with information bits of "1" and "0"
Figure 5B:
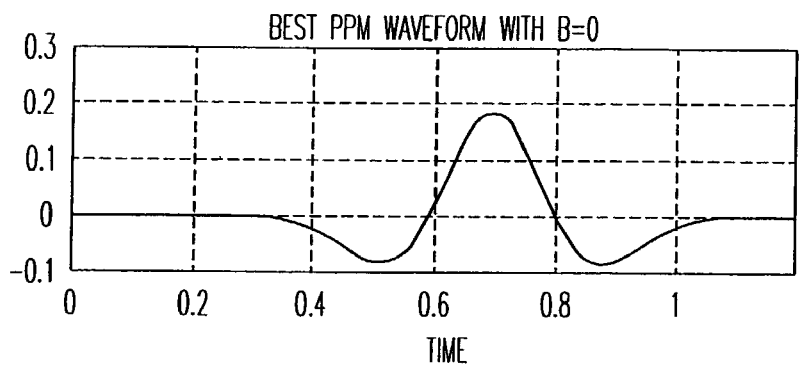

Nonetheless, for completeness, FIGS. 5A and 5B demonstrate a preferred pulse placement for the given waveforms. For this configuration, ρ=−0.6183 and the waveforms are 1.2 times longer than those required for bi-phase modulation. The amplitude is therefore increasable by √1.2 and the average power is kept the same. The resulting probability of error is $$P_e^{PPM} = Q\left(\frac{\sqrt{1.2V_t}}{\sigma\sqrt{1.2359}}\right) = Q\left(\frac{V_t}{\sigma\sqrt{1.0348}}\right) \quad (24)$$

This optimum PPM has a signal-to-noise ratio that is 0.1486 dB inferior to bi-phase modulation and a data rate that is 0.7712 dB slower than bi-phase modulation. Thus, bi-phase modulation is 0.9298 dB superior to this optimal PPM configuration. In addition, the peak power requirement for bi-phase modulation is 0.7712 dB less than the peak power requirement of PPM. Thus, if normalized to peak power, bi-phase modulation is 1.7 dB superior to optimal PPM.

Comparison of PPM with Bi-Phase—Case 4

As one final comparison of PPM to bi-phase signaling, the case is taken where both systems have the same pulse width, same peak power, same average power, same bandwidth, same data rate and non-overlapped PPM pulses. Thus, the duty cycle and PRF are low and equivalent for both techniques. In this case, ρ=0 for PPM, ρ=−1 for bi-phase, and the resulting probabilities of error are $$P_e^{biphase} = Q\left(\frac{V_t}{\sigma}\sqrt{\frac{1-\rho}{2}}\right) = Q\left(\frac{V_t}{\sigma}\right), \text{ and} \quad (25)$$

$$P_e^{PPM} = Q\left(\frac{V_t}{\sigma}\sqrt{\frac{1-\rho}{2}}\right) = Q\left(\frac{V_t}{\sigma\sqrt{2}}\right).$$

So for this scenario, bi-phase has a 3 dB advantage over PPM.

Duty Cycle and PRF Restrictions of PPM

Bi-phase systems whiten their spectrum through modulation of the data with a whitening/spreading code. There is no impact to the achievable PRF. By contrast, PPM achieves spectral whitening by jittering the pulse positions in time. To allow for this time jitter, UWB PPM systems must operate at low duty cycles. For example, a PPM system might operate with a nominal ½ ns pulse and a nominal 10 MHZ PRF (½ ns on, 99.5 ns off). So the transmit pulse must have a peak power of 200 mW (+23 dBm), equivalent to a 9V peak-to-peak sine wave into 50 ohms, to get 1 mW average power-a peak to average ratio of 200. By contrast, the present inventive bi-phase system operates with a peak-to-average ratio of less than 3. (For reference, a continuous sine wave has a peak-to-average ratio of 2.) So a radio that embodies the present invention needs only 3 mW of peak power (4.8 dBm), equivalent to a 1.1V peak-to-peak sine wave into 50 ohms, to transmit 1 mW average power. Clearly, PPM has a significantly higher peak power requirement than an equivalent bi-phase system. A key point is that a high bandwidth 1.1V swing is obtainable in a low voltage 0.18 u CMOS part. The high bandwidth 9V swing requires external snap-recovery or tunnel diodes and external microwave circuitry.

Phenomenological Benefits of UWB

There are four principals of physics at work that make UWB important to solve certain classes of communication and remote sensing problems. The principals are: scattering behavior, penetration depth, coupling of resolution and bandwidth, and interferometric patterns. These principals are tied together below in an ultra wideband implementation.

Scattering Behavior

The ratio of object size to wavelength ($\lambda$) governs the scattering off an illuminated object. Object size is characterized as being in the Rayleigh region when the object size is less than $\lambda/4$. In this case, the wave has little interaction with the object, little scattering occurs, and the scattering is not directional. The scattering amplitude is typically proportional to $f^2$ (where f is frequency). When the object size is between $\lambda/2$ and $6\lambda$, the object is characterized as being in the resonant region. Here, the scattering amplitude oscillates as the frequency is swept and can be large at the peaks. The scattered energy is generally directional, but in a few broad beams. For objects larger than $6\lambda$, the oscillatory behavior damps down and the object is said to be in the optical region. The scattered energy tends to be highly directional in a large number of beams. The amplitude on any single beam usually takes the form $F^a$ where a=−1, −0.5, 0, 0.5, or 1, depending on the object shape and the feature causing the scattering. UWB radars take advantage of their frequency spectrum and use it to estimate "a" to identify scattering mechanisms.

These three regions are important for radar and communications because as the frequency goes down, the scattering lobes become broader, and objects scatter less or stop scattering. For the radar, this phenomenology reduces clutter. For the communications system, this phenomenon reduces the density of multipath reflections, and also reduces the variance in the multipath due to the broader scattering lobes.

Penetration Depth

Penetration depth into a lossy material/media is proportional to $\lambda$. Therefore, if one wishes to detect or communicate with, for example, a bunker buried underground, very low frequencies are obligatory. Similarly, if one wishes to communicate through walls and floors, lower frequencies are more suitable than higher ones. Measurements show, for example, that attenuation through a concrete wall is roughly 10 f dB/m (f in GHz), see e.g., John Aurand, "Measurement Of Short Pulse Propagation Through Concrete Walls", Ultra-Wideband Short Pulse Electromagnetics 3, (ed. Baum et al), Plenum Press, New York, 1997 pp. 239-246, the contents of which being incorporated herein by reference. (Also, see FIG. 1.) Thus to penetrate these materials, one must use the lowest possible frequencies, but to resolve multipath reflections or image objects, the best resolution is needed. Therefore, the optimum device to communicate or image through a concrete wall, is one that operates at the lowest possible frequency, yet provides the best resolution at those low frequencies.

Bandwidth and Resolution

Time and frequency resolution are inversely coupled. Wide bandwidth is required to get fine time resolution. Inversely, long time scales are required to get high frequency resolution. Similarly, putting notches in the frequency spectrum must put time sidelobes into the time-domain waveform. The only way to get wide bandwidth, and the resulting fine time resolution, at low frequencies is to have wide relative bandwidth, an attribute of UWB.

The UWB Multipath Channel Model, or UWB Interferometric Properties

Figure 6A:
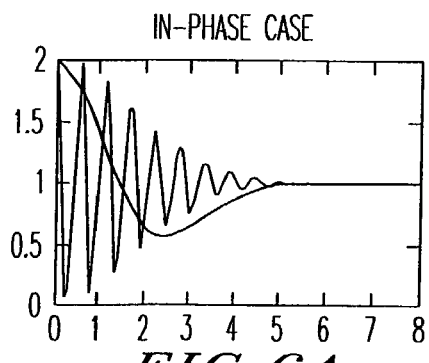
FIGS. 6A-6C are graphs comparing UWB signals and narrow band signals for in-phase overlap, out-of-phase overlap, and signal cycle waveforms of both the narrow band signal and UWB signals.
Figure 6B:
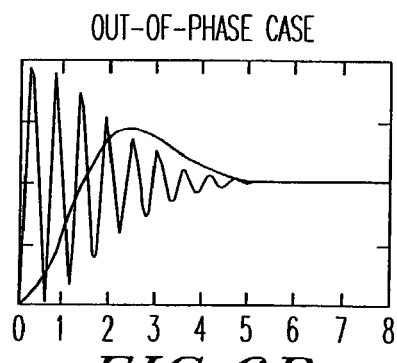
Figure 6C:
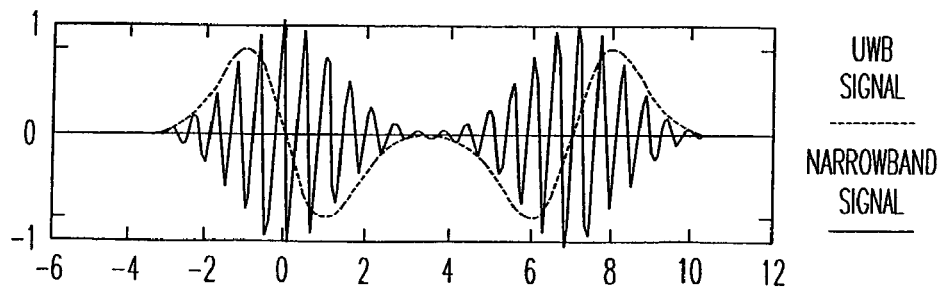

Interferometric processes begin to be ambiguous (having multiple peaks and null) when the relative bandwidth is small enough to allow multiple cycles in the (compressed/matched filtered) pulse. Again, this phenomenon gets back to the definition of UWB as being wide relative bandwidth. An interference pattern always results when two or more waveforms arrive that are time shifted less than a pulse width. FIGS. 6A-6C illustrate this phenomenon by comparing a 1 GHZ bandwidth UWB signal with a 1 GHZ bandwidth narrowband (i.e. centered at 10 GHZ) signal. FIG. 6C shows an inverted and non-inverted pulse summed, but time-shifted so that they are clearly separated. The UWB waveform is superimposed on the X-band waveform (that has many cycles). FIGS. 6A and 6B show the output of a detector as the two pulses are shifted from exactly overlapped, to not-overlapped conditions. It is clear that there are multiple fades with the narrowband signal, and that the fluctuations occur on a short time scale. By contrast, the detected UWB signal fluctuates slowly and does not have deep nulls or multiple peaks.

In communication systems, this reduced scintillation and the reduced rates of fluctuations allow a UWB system to operate with lower link margins. It also allows simpler hardware to track multiple signal paths and apply RAKE processing. In radar systems, rapid multiple fades (e.g. radar scintillation) typical of narrowband systems are largely mitigated with UWB systems multiple lobe interferometric patterns don't exist. Typical narrowband SAR (synthetic aperture radar) images, for example have speckle, see e.g., John McCorkle, "Early Results from the Army Research Laboratory Ultra Wide Bandwidth Foliage Penetration SAR," SPIE Vol. 1942, ISBN 0-8194-1178-7/93 pp 88-95 April 1992, the entire contents of which being incorporated herein by reference. Speckle is an interference pattern caused by multiple time-shifted waves that are added together. Sometimes they add in-phase giving a magnified peak, and sometimes they add out-of-phase and cancel. UWB SAR images have no speckle because the sum of single-cycle waveforms sliding in time with respect to one another never add to make multiple nulls or peaks, unless they are exactly aligned.

Radio Implementation Benefits:

How UWB Propagation Physics Affects Radio Implementation

All of the above facets of UWB propagation are recognized by the present inventors as being important to optimize a communications system built to operate inside buildings and other high clutter areas. However, there are three key issues that impact on the radio engineering when looking at in-building channel measurements and system development. They are:

1) There exist many resolvable path-lengths between a transmitter and receiver. Each of these path lengths can be used to communicate. And, because they are resolvable in time, they can be combined and used together to provide improved SNR.

2) Since a bit is represented by a pulse that does not have multiple cycles for RF energy, nothing is required to derive the "phase" of any particular multipath term. Once the peak is found, the phase is also found.

3) There is a low likelihood that multipath meets the unique conditions to cancel a UWB signal (or cause a fade) on any particular path length. There is even less likelihood that all path lengths available between a transmitter and receiver are in a deep fade simultaneously. On the contrary, there is a high likelihood that there are multiple pathlengths that provide a strong signal.

As a result of item 1) above, the present invention preferably includes one or more RAKE channels. As a result of item 2), the circuitry and processing power hardware required to implement those RAKE channels is simple because no deconvolution is needed to back out ("un-do") the channel model. Since the signal at each path-length is resolved, the channel model is provided directly without any DSP. The only processing required is the weight and sum. As a result of item 3), the inventive radio can work with a lower RF power than a narrowband radio. The worst case link margin can be much lower because the multipath nulls are not as deep. The average case link margin can be lower because the in-building propagation losses follow standard free-space $1/R^2$ curves instead of $1/R^{3.5}$ curves.

Figure 7:
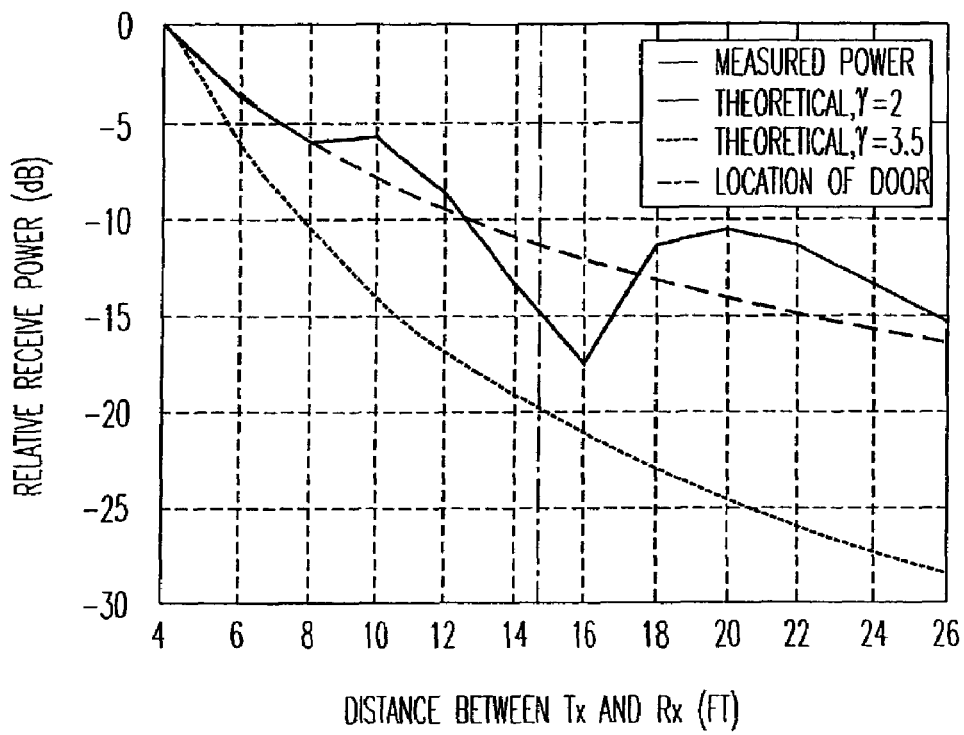
FIG. 7 is a power versus distance plot showing comparisons of receive signal power for both measured power, theoretical power and impeded theoretical power.

FIG. 7 shows a loss-versus-range measurement on the 7th floor of a 12 floor concrete/rebar office building. The transmitted signal went from one room, past a large structural concrete column surrounded by metal cabinets, a copier and a printer, then through a door (at the dotted line) and into a conference room. The transmitter was physically moved to each distance and the receiver did an acquire/track sequence. In this sequence, the receiver picked up the best (i.e. biggest signal) path and begins communicating. FIG. 7 simply plots the received power level versus range, as measured by the A/D converter used to make bit decisions.

The difference between this plot and that of a narrowband system is remarkable. The same plot for a 2.4 GHZ in-building system shows deep fades randomly spaced just inches apart. Narrowband systems experience fast fades and peaks as the receiver is moved around because it is operating in an interferometric field of unresolved multipath. Designers can resort to multiple antennas in order to add degrees of freedom, but at the expense of a much more complicated radio. The 2.4 GHZ in-building channel is typically modeled as having an average received power versus range proportional to $1/R^{3.5}$ to approximately account for multipath fading (FIG. 7 includes lines for $1/R^{3.5}$ and standard free-space $1/R^2$ for reference.) By contrast, the present inventive UWB system demonstrates a smooth path-loss function because it can nearly always find a time-slot, or path, where the direct path is clear or multipath signals are adding in phase.

There are two remarkable observations. The first is that the average path loss is not worst than $1/R^2$ but is actually better. It is more likely that a random transceiver placement has less loss than $1/R^2$ than worse. The second is that even where there is a dip in received power, it is not deep (only a few dB). Because of these characteristics, a radio embodying the invention can operate with less power and be more robust than a narrowband radio.

Figure 8:
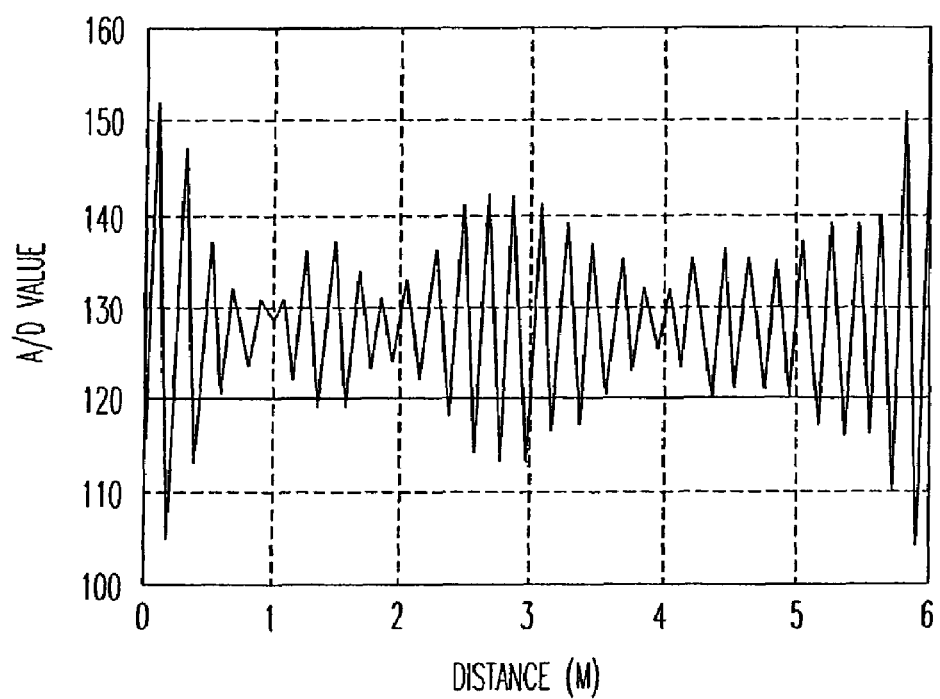
FIG. 8 is a signal level versus distance plot for a particular UWB transmission according to the present invention so as to illustrate a "sounding" of a particular channel.
Figure 9A:
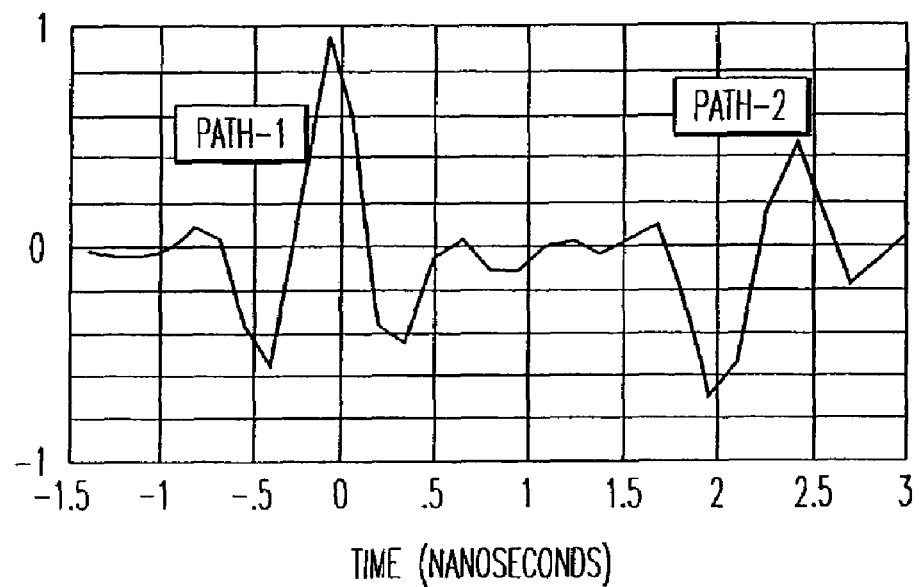
FIG. 9A is an amplitude versus time waveform of a signal that is able to be resolved by a UWB signal according to the present invention, in view of a channel that imparts multipath.
Figure 9B:
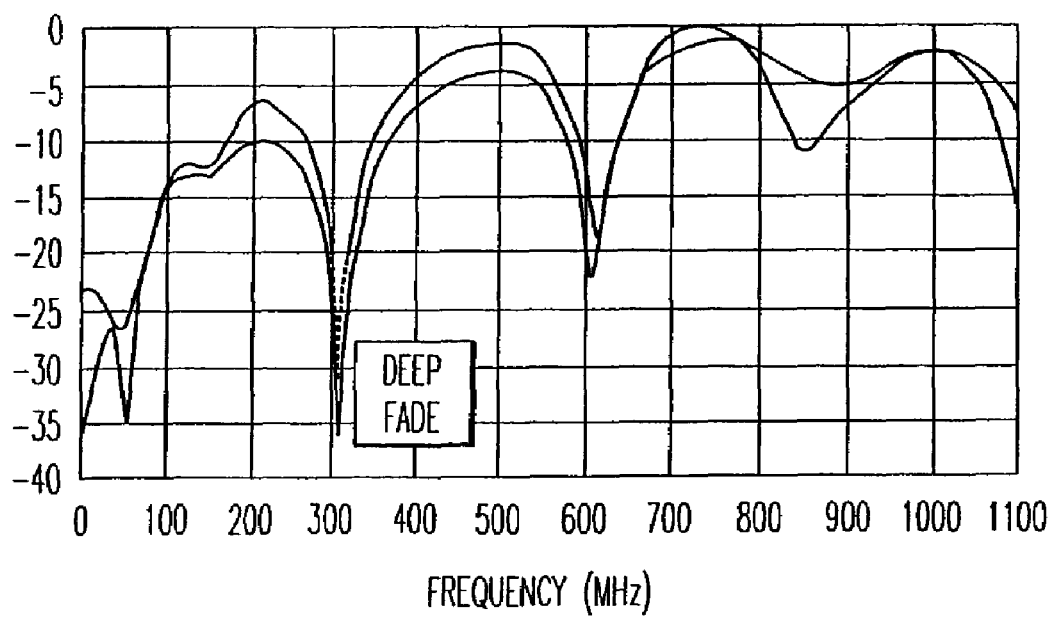
FIG. 9B is a signal level versus frequency plot of a multipath induced fading channel for convention "conventional narrowband" communication system.

FIG. 8 is a channel sounding as performed by an implementation of the present invention with all filters installed. The x-axis is referenced to the largest signal, shown at x=0. The distance on the x-axis indicates an offset-distance for an alternative path length (from x=0). Since the x-axis wraps, 5 m could also be −1 m. The A/D values indicate the strength of the signal at the given path length. A/D values below 128 are negative, indicating the pulse has been inverted. A/D values above 128 are positive indicating the pulse has not been inverted. Typically if the signal bounces an even number of times in the path, the signal will not be inverted, but if it bounces an odd number of times, the signal will be inverted. It is clear that there are multiple paths with very usable signals, particularly the one at x=0 and the one at about x=2.8. The oscillations are due to the filtering applied to null particular frequencies. When the system is run without filters, the channel appears more spiky. While adding filters does degrade the robustness to multipath, it is more than made up for in the immunity to strong RF interference (RFI). These two plots clearly show that an embodiment of the present invention provides performance advantages unavailable by other approaches because it takes advantage of all four of the previously described principals of physics. FIG. 9A shows how a receiver according to the present invention can resolve multiple paths of a multipath signal. FIG. 9B shows that narrowband signals deep fades when experiencing multipath.

Dynamic Range

One embodiment of the present invention may use an 8-bit TLV5580 A/D. There are several issues that affect dynamic range requirements. (1) The RFI levels observed are reasonably constant, typically varying only +/−3 dB over an afternoon and over a typical office space area. So this is not as wildly varying as one might think. It is Gaussian, but not white. (2) A 2.4 GHz microwave oven or other tone must compete with noise from the whole 2 GHz receiver bandwidth. There is, therefore, less sensitivity than one might expect. (3) An RFI embodiment of the present invention notches the key interference sources in both analog and digital domains. Simulations with UWB radar showing 20 dB of RFI power extraction on 8-bit A/D values, were improved to 36 dB with 32-bit floating point values. So it is known that A/D dynamic range has more advantages than simple modeling.

Interference Mitigation & Notch Filters A feature of the present invention is a use of notch mechanisms is a receiver front-end that allow a 900 MHZ and 1.8 GHZ cell phone to operate within one foot of the receive antenna without affecting the communication range and BER. One embodiment is to use an active stub that creates ab impulse response matured to a time modulated UWB pulse and a time delayed inverse thereof according to the present invention, but self-cancels multi-period signals. Other functionally equivalent circuits that implement the notch operation, adaptively or statically, may be used as well. The present invention employs analog and digital interference mitigation approaches. These notch mechanisms can be applied to the transmitted waveform in order to prevent interference to GPS receivers. The transmitted waveform would be affected by this mechanism, yet with very little degradation the system performance, as was the case with the receiver filters.

The present communication system is a departure from conventional narrower band transmission systems (including conventional speed spectrum systems) in that it uses base combines code placement of time shifted and inverted replicas of short RF wavelets rather than a modulated carrier.

Figure 10:
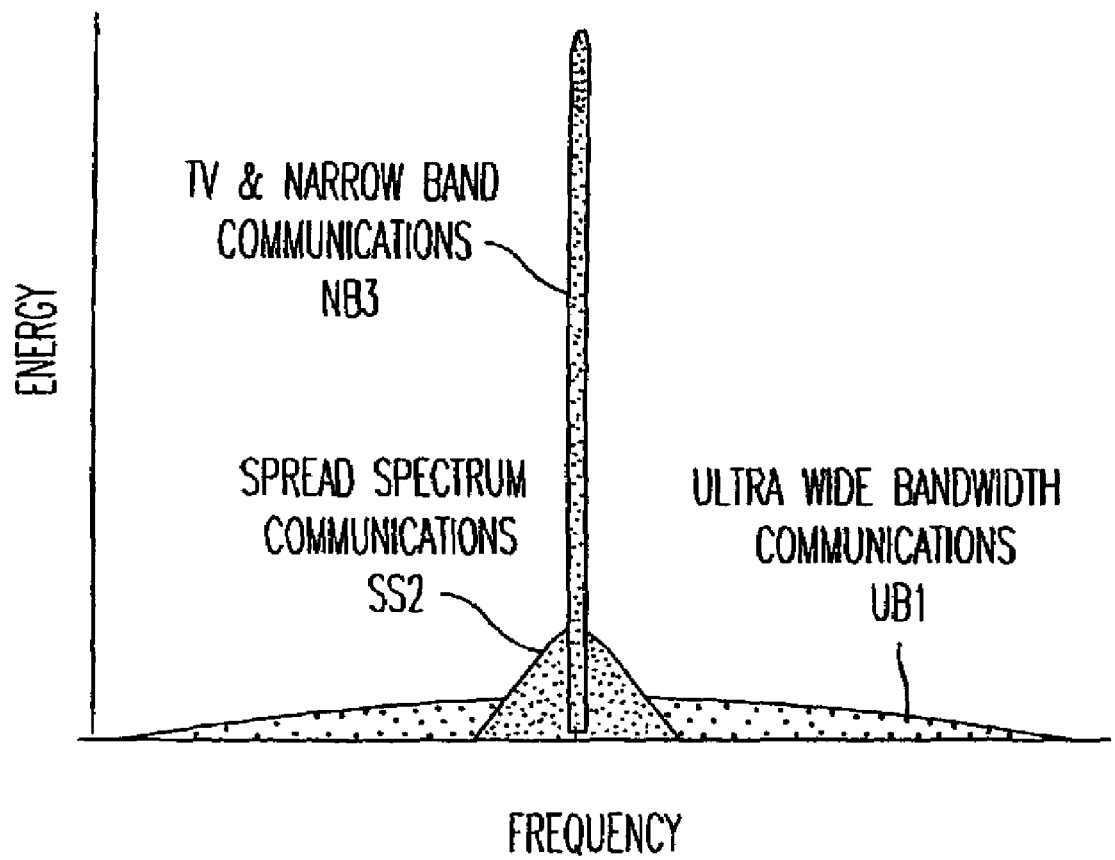
FIG. 10 is an exemplary energy versus frequency plot comparing the respective bandwidth of a narrowband signal, a convention spread spectrum communication and a UWB communication spectrum according to the present invention.

FIG. 10 shows generally, a frequency versus energy plot, which compares UWB spectrums versus that of conventional narrow band and Spread Spectrum communication signals. Conventional narrow band communication signal NB3 occupies relatively small spectral bandwidth, perhaps 6 MHZ, while Spread Spectrum communication signal SS2 occupies a broader bandwidth with a smaller spectral density. The UWB signal UB1 occupies a much greater bandwidth while even having a smaller spectral energy density than that of either the SS2 or NB3. As compared to other pulsed waveform systems, the UWB signal of the present invention is innovative because it exploits wavelet shape, orientation and grouping to create the transmit waveform. This feature allows the system to smoothly vary the peak to average power ratios of both the spectrum and the time domain waveforms and to generate larger collections of codes used to encode the various baseband signals.

Figure 11:
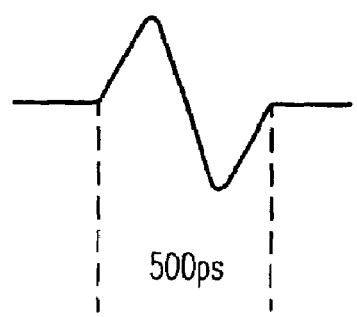
FIG. 11 is an exemplary bi-phase signal that is a type of waveform for communicating information according to the present invention.

Typical pulse durations according to the present invention are on the order of 100 to 1000 picoseconds with bandwidths of roughly 8 GHZ to 1 GHZ respectively. Of course, much greater ranges of values may be supported as well. FIG. 11 shows a typical bi-phase pulse according to the present invention as having a 500 ps duration. The pulse in FIG. 11 is not a sign wave, but rather a discrete time-domain signal, that is not periodic. These discrete pulses are, however, sent at millions of pulses per second.

Figure 12A:
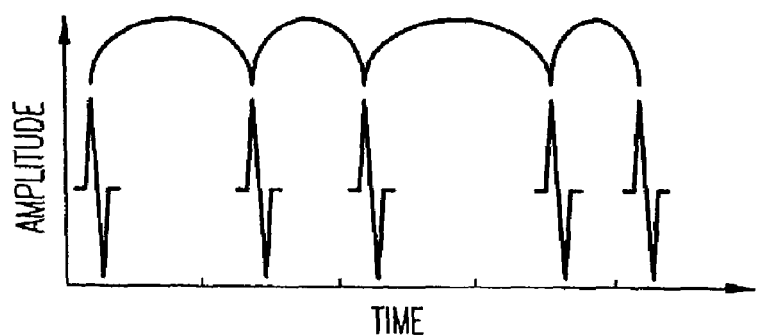
FIG. 12A is an amplitude versus time plot showing how positioning of sequences of signal wavelengths according to the present invention may be arranged so as to provide an ordered sequence of pulses as part of a symbol set according to the present invention.
Figure 12B:
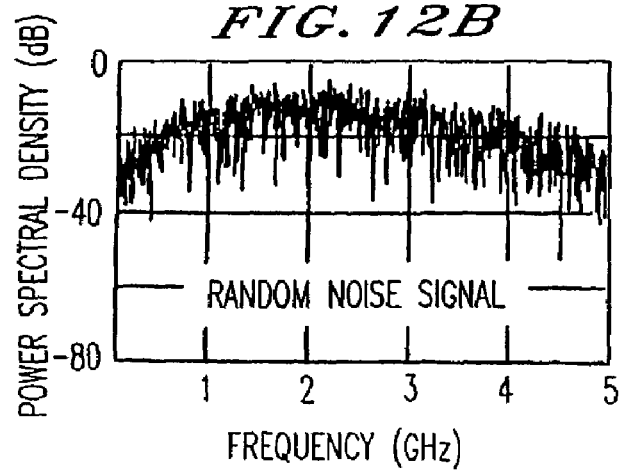
FIG. 12B is a power spectral density versus frequency plot of a random noise signal experienced according to the present invention.

FIG. 12A is a time-domain graph of a randomized time coding of signal pulses, where the time code itself is made to look noise-like. The corresponding power spectrum of the time-domain signaling sequence shown in FIG. 12A, is shown in FIG. 12B. As can be seen, the spectral density of the transmitted signal is spread over approximately 5 GHZ and thus has very low power spectral density thus not presenting an interference source for conventional narrow band transmission systems. In this way, the UWB system of the present invention may be used at the same time as a narrowband signal without having any noticeable, negative effect on the narrowband system. The combination of short duration pulses and the coding techniques used spread the signal energy over such a broad frequency band that little energy appears in any narrowband user's band. The result is that the UWB transmitted signal is below the detection threshold of conventional narrowband receivers.

The present inventive system makes it practical to transmit information at very high data rates through various obstructions, walls, tunnels, buildings, and other obstructions using signals with high enough spatial resolution to resolve the obstructions that lead to multipath fading in conventional systems.

Figure 13A:
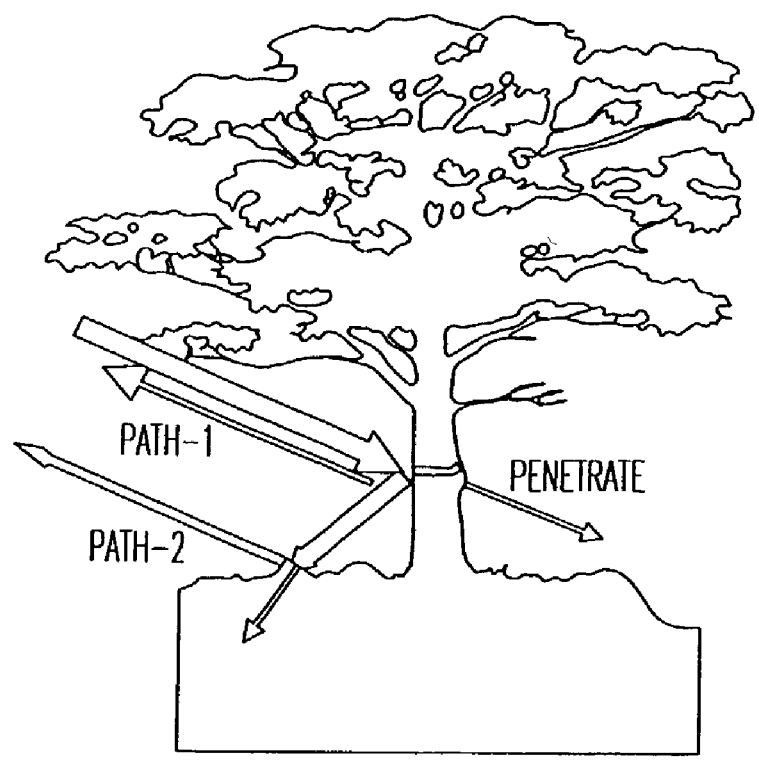
FIG. 13A is a graph showing how an obstacle in a communication path can create a multipath reflection.
Figure 13B:
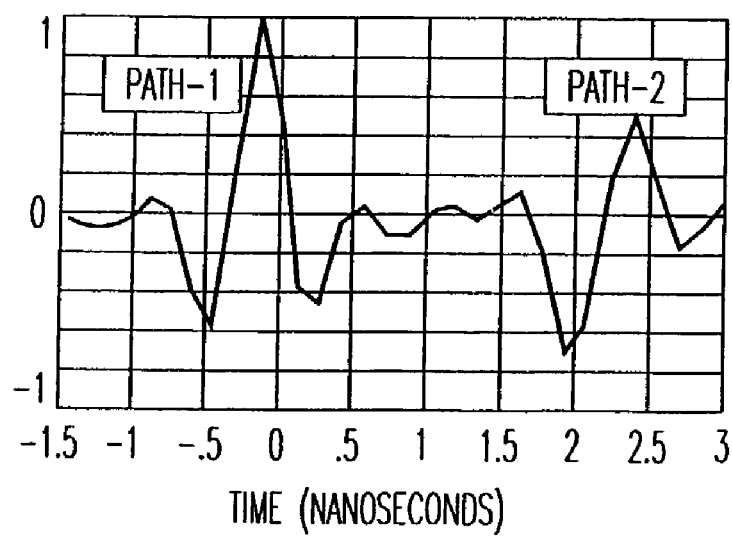
FIG. 13B shows an example of a time waveform that may be experienced with the multipath created from this scenario in FIG. 13A.

Multipath occurs when time delayed and attenuated copies of the transmitted waveform arrive at the receiver simultaneously. FIG. 13A shows an example of how some radio waves are reflected and other penetrate various obstacles, such as a tree, to create a multipath effect. As shown in FIG. 13A, a signal interacts with a tree, where a direct return path (path-1) is reflected at a certain magnitude (shown in FIG. 13B as path-1), and another reflection path (path-2) shown in FIG. 13B to be delayed in time with respect to path-1, and inverted in phase with respect to the signal provided by path-1. In urban environments this is due in large part to reflection and transmission of architectural features, e.g. walls, floors, ceilings, and windows.

When the range resolution of the receiver is large compared to the multipath differences, constructive and destructive interference occurs which reduces system performance. This is multipath fading. If, on the other hand, multipath components are resolved by the receiver as is the case with the present invention, then no interference occurs, and the multipath components can be used to improve system performance.

The range resolution of the receiver is roughly inverse to the bandwidth of the transmit signal. So, 10 MHZ systems have a range resolution of $$R_{res} = \frac{c}{BW} = \frac{3 \times 10^8 \text{ m/sec}}{10 \text{ MHz}} = 30 \text{ m} \tag{26}$$

likewise, a 100 MHz system has 3 meter (10 foot) resolution, and a 1 GHz system has resolution on the order of 0.3 meters (1 foot). Since architectural features (walls, floors, etc.) are separated by distances that are on the order of 10 feet, systems that resolve them well require resolution that is order of 1 foot.

The pulse codes employed by the present inventive system are composed of bi-phase modulated and time shifted replicas of an underlying short wavelet pulse. The receiver compresses the transmitted pulse code using a matched filter (correlation processing). The width of the compressed pulse that results is nominally that of a single pulse. This gives a radio according to the present invention spatial resolution that is on the order of one foot—sufficient to avoid the negative effects of multipath, and to allow time domain rake processing.

Figure 14:
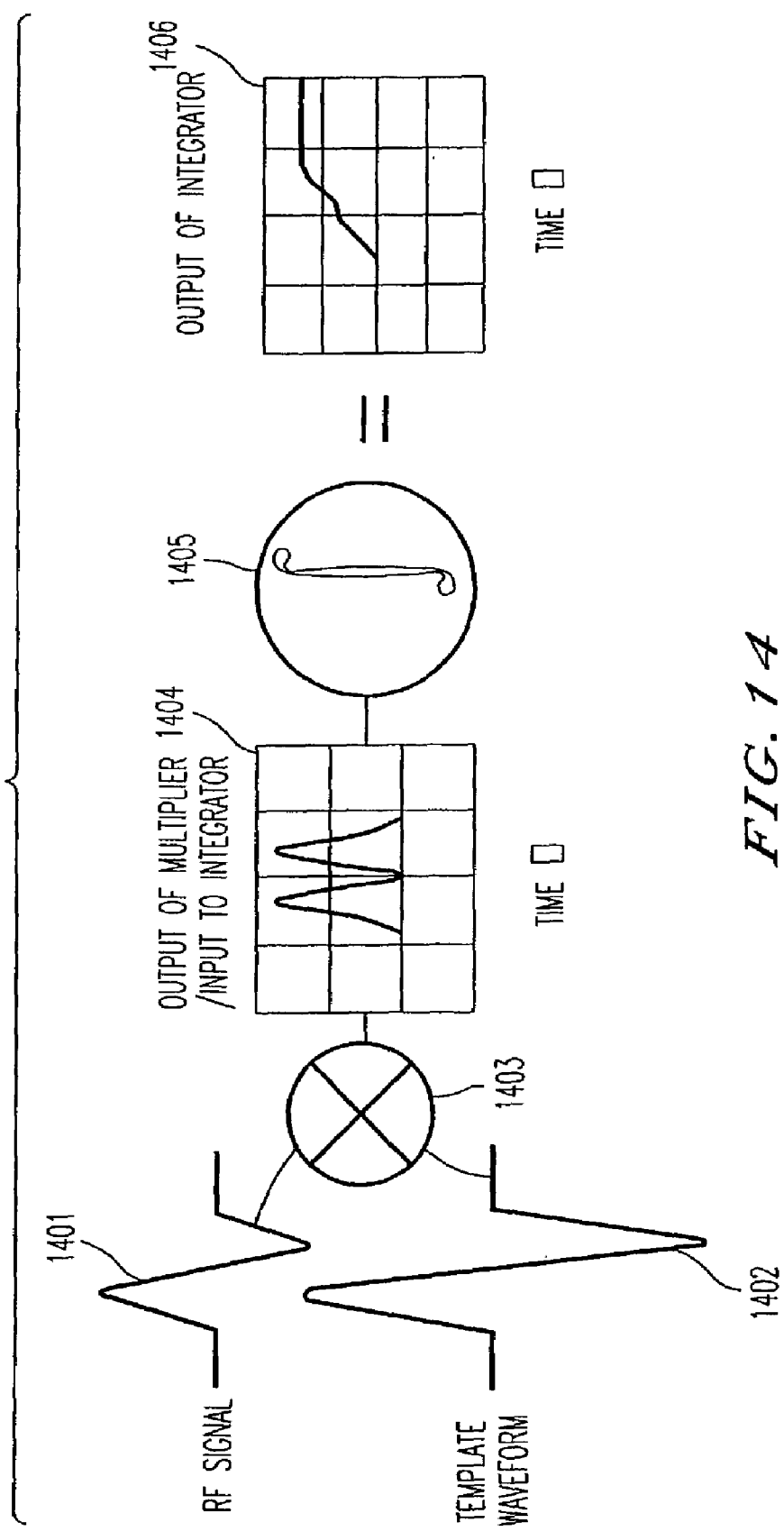
FIG. 14 illustrates a detection circuit that may be implemented according to the present invention.

A cross-correlation filtering operation employed by the present invention, as one example, is illustrated in FIG. 14. A bi-phase template waveform 1402 is saved in memory, or is even reproduced directly at a receiver for being mixed by a mixer 1403 with an incoming RF signal 1401. Since the form of the different time-domain wave shapes are known, and held in a fixed alphabet (perhaps only two shapes in a binary system or four shapes in a two bit per channel symbol). For example, in a binary communications scheme, using the bi-phase communication architecture of the present invention, a "1" will be represented by a bi-phase pulse at a particular phase setting, while a "0" would be represented also by a pulse of a same shape, but opposite phase (or orientation) as the pulse used to represent the "1". A greater number of phases and amplitudes may be used as well, so as to provide a greater number of bits per channel symbol much like the case with QPSK or M-ARY signaling.

The output of the mixer 1403, provides an output signal 1404, which may then be passed to an integrator 1405 which accumulates the overlapping energies. The output of the integrator 1406 may then be used by a detection circuit to determine whether a 1 or 0 was sent (or greater amounts of data if multilevel signaling is used).

Figure 15:
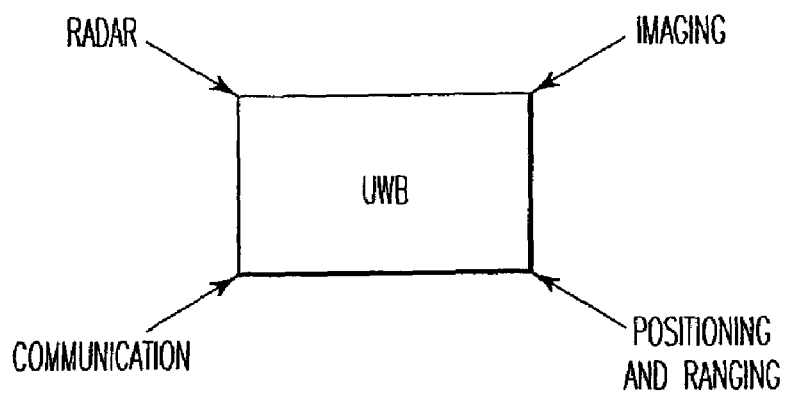
FIG. 15 is an illustration showing how the time modulation employed by the present invention fuses four different functions.

A feature of the present invention is that it is able to use coherent pulse integration so that energy from adjacent pulses may be accumulated to provide additional processing gain thus permitting relatively small energy densities for still powerful communication links. Moreover, by encoding a particular symbol to be sent into a predetermined number of pulses provides an ability to incorporate processing gain into the signal since the redundancy in the number of pulses representing a single bit may be recaptured, coherently, at the receiver. For example, for a 10 Mbps system that transmits 10 Kbps, one data bit is spread over 1,000 pulses. This provides a 30 dB of additional processing gain (10 log 1000). Accordingly, the total processing gain is a result of a summation of the gain as a result of the duty cycle, the repetition of symbols, as well as the pulse integration gain. In this example, the result in a total processing gain of 53 dB, for 23 dB of duty cycle gain is achieved with 30 dB of pulse integration gain. As a consequence, it is possible to employ time modulated UWB according to the present invention to converge both communication signals, radar applications, positioning applications as well as imaging systems, as shown in FIG. 15.

Below, is a short review of time and frequency domain issues related to an embodiment of the present UWB communication system.

A waveform with good bandwidth and derivative properties is a Gaussian monocycle, which is formulated by taking the first derivative of a Gaussian waveform. The Gaussian monocycle has the form of a ramp with a Gaussian envelope $$s(t) = t e^{-kt^2}. \tag{27}$$

Figure 16:
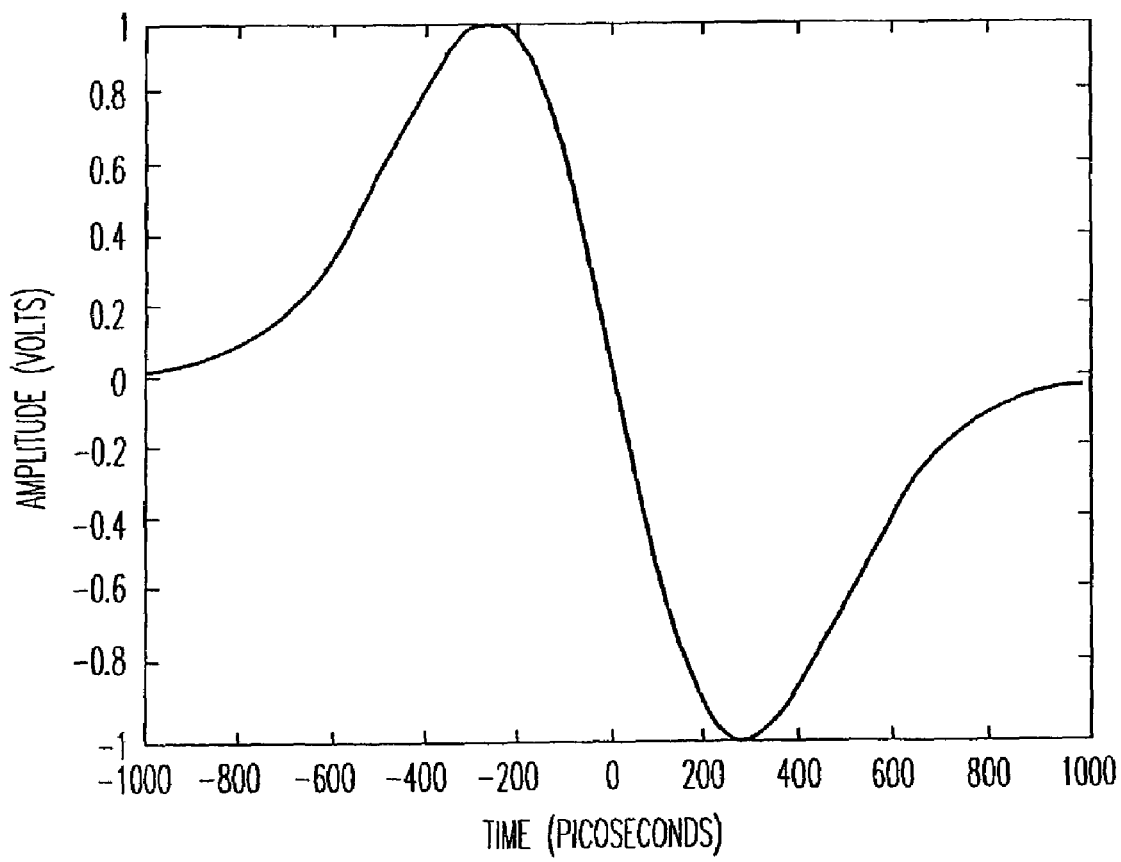
FIG. 16 is an amplitude versus time graph of a bi-phase pulse employed by the present invention.

The pulse's duration is a function of the constant k, which controls the rate of decay of the Gaussian envelope. FIG. 16 illustrates a case where the constant k has been selected to generate a pulse duration of roughly 1.5 nanoseconds. Equations (29) to (31) relate the pulse duration to bandwidth.

While a first derivative of a Gaussian as shown, other wavelets may be used as well, including a single, zero-mean impulsive waveform. Furthermore, the impulsive waveform shape may be modulated so as to include summed combinations of two master wavelets, where the master wavelets are orthogonal wavelets. One of the master wavelets is an even derivative of a Gaussian-shaped pulse while the second master wavelet being an odd derivative of the Gaussian-shaped pulse.

Circuits for generating these signals include: avalanche transistors; step recovery diodes (SRD) in comb filter circuits; and high speed logic and transistors. In an exemplary embodiment, the present system uses a pulse forming network of high speed discrete logic together with signal conditioning. For example, the logic may be implemented in CMOS, perhaps in a single chip.

Frequency Domain Representation

An important property of UWB signals is the relationship between pulse duration and bandwidth. In general, the narrower a pulse is made in time, the broader the frequency band over which its energy is spread. Thus, if an energy per Hertz is fixed, wider bandwidth pulses transmit more energy than narrower ones. From this perspective, being shorter in time is always better. Other criteria effecting the selection of pulse duration include the propagation properties of the band that results. In general, the lower frequencies, HF (3-30 MHz), VHF (30-300 MHz), and UHF (300-1000 MHz) have been shown to have superior materials (building and foliage) penetration relative to higher frequency bands. A good compromise for in-building operation is to span the VHF and UHF bands. This represents a trade-off of energy spreading against the propagation model and engineering feasibility.

To tie pulse duration to bandwidth, consider the Gaussian monocycle of (26). Its frequency domain representation is also Gaussian, and is given by $$S(\omega) = \frac{\omega}{2k} \sqrt{\frac{\pi}{k}} e^{-\frac{\omega^2}{4k}}. \tag{28}$$

Figure 17:
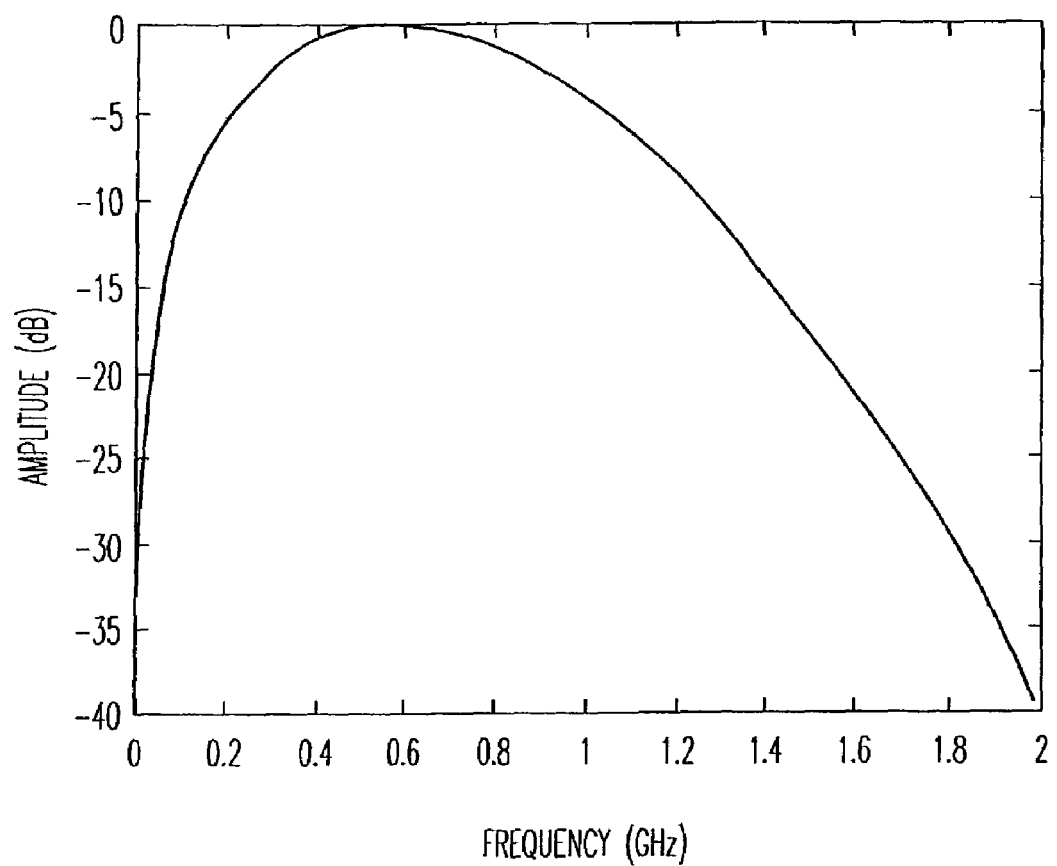
FIG. 17 is a frequency plot of a signal employed by the present invention.

The spectrum of a 1 GHZ Gaussian monocycle that spans the VHF and UHF bands is shown in FIG. 17. The time duration and bandwidth are both controlled by parameter k. The operating frequency is best described by the peak of the power spectrum which is $$\omega_{max} = \sqrt{2k}, f_{max} = \frac{\omega_{max}}{2\pi}. \tag{29}$$

The bandwidth is determined by the upper and lower frequencies to the 6 dB down (−6 dB) power levels $$f_{lo} = 0.3191057 \, f_{max}$$

$$f_{hi} = 1.9216229 \, f_{max} \tag{30}$$

and the center frequency is $$f_c = \frac{f_{lo} + f_{hi}}{2} = 1.12 f_{max}. \tag{31}$$

If $\sqrt{k} = 2.5 \times 10^9$, then $f_{max} = 560$ MHz, the bandwidth is 1 GHZ, and the pulse duration is 1.5 nanoseconds. Typical of UWB signals, the power is spread over a band greater than 100% of the operating frequency.

Codes for Integration and Channelization

The transceivers of the present invention use pulse codes for integration gain, channelization, whitening, and notch filtering. The pulse coded transmit signal is formed from shifted (time hopped) and inverted (bi-phase) copies of the underlying ultra wideband short pulse.

The time shifts and phase inversions are implemented with a combination of analog and digital circuitry: fixed and programmable delays; phase inverters (hybrid tees); splitters and combiners; GaAs switches; and digital circuits to generate control.

A template for a bi-phase-time hopped code h(t) can be written as a sum of weighted and shifted impulses as $$h(t) = \sum_{n=0}^{N_c-1} h_n \delta(t - T_n), \quad (32)$$

where, $T_n$ is the relative position of chip n, $N_c$ is the length of the code, and the coefficients of the code are $h_n \in \{-1, 1\}$ for bi-phase (antipodal) operation. The frequency domain representation of the code h(t) is $$H(\omega) = \sum_{n=0}^{N_c-1} \int_{-\infty}^{\infty} h_n \delta(t - T_n) e^{-j\omega t} dt \quad (33)$$

$$= \sum_{n=0}^{N_c-1} h_n e^{-j\omega T_n}$$

The pulse code is formed from the short pulse in Equation (27) and the code template in Equation (32) as $$p(t) = s(t) \cdot h(t) \quad (34)$$

$$= s(t) \cdot \sum_{n=0}^{N_c-1} h_n \delta(t - T_n)$$

$$= \int_{-\infty}^{\infty} s(\tau) \sum_{n=0}^{N_c-1} h_n \delta(t - T_n - \tau)$$

$$= \sum_{n=0}^{N_c-1} h_n \int_{-\infty}^{\infty} s(\tau) \delta(t - T_n - \tau) d\tau$$

$$= \sum_{n=0}^{N_c-1} h_n S(t - T_n)$$

a collection of shifted and inverted (weighted ±1) replicas of the underlying pulse. The frequency domain representation of the pulse code shown in equation (34) is $$P(\omega) = H(\omega) \cdot S(\omega) \quad (35)$$

If the data are treated as a set of equispaced impulses, they have the time and frequency domain representations $$d(t) = \sum_{k=0}^{N_d-1} d_k \delta(t - kT_c) \quad (36)$$

$$D(\omega) = \sum_{k=0}^{N_d-1} d_k e^{-j\omega k T_c}$$

$$d_k = \in \{-1, 1\}$$

Temporarily restricting the system to only bi-phase modulation of the pulse code in equation (34), the transmit signal is $$x(t) = d(t) \cdot h(t) \cdot s(t) \quad (37)$$

$$= \sum_{k=0}^{N_d-1} d_k p(t - kT_c)$$

-continued $$= \sum_{k=0}^{N_d-1} \sum_{n=0}^{N_c-1} d_k h_n s(t - T_n - kT_c)$$

which has the spectrum $$X(\omega) = D(\omega) \cdot P(\omega) \quad (38)$$

$$= D(\omega) \cdot H(\omega) \cdot S(\omega)$$

If the data are assumed white, or whitened by preprocessing, then the spectrum of the transmit waveform is that of the coded pulse of Equation (34). Proper selection of the delays and weights of the pulse code preserve the pulse's spectrum and bandwidth, leading to a transmit waveform that is essentially that of the short pulse in Equation (27). That is, the spectrum is nominally white across the operational bandwidth.

A UWB receiver employed by the present invention is faced with transceiver clocks that are not synchronized; transceiver codes that are not synchronized; and clocks are that either not exactly at the same frequency, or drift apart as a function of time, temperature, and relative position. The problem of synchronizing the transceiver clocks amounts to finding the unknown time delay that corresponds to the maximum of the correlation. Correlation peaks are a preferable observation venue because the present invention uses a time modulated signal and a correlation detector. Since the time modulation pulses are narrow in time, the observed correlation peak is very narrow. As presently observed, this narrowness gives the UWB communications system of the present invention the ability to operate in the midst of multipath, because the multipath can be resolved.

By using a correlation receiver with time modulated, coded sequence of pulses, the use of multipath and the ability to resolve the different multipaths, provide an opportunity for obtaining improved performance over other UWB systems and narrowband systems generally. The improvement may be thought of as coherently combining the information from multiple signal paths so that the energy from the multiple signal paths combine with one another.

Sliding Correlator DLL (Delay Locked Loop)

The entire correlation function is not typically performed on a single sequence. Accordingly, single terms of the correlation function may be formed and then slid in time sequence, thus implement a sliding correlator. This sliding correlator is used for clock acquisition, clock tracking, data detection, and to scan for a location of a highest signal. This location changes dynamically due to objects moving in the environment, or to motion between the transmitter and receiver, as in mobile applications. A sliding correlator forms inner products—signal multiplication (mixing) followed by integration—of the received signal and the local code at different relative time delays.

One method of clock acquisition (determining the unknown delay) is to increment the time delay through a code length, while looking for the inner product with the largest absolute value. Once the delay is selected, the sign and magnitude of the inner product are used for the bit detection statistic. Clock tracking is implemented with a delay locked loop (DLL). Because the correlation is symmetric, the receiver can use the difference between a leading and lagging inner product to track the transmit clock. When the receiver is synchronized, the difference goes to zero. Otherwise, the difference is positive or negative depending on whether the timing is leading or lagging.

Radio Frequency Interference

Figure 19A:
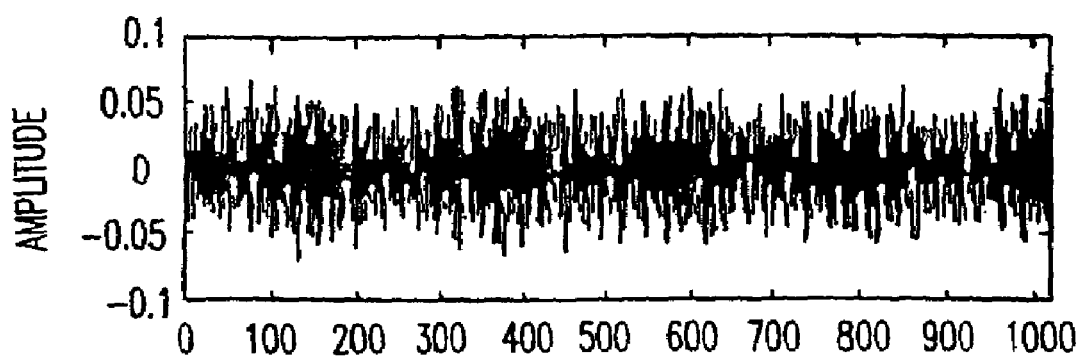
FIGS. 19A and 19B show a time domain signal before and after radio frequency interference (RFI) extraction is performed according to the present invention.
Figure 19B:
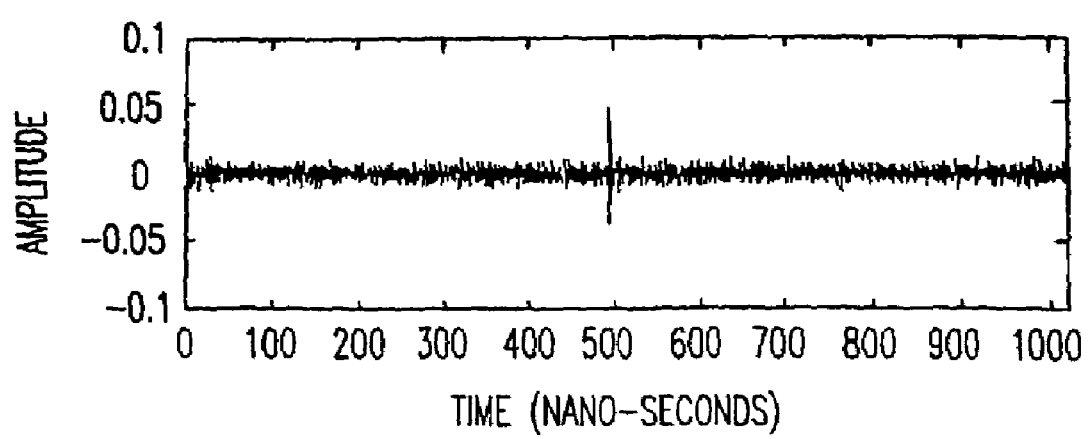

From the perspective of UWB systems, narrowband interference dominates the noise in urban environments. Because the UWB signal is "short in time" and "long in frequency" it is highly distinguishable from conventional narrowband signals which are "long in time" and "short in frequency". FIG. 18 illustrates the power spectral density at an Alexandria, Va. laboratory. The differences between these signal types are exploited to develop RFI extraction (radio frequency interference) algorithms to improve UWB transmissions. FIGS. 19A and 19B illustrate the results of the developed RFI extraction algorithm on collected data. Once again RFI extraction may be performed with a radio-front end that exhibits an impulse response matched to a transmitted wavelet in combination with an inverted and time-shifted copy of the wavelet.

Figure 20:
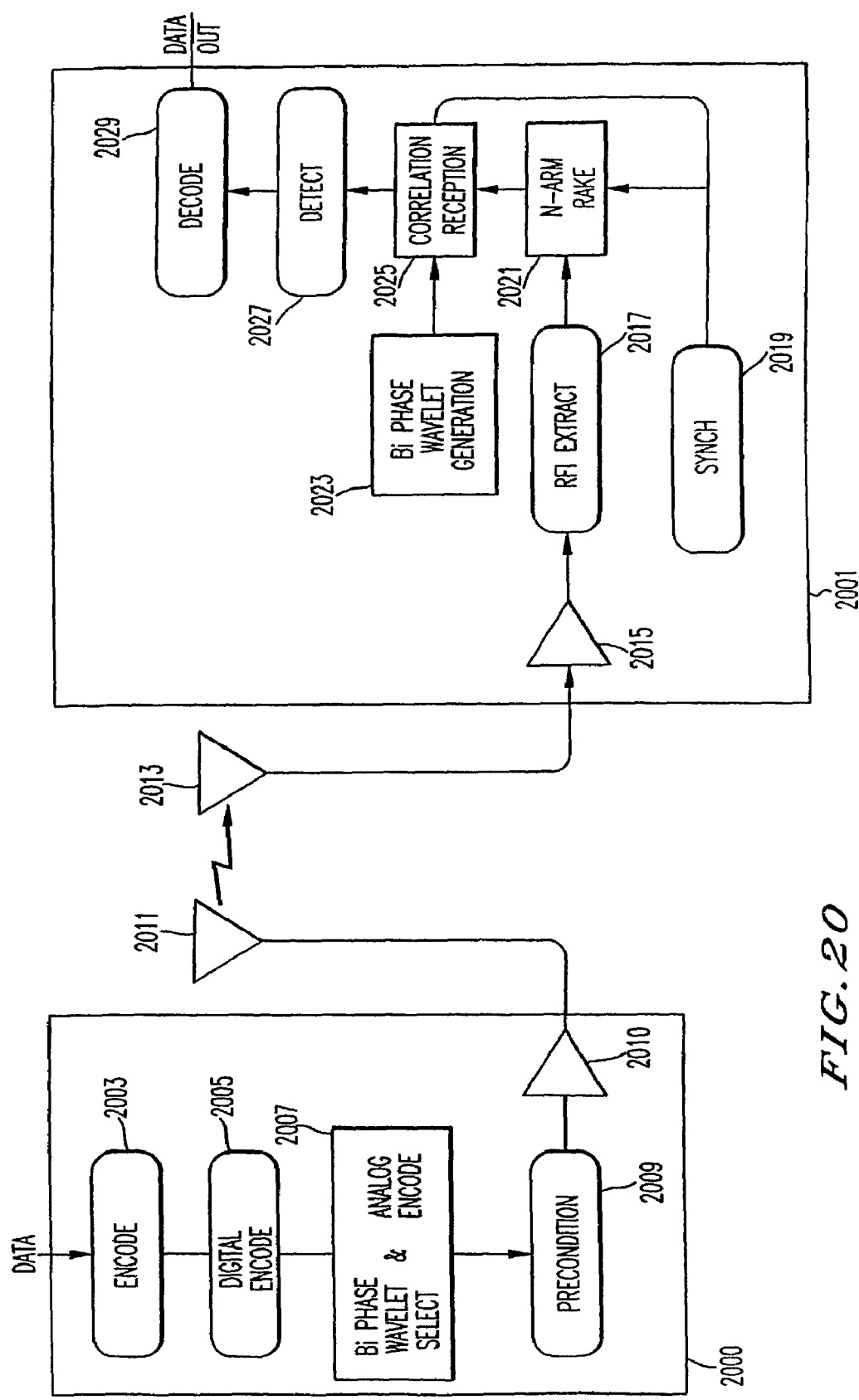
FIG. 20 is a block diagram of a UWB bi-phase communication system according to the present invention.

FIG. 20 is a block diagram of a bi-phase ultra wide band transmitter 2000 that communicates a bi-phase time-modulated UWB signal to a bi-phase time-modulated coherent receiver 2001, according to the present invention. Transmitter 2000 receives data and performs a source and channel encoding operation on the data in encoder 2003. In encoder 2003 the raw source data is optionally reduced in its redundancy using conventional source encoding techniques, and also performs channel encoding so as to provide forward error correction and other source encoding schemes such as differential encoding so as to improve signal performance for the data sent over the wireless communication link. Output of the encoder 2003 is provided to a digital encoder 2005, which produces a length and digital code that encodes the data provided from encoder 2003 with a particular user code for an individual user or service. The length and code type may be typical codes such as those used in CDMA systems for example such as a Walsh-Hadammurd sequence. The output of the digital encoder 2005 is provided to a bi-phase wavelet selector and analog encoder 2007. The selector and encoder 2007 maps the respective outputs from the digital encoder 2005 into a particular analog encoded time-sequence of wavelets. The bi-phase wavelet selector may select different wavelets from candidate sets of wavelets, such as the positive and negative Gaussian wavelets previously discussed. Also, higher level signaling may be used so that an array of signaling schemes with larger numbers of wavelets per group may be used as well. The analog encoder distributes in time the bi-phase wavelets previously selected in the wavelet selector. The output of the selector and encoder 2007 is provided to preconditioning circuitry 2009 which can pass filters and cleans a signal prior to amplification 2010 and transmission by way of a transmit antenna 2011, such as that described in U.S. application Ser. No. 09/563,292, now issued as U.S. Pat. No. 6,351,246.

Receiver 2001 receives the ultra wide band transmission signal 2013 from the transmitter 2000. Energy coupled into the antenna 2013 (which may also be one of the antennas discussed above) is coupled into low noise amplifier 2015 before being exposed to the radio frequency interference RFI extractor 2017. RFI extractor reduces the effect of narrow band noise prior to performing the correlation and detection operation. The output of the RFI extractor 2017 is provided to a RAKE 2021 that includes n-arms. The RAKE receives synchronization information from synchronizer 2019 and provides an output to correlator 2025. Correlation reception is provided in correlator 2025 by correlating the output of the RAKE 2021 with a bi-phase wavelet generator 2023. When the correlation peak is detected, the output is provided to a detector 2027 where individual symbols may be identified and then passed to a decoder 2029 before the data is output. The RAKE 2021 includes at least one arm per received multipath component, plus an optional search channel for adaptively choosing an optimum set of multipath components.

A block diagram of the transmitter 2000 is shown in FIG. 1. Its function is to generate the waveform of equation (37), which was $$x(t) = d(t) \cdot h(t) \cdot s(t) \quad (39)$$

$$= \left(\sum_{k=0}^{N_d-1} d_k \delta(t - kT_c)\right) \cdot \left(\sum_{n=0}^{N_c-1} h_n \delta(t - T_n)\right) \cdot s(t)$$

$$= \sum_{k=0}^{N_d-1} \sum_{n=0}^{N_c-1} d_k h_n s(t - T_n - kT_c)$$

In this formulation, the transmit waveform is defined as the convolution of the data stream d(t) with the code h(t), and the underlying pulse s(t).

Figure 23:
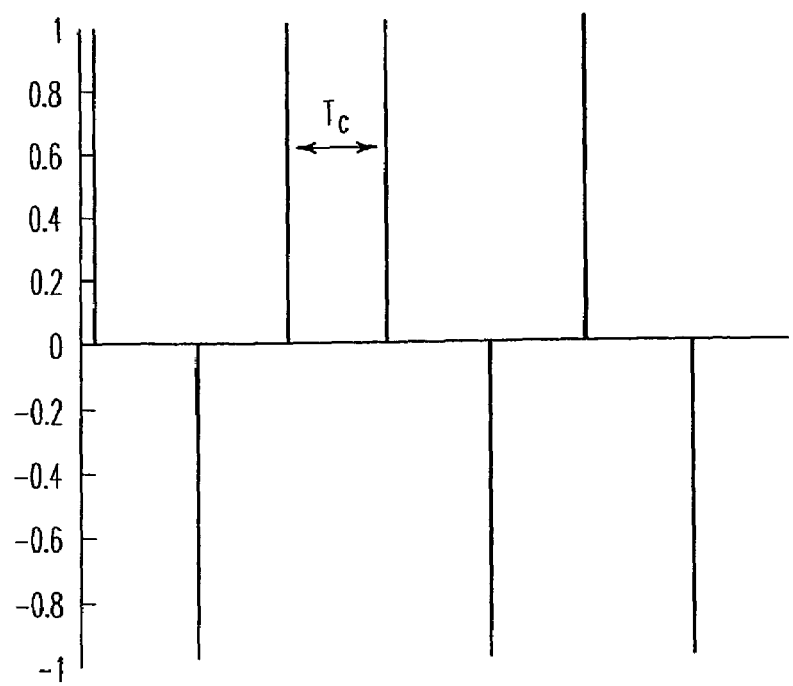
FIG. 23 is a time plot showing an example data stream to be convolved with a wavelet function and code stream according to the transmitter of the present invention.

The transmitter receives data from data input 115. Mathematically, the binary data d(t) are represented by a stream of equispaced impulses, one per data bit, indexed by k. FIG. 23 is an example for the data $d_k$=[1, 0, 1, 1, 0, 1, 0], as a stream of positive and negative going impulses, one per data bit, where the mapping $\{0,1\} \to \{-1,1\}$ has been applied.

In the present embodiment, there are two conditions placed on the data. The first condition is that the data is pre-whitened, or scrambled so as to be uncorrelated. This means that the data has been processed such that its spectrum is nominally flat (i.e, white). The reason for applying this constraint is that, by the convolution theorem, the spectrum of the transmit signal (38) is the product of the spectrums of the pulse S(ω), the code H(ω), and the data D(ω). That is, $$X(\omega) = D(\omega) \cdot H(\omega) \cdot S(\omega) \quad (40)$$

Since the code and the pulse are both generated by the transmitter 2000 such that H(ω) and S(ω) are nominally flat over the bandwidth of the system, the spectrum of the output will resemble the spectrum of the data. That is, if the spectrum of the data is white over some interval, then the output will be white over that interval. Consider that if the data were constant, say all ones, then d(t) would be a train of unit impulses $T_c$ periodic, resulting in line spectra at frequency bins spaced by $f_c=1/T_c$, all the transmit energy would be concentrated at multiples of $f_c$, and the outcome would be interference with any narrowband user at those frequencies.

Figure 21:
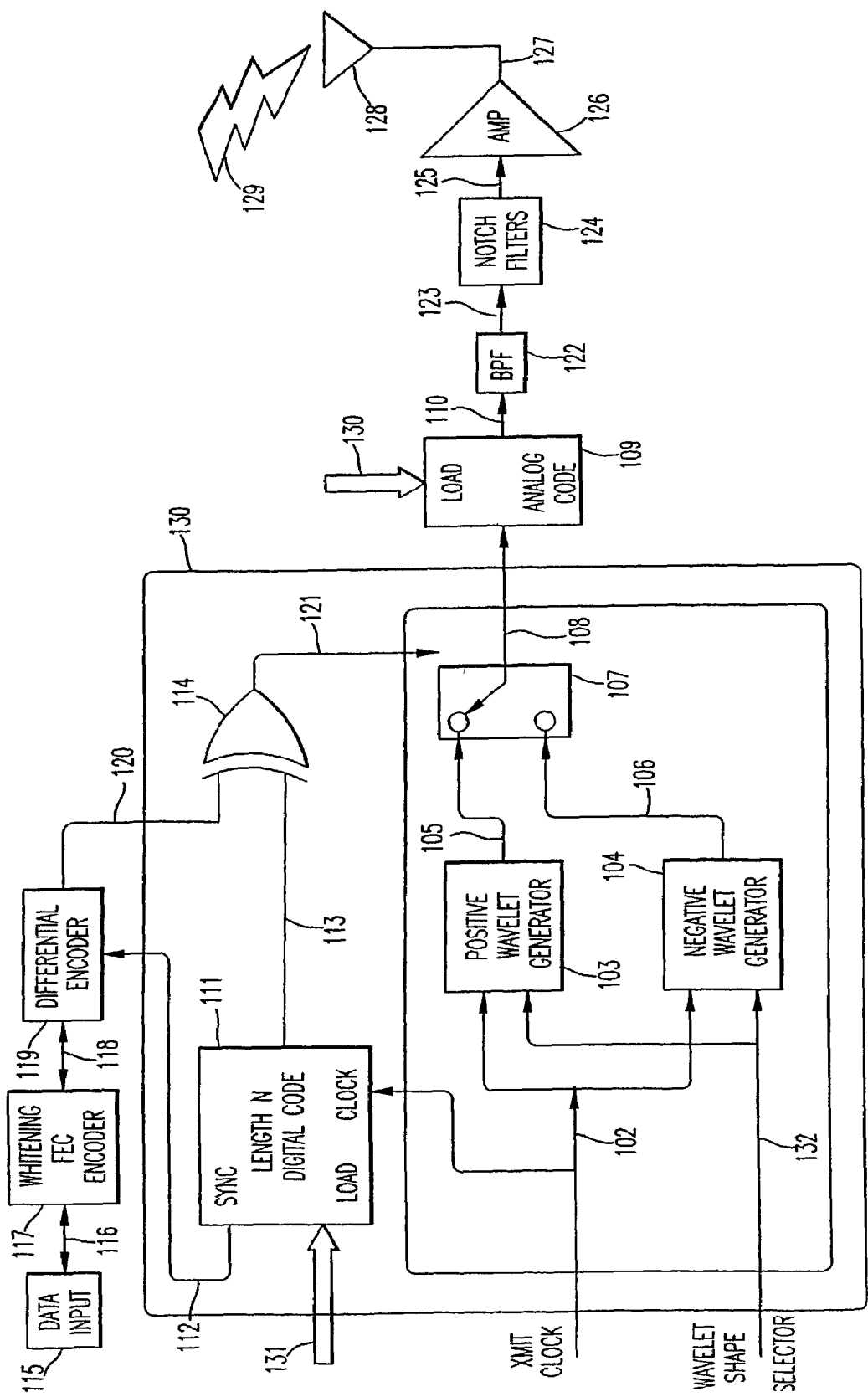
FIG. 21 is a block diagram of a transmitter portion of a UWB communication transceiver according to the present invention.

Referring to FIG. 21, whitening encoder 117 applies this data scrambling operation to the data from data input 115. It also can apply forward error correction coding (FEC), such as combinations of interleaving, Reed-Solomon block codes, and convolutional codes. Many books are available on the topic of FEC, including "Error Control Coding: Fundamentals and Applications," S. Lin, and D. Costello, Jr., Prentice-Hall, 1983, ISBN 0-13-283796-X and "Digital Communications," B. Sklar, Prentice-Hall, 1988, ISBN 0-13-211939-0, the entire contents of both of which being incorporated herein by reference.

The second condition is that the data is differentially encoded by encoder 119. The reason for this constraint is that the transmit waveform may be arbitrarily inverted by the environment. The result is that the receiver cannot tell if a non-inverted wavelet or an inverted wavelet was transmitted, but it can tell if two wavelets are alike or opposite. Differential encoding allows the receiver to recover the data due to the association of adjacent pulses. By employing differential encoding of the data prior to transmission, the phase information as well as pulse position is available (two degrees of freedom) to create pulse codes.

In the present embodiment the data are transmitted by bi-phase modulation of codes rather than modulation of a carrier. Code generator 111 generates a cyclical stream of pseudo-random bits representing the digital code. Each time the cycle repeats, synch signal 112 triggers differential encoder 119 so that alignment of the data modulation on line 120 can occur. Exclusive OR gate 114 modulates the digital code on 113 to produce the modulated code sequence on line 121. Load port 131 allows a different seed variable to be input for generating user specific codes.

Figure 22:
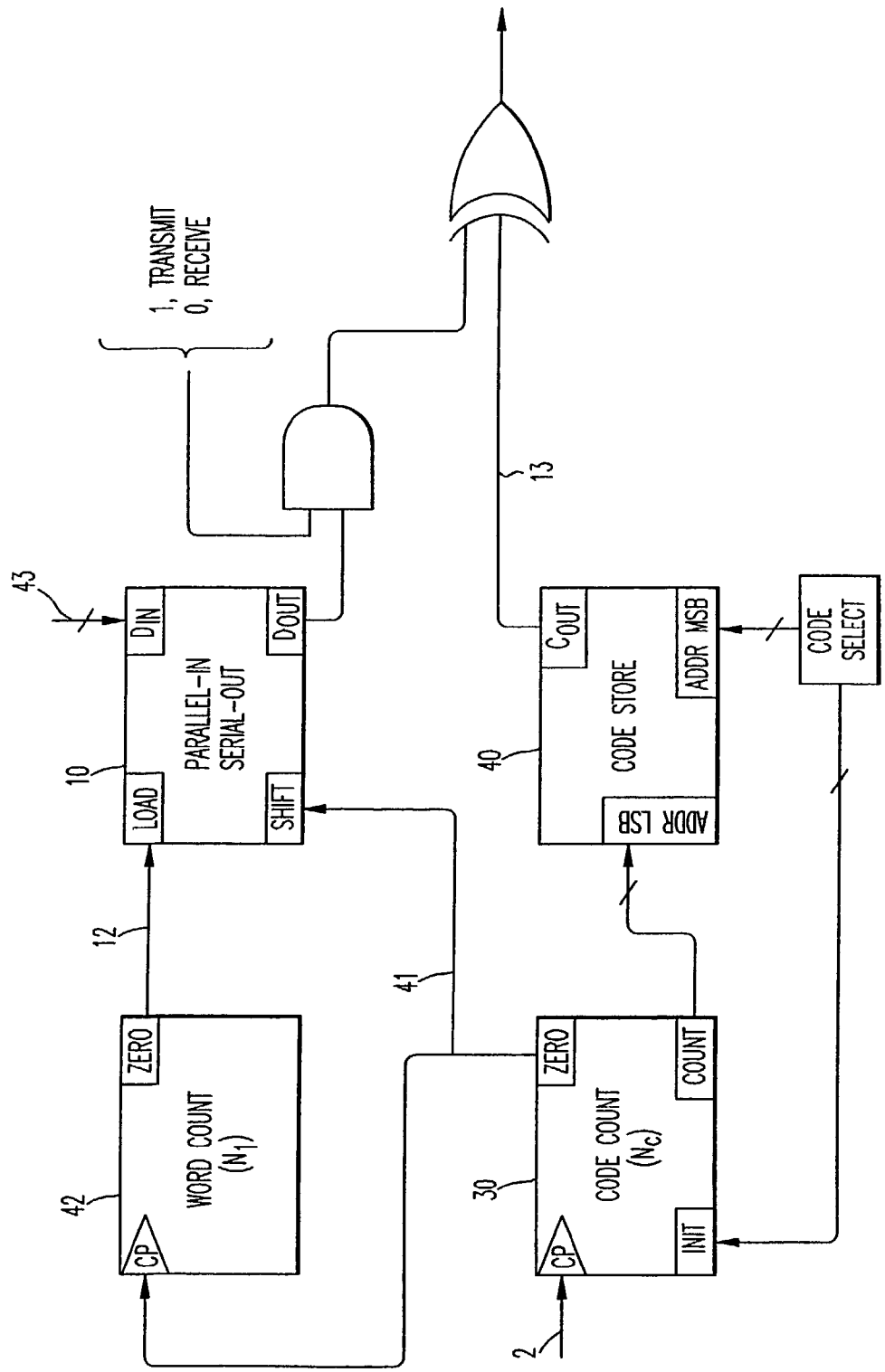
FIG. 22 is a block diagram of a circuit employed for generating data-modulated digital code for the receiver of FIG. 21.

FIG. 22 gives an alternative block diagram of a circuit capable of performing the modulation. These circuits produce the data modulated code, independent of the pulse waveform. That is $$y(t) = d(t) \cdot h(t)$$
$$= \left( \sum_{k=0}^{N_d-1} d_k \delta(t - kT_c) \right) \cdot \left( \sum_{n=0}^{N_c-1} h_n \delta(t - T_n) \right)$$
$$= \sum_{k=0}^{N_d-1} \sum_{n=0}^{N_c-1} d_k h_n \delta(t - T_n - kT_c)$$
$$= \sum_{k=0}^{N_d-1} d_k \sum_{n=0}^{N_c-1} h_n \delta(t - T_n - kT_c)$$
$$d_k, h_n \in \{-1, 1\}$$

which says that for each bit, $d_k$, of the data stream, a pulse code h(t) is generated, and the entire code is then multiplied by $d_k$. The effect is to either invert, or not invert, the code h(t) depending on whether $d_k$ was a −1 or 1 respectively. Much of the code generation and modulation is processed digitally and could be implemented in an ASIC or in a software-based process, implemented on a CPU. In these circuits modulo 2 addition (exclusive nor) replaces traditional multiplication, and {1,−1} are mapped to {1,0}. FIG. 23 illustrates a data stream with time separation $T_c$ (or $T_n$) between code symbols.

Figure 24:
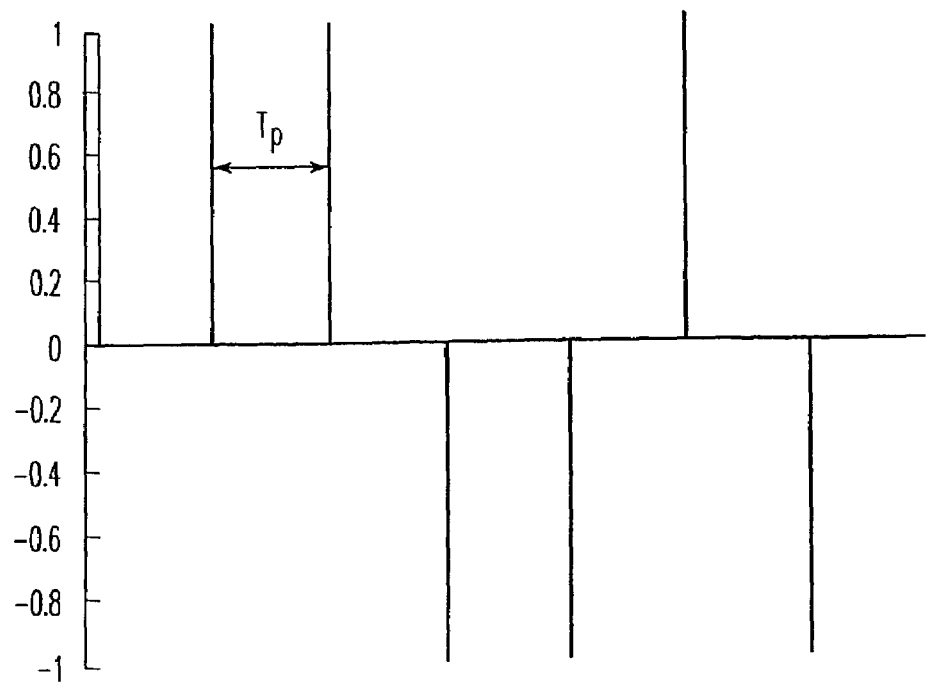
FIG. 24 is a plot of an example of equispaced code stream that may be convolved with a wavelet in the transmitter according to the present invention.
Figure 25:
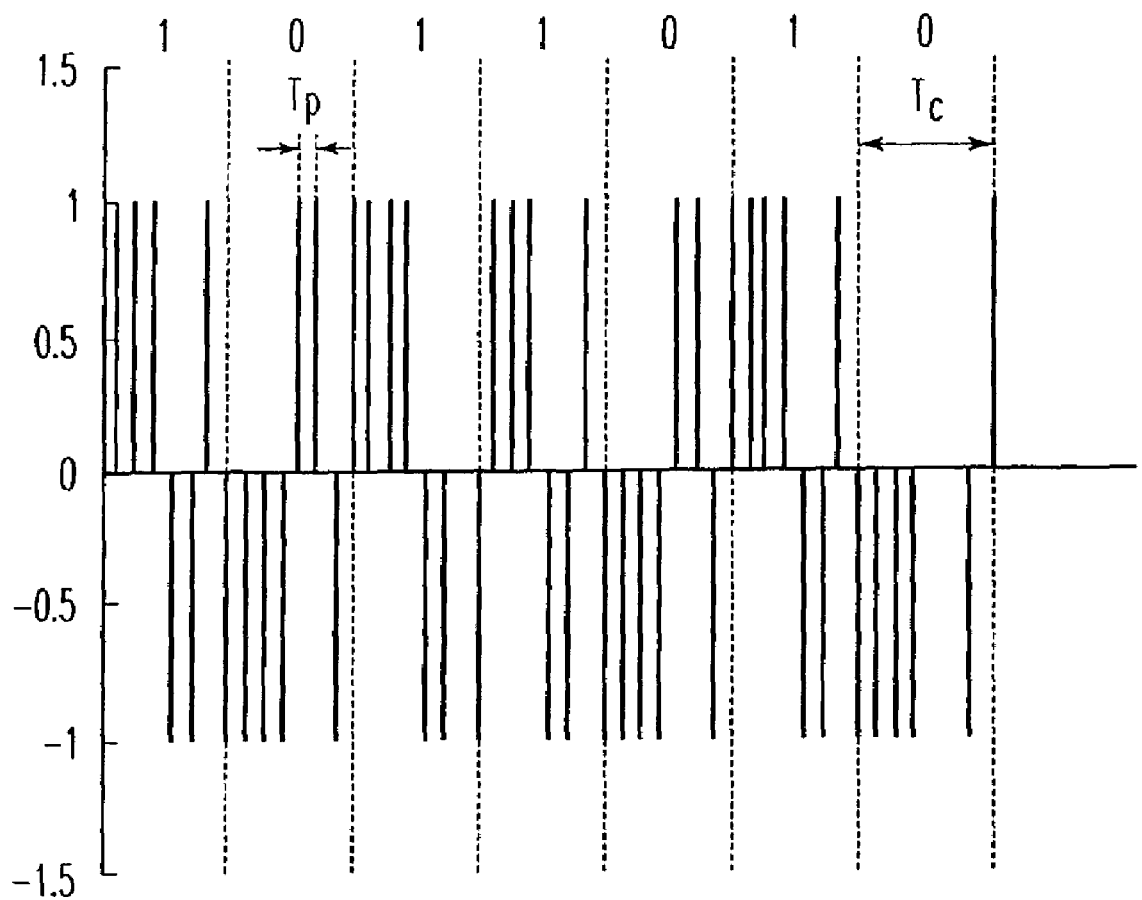
FIG. 25 is a plot of convolved data and code streams from FIGS. 23 and 24 respectively.

The coefficients $h_n$ of the digital code are binary sequences of 1's and 0's occurring at times $T_n$ relative to the start of the code. A sample 7 length code is shown in FIG. 24. In this case the coefficients are equispaced, say $T_p$ seconds apart, thus $T_n = nT_p$. FIG. 25 illustrates the data modulated code that results from applying equation (41) to the data and code of FIGS. 23 and 24.

Referring to the block diagram in FIG. 22, and Equation (41), the coefficients of the code are stored in memory 40 and addressed by counter 30. The counter 30 generates the code index n, and counts from 0 to $N_c$−1, the length of the code following clock pulses 2. The counter 30 is incremented once for each coefficient of the code, at intervals of $T_n$ seconds. Following each increment of counter 30 the corresponding coefficient is emitted from the memory to line 13.

In Equation (41), one code word is applied to each data bit. These code words are synchronized by parallel to serial register 10 and word counter 42. When counter 30 completes the count for a single code word it asserts line 41 which signals register 10 to output one bit. When line 41 is asserted it also signals word counter 42 to advanced the count of data bits shifted out. This counter is programmed to count to $N_i$, the width in bits of a data word (whitened and differentially encoded). When the counter has been advanced $N_i$ times, it asserts line 12 which signals register 10 to load another data word. It is also possible to compute the code coefficients on the fly, for example, with linear feedback shift registers.

Referring to FIG. 21 again, the coefficients of the code and the bits of the data are presented to exclusive or (XOR) gate 114, which produces y(t), the code modulated data, that is presented to the pulse forming network on line 121. Switch 107, responds to the modulated code from line 121 to selectively output a positive (non-inverted) or negative (inverted) wavelet onto 108. Positive wavelet generator 103, and negative wavelet generator 104 produce a wavelet in response to an xmit clock signal 102 and provide outputs on lines 105 and 106 respectively. The shape of the wavelet is selected by external control logic via line 132.

Figure 26:
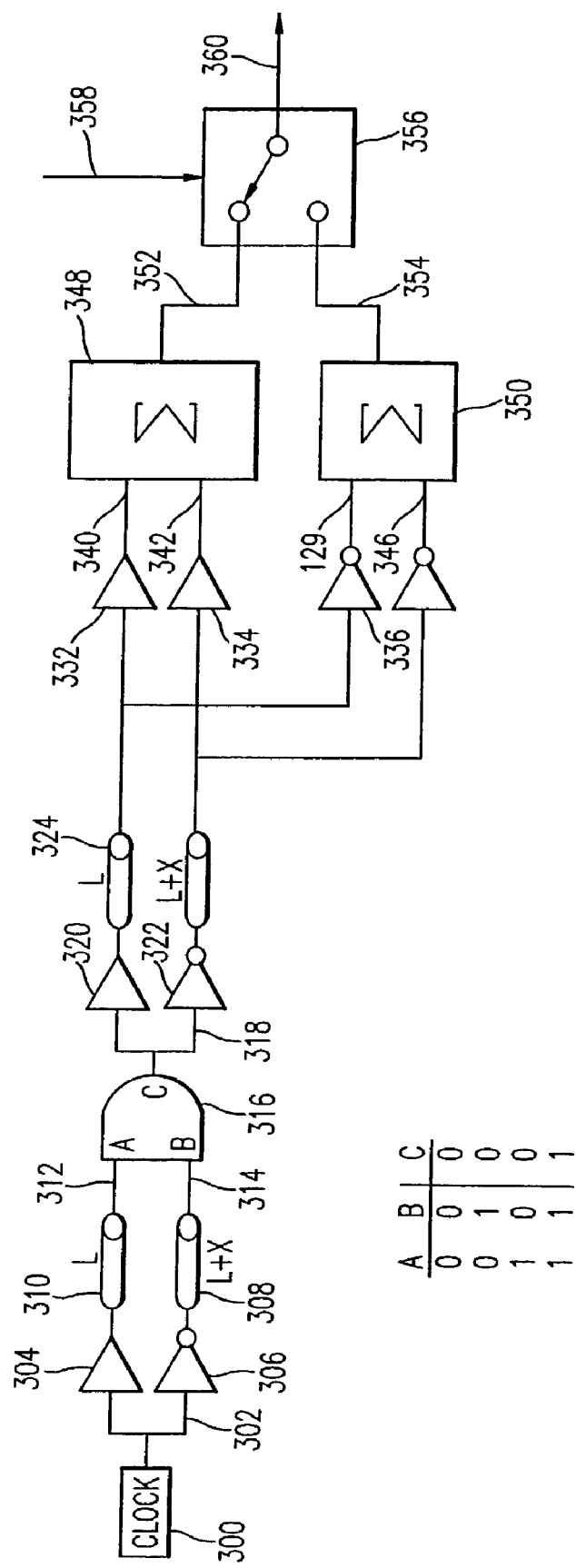
FIG. 26 is a general block diagram for a wavelet generator configured to generate a pseudo-derivative orthogonal Gaussian (DOG) wavelet shape that may be employed in the transmitter according to the present invention.

Circuits for generating short pulses include: avalanche transistors; step recovery diodes (SRD) in comb filter circuits; and high speed discrete logic and transistors. The present embodiment of the invention generates short pulses using circuits built from discrete logic gates and passive delay lines. FIG. 26 shows a simplified diagram of a differential ECL implementation that generates a wavelet approximating the first derivative of a Gaussian, and FIG. 27 shows a timing diagram that corresponds with FIG. 26.

FIG. 26 shows a differential ECL implementation of a wavelet generation circuit. A clock 300 provides clock pulses on lines 302 and 303 to buffer 304 and inverting buffer 306. Respective buffers 304 and 306 pass the clock pulses through a delay line 310 and 308 respectively. Delay line 308 has a longer delay effect (X) than that of line 310. Outputs from the delay lines are provided on lines 312 and 314 to an AND gate 316. The output of the AND gate is provided on lines 318 to a second set of a buffer 320 and inverting buffer 322 to yet another set of delay lines 324 having the same delay (optionally) as delay lines 310 and 308. Each of the respective outputs from the delay lines are split so as to provide a non-inverted and inverted version along with its counterpart through buffers 332, 334 and 336. Outputs from the respective buffers are provided to summation circuits 348 and 350 by way of lines 340, 342, 129, and 346.

Figure 27:
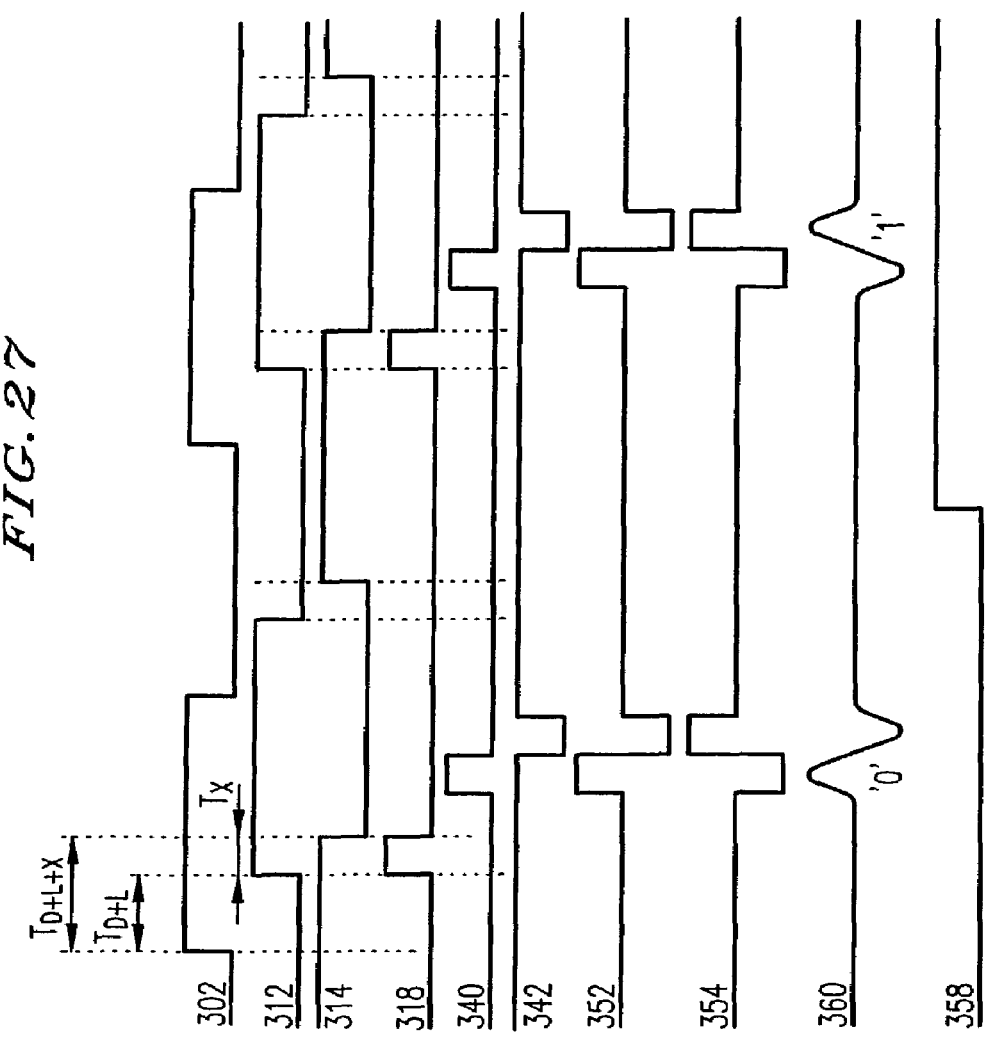
FIG. 27 is a timing diagram for the wavelet generator shown in FIG. 26.
Figure 28:
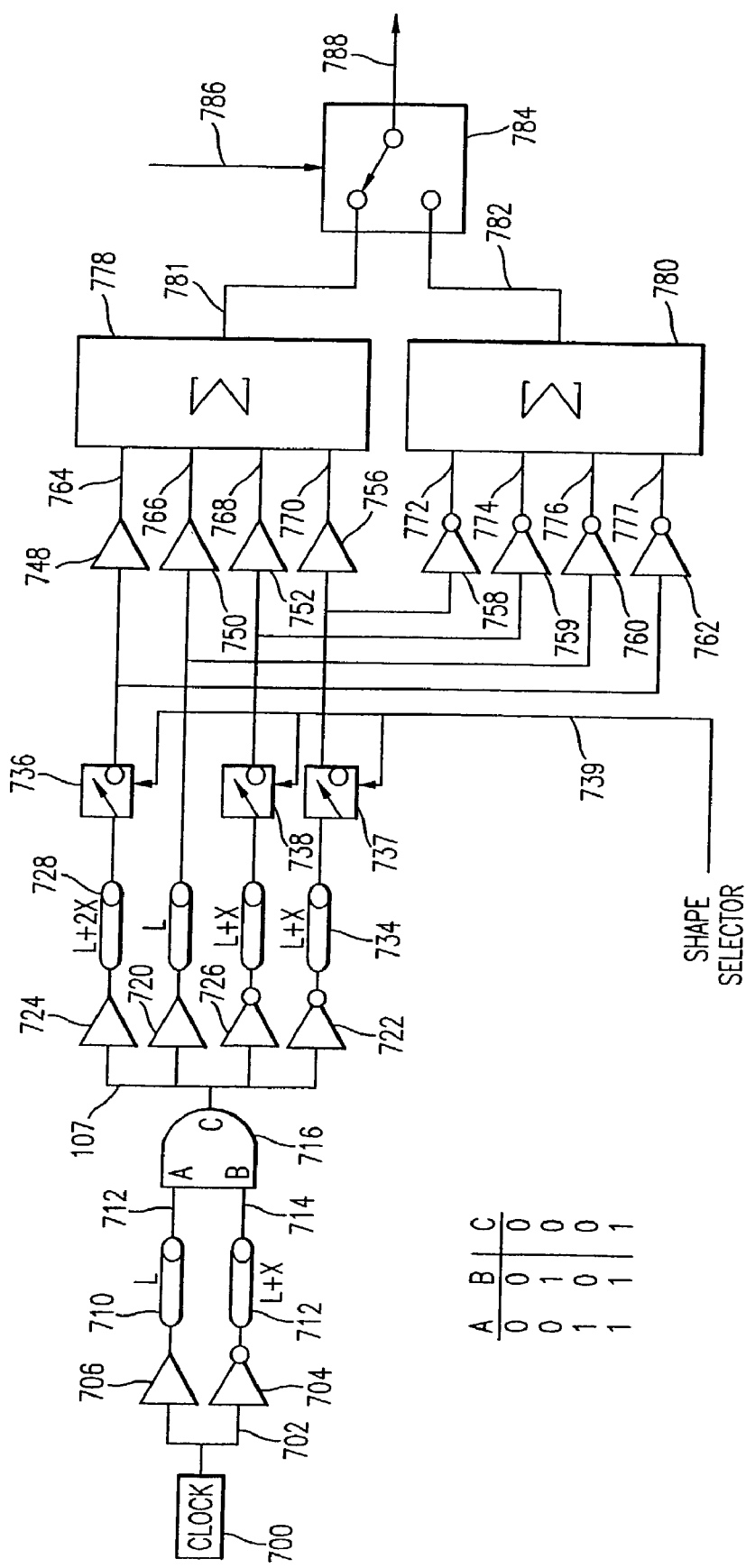
FIG. 28 is a circuit diagram for a wavelet generator with selectable shapes for an Nth derivative of a Gaussian.

Each of the lines 340, 342, 129 and 346 provide a different component of either a positive going or negative going half of an individual pulse such as pulse 360 shown in FIG. 27. Outputs from the summing circuits 348 and 350 are provided on lines 352 and 354 respectively to a switch 356. Controlling circuit 358 provides a switching operation which switches between the different outputs of the summation circuits 348 and 350 so that a bi-phase waveform of a predetermined phase "0" is provided when the switch 356 is in a first setting, and then an opposite phase by-phase wavelet is provided when the switch is thrown in the opposite situation "1". FIG. 28 corresponds to FIG. 26 and thus items 700, 702, 704, 706, 710, 711, 712, 714, 716, 107, 726, 722, 720, 724, 728, 734, 748, 750, 752, 756, 758, 759, 760, 762, 777, 776, 774, 772, 770, 768, 766, 764, 778, 780,

781, 782, 786, 784 and 788 correspond with similar structures shown in FIG. 26. However, as can be seen, four channels are implemented and included with a shape selector line 739 that is used to switch between different input signals by way of switches 736, 738 and 737. Controlling the switches in this way allows for use of different pulse shapes, and thus allows for multi-phase signaling or M-ary signaling.

Figures 29A, 29B:
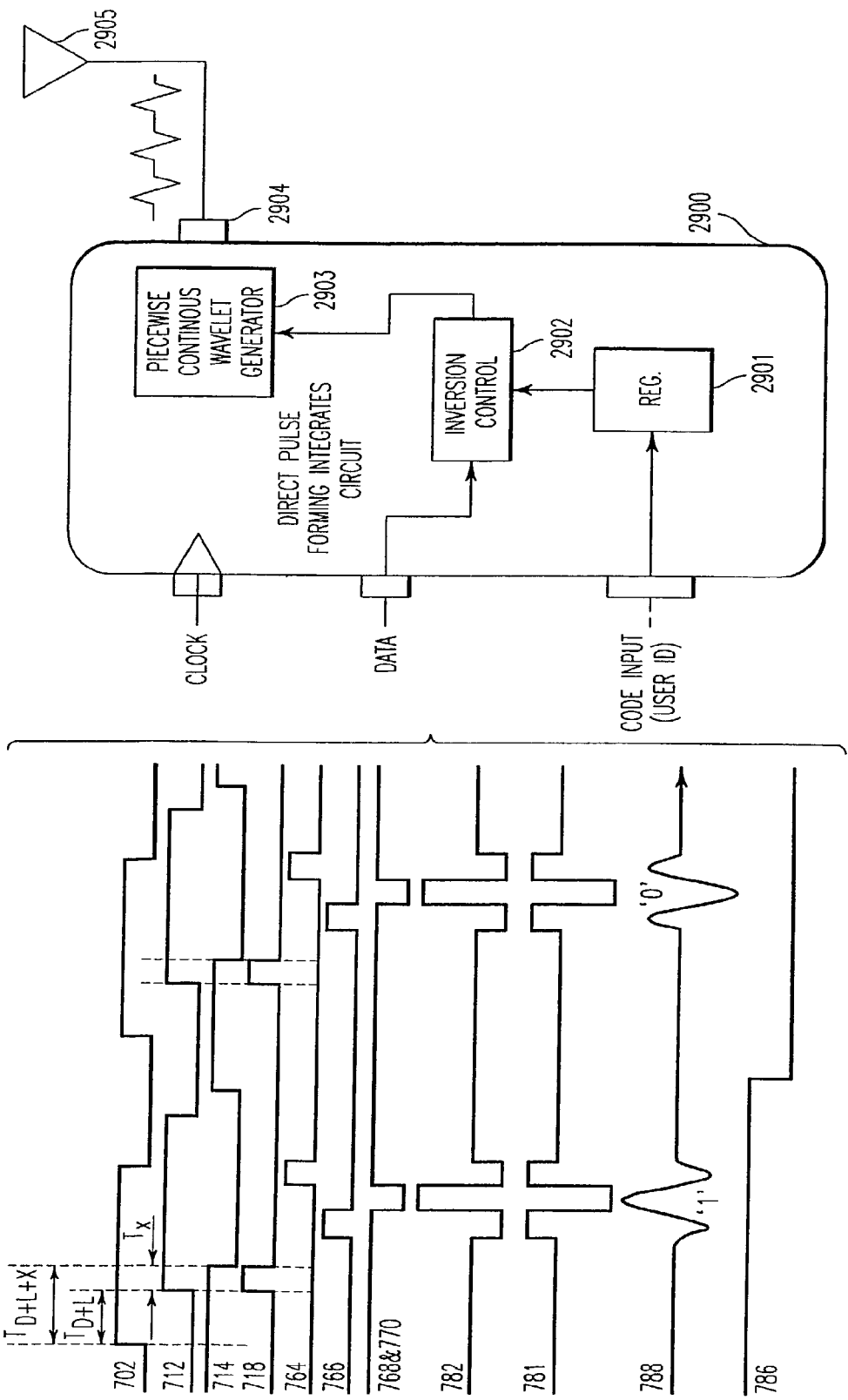
FIG. 29A is a timing diagram for a wavelet generator shown in FIG. 28 with second derivative Gaussian waveshapes selected for use in the present invention.
FIG. 29B is a circuit for generating a waveform directly, without requiring an analog code.

FIG. 29A shows a timing diagram for FIG. 28 with the switches selected to produce the second derivative of a Gaussian. Switch 784 applies the data modulated code on 786 to select the polarity of the transmitted wavelet. Switches 736, 738, and 737 (FIG. 28) are driven to select the zero, first, or second derivative of a Gaussian. In the block diagram of FIG. 28, signal 2 is delayed by different line lengths into ports 104 and 105 of AND gate 106. The timing diagrams shown in FIGS. 27 and 29A show idealized waveforms for clarity. The actual rise and fall times of the devices, however, produce the "filtered" output waveforms shown. Typically, the transmitter and receiver wavelet functions are not identical. Instead, the shape of the wavelet used in the receiver is typically the derivative or Hilbert transform of the shape used in the transmitter.

A feature to the present invention is the ability to concatenate codes and allow implementations of the two codes in different technology. Referring to FIG. 21, analog code generator 109 is implemented with wide bandwidth microwave components, which do not have the limitations of semiconductor technologies, although semiconductor embodiments may be employed as well. Therefore, the transmitter according to the present invention can generate codes composed of both digital and analog parts. The digital, $h_d(t)$, and analog, $h_a(t)$, codes are given by $$h_d(t) = \sum_{m=0}^{M-1} g_m \delta(t - T_m) \qquad (42)$$

$$h_a(t) = \sum_{q=0}^{Q-1} a_q \delta(t - T_q)$$

$$g_m, a_q \in \{-1, 1\}$$

The effect on the formulation of equation (41) is to replace h(t) with the concatenated code $$h(t) = h_a(t) \cdot h_d(t) \qquad (43)$$

$$= \left(\sum_{m=0}^{M-1} g_m \delta(t - T_m)\right) \cdot \left(\sum_{q=0}^{Q-1} a_q \delta(t - T_q)\right)$$

$$= \sum_{m=0}^{M-1} \sum_{q=0}^{Q-1} a_q g_m \delta(t - T_q - kT_m)$$

The system can be operated with either digital only or analog only codes. The purpose of the analog code is to generate waveforms whose pulses occur faster than can be conveniently processed digitally. A replica of the analog code replaces each pulse of the digitally generated code on a fine time scale. Good codes for the analog section have low autocorrelation sidelobes, like Barker codes. The reason for this is that the sidelobe structure of the concatenated code will contain all combinations of the main and side lobes of the component codes. As an alternative, the analog code is not required if circuitry is used that can produce the wavelets directly from a digital code. FIG. 29B shows such a circuit.

FIG. 29B is a block diagram of an exemplary direct pulse forming integrated circuit 2900. One embodiment of the integrated circuit is CMOS. The pulse forming integrated circuit 2900, produces a piecewise continuous output waveform at a predetermined multiple, or fraction, of a clock pulse rate. Data is input to the integrated circuit and provided to an inversion control circuit 2902 that is contained therein. The inversion control circuit 2902 may be implemented as a discrete logic gate. A user specific code sequence of N code chips is input to a "code input" pin. The N code chips are buffered in a register 2901, and clocked out of the register 2901 at a rate proportional to (a multiple or fraction of) the clock rate. In one embodiment, a preselectable number of code chips are applied against the data (i.e., to set a predetermined number of data bits to wavelets).

Both the data and the output from the register 2901 are applied to an inversion control device 2902, which either inverts the code sequence if the data bit is in a first logic state, or passes the code sequence if the data bit is in a second logic state. When multilevel wavelets are used (e.g., wavelets that are taken from a set of N, where N is greater than 2), data from adjacent bits may be used to select which wavelets are transmitted. In the present embodiment, the code sequence (whether inverted or non-inverted) are applied to a piecewise continuous wavelet generator 2903, which produces a wavelet using edges of logic transitions in logic circuitry to produce wavelets corresponding to logic level pulses provided by the inversion control circuit 2902. Because the implementation of the present embodiment operates in a power spectral density restricted environment, the low CMOS voltage levels of the output pin 2904 are able to be fed directly to the antenna 2905.

Figure 30:
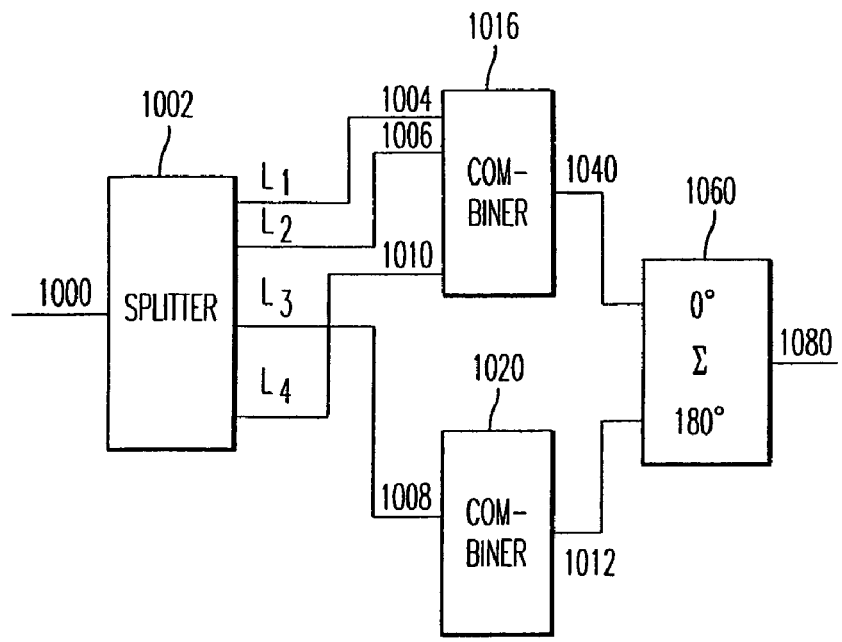
FIG. 30 is a block diagram for a simple example analog code employed by the present invention.
Figure 31:
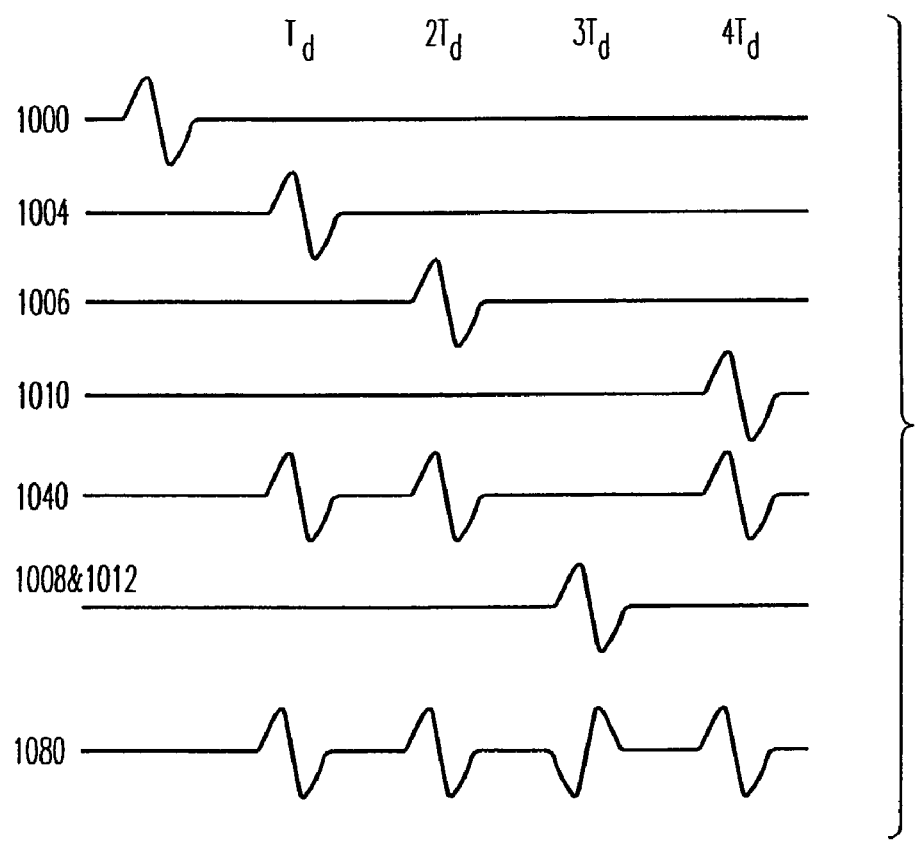
FIG. 31 is a timing diagram of waveforms used to construct an analog code of the type shown in FIG. 30.

FIG. 30 shows a simplified block level diagram of a circuit for generating an analog code. The analog code generator of FIG. 30 includes an input 100 that is passed to a 1:4 splitter 1002 which provides four separate lines 1004, 1006, 1008 and 1010 to the combiners 1016 and 1020 as shown. The output of the combiner 1040 provides three pulses as shown in FIG. 31, while the output of combiner 1020 provides on line 1012 a single pulse. The non-inverting and inverting input of summation circuit 1060 combines the respective signals and provides a composite signal on line 1080 four pulses, where the third pulse is an inverted pulse as shown in FIG. 31.

FIG. 31 shows the timing diagram associated with FIG. 30. The digitally modulated code of wavelet pulses from signal 1000 are input to splitter 1002. The present implementation employs passive power splitters, alternatives depending on cost, size, and power, include resistive dividers and active networks. The line lengths $L_1$ to $L_4$ on 1004 thru 1010 at the outputs of the power splitter are selected to delay the pulses in time. In order to generate the delays $T_n$ in (b) of the figure, the required line lengths are $$L_n = n \epsilon_r T_d$$

$$n = 1, \ldots 4 \qquad (44)$$

where $\epsilon_r$ is the propagation velocity in the media and delays of multiples of $T_d$ were required. In general, the delays are not restricted to be common multiples. All the pulses in time slots that are not inverted are summed together in power combiner 1016, and all pulses in time slots that are to be inverted are summed together in power combiner 1020. The pulses to be inverted are subtracted from the non-inverted set by hybrid 1060, and the difference is output on signal line 1080.

Referring to FIG. 21 again, prior to final amplification and transmission, the signal may be bandpass filtered by filter 122, to suppress energy in frequency bands out of the operational band of the receiver. The output signal can also be notched filtered by filters 124 to remove energy from other narrowband signals as appropriate. Another strategy to create notches in the output spectrum is to configure the codes h(t) such that the undesirable frequencies are attenuated in the pulse code p(t)=s(t)*h(t). Amplifier 126 drives antenna 128 to broadcast the sequence of wavelets.

Figure 32:
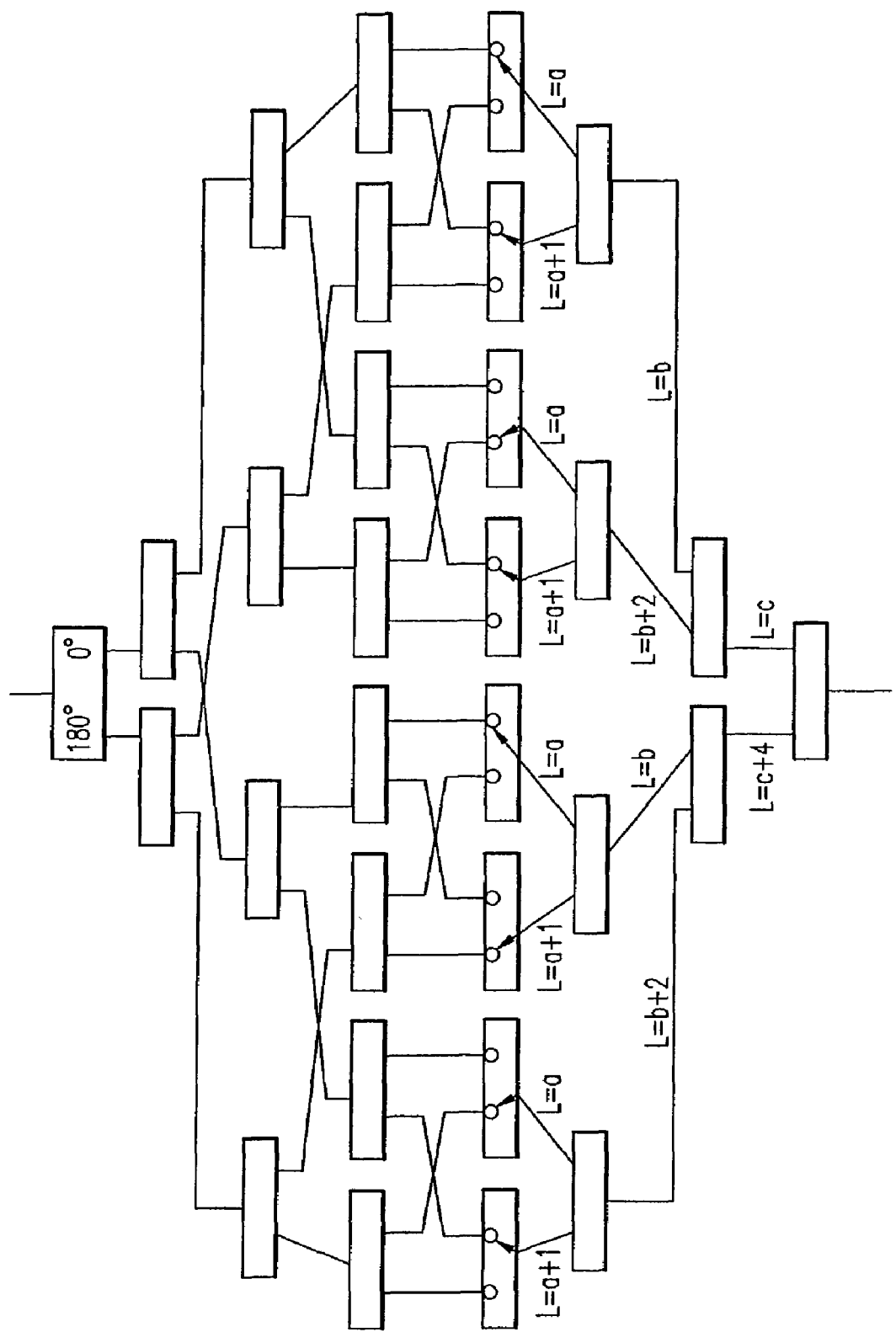
FIG. 32 is a circuit diagram of a programmable dispersive-analog-code according to the present invention.

FIG. 32 shows an embodiment of a programmable dispersive-analog-code using couplers and a lattice structure that allows the transmission lines to be implemented on a printed circuit board. The line lengths follow a binary length formula to minimize line lengths.

Figure 33:
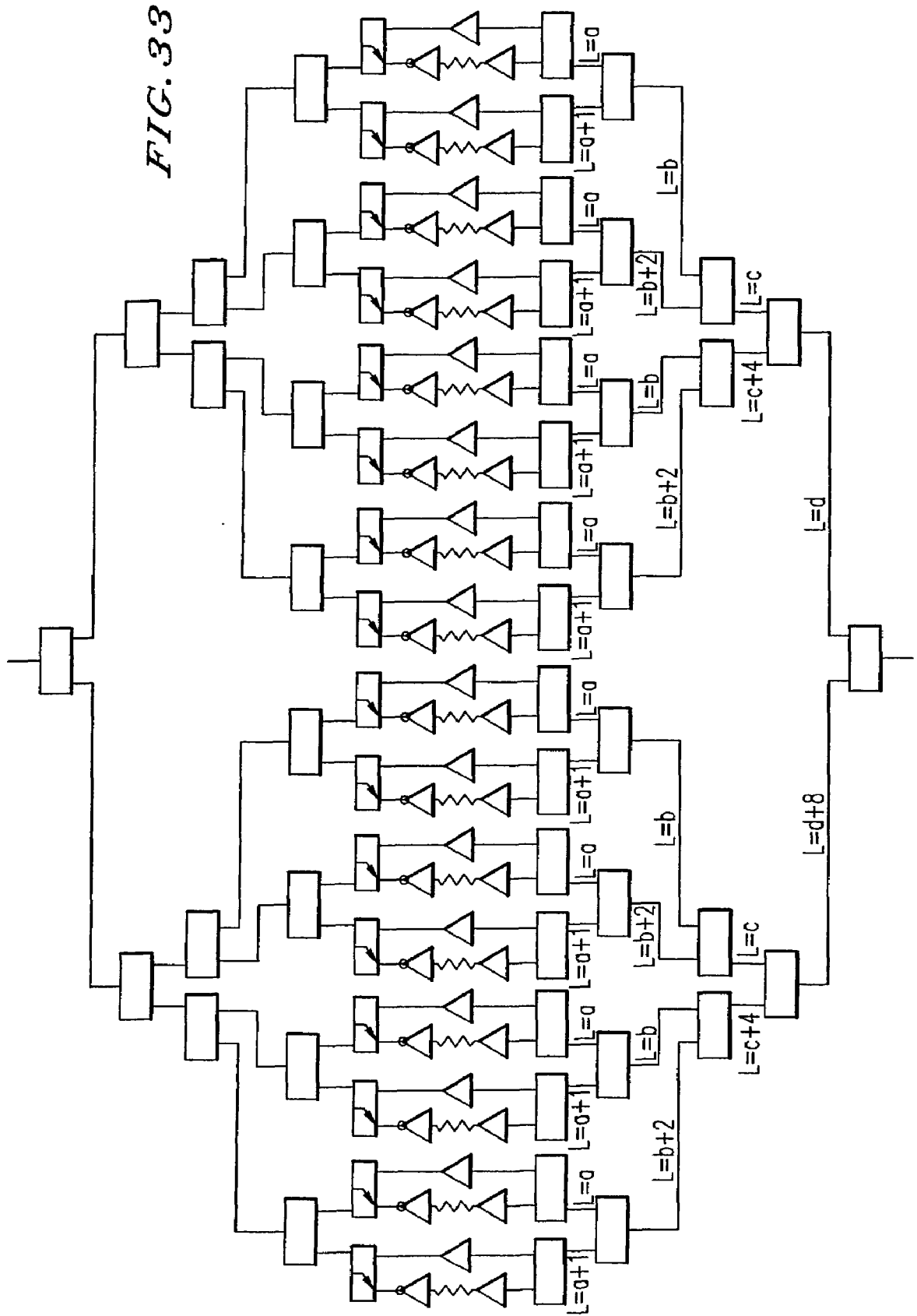
FIG. 33 is a circuit diagram of a programmable dispersive-analog-code that uses invertors instead of a hybrid coupler so as to obtain programmability.

FIG. 33 shows an embodiment of a programmable dispersive-analog-code using inverting amplifiers instead of a hybrid coupler to obtain programmable polarity.

Figure 34:
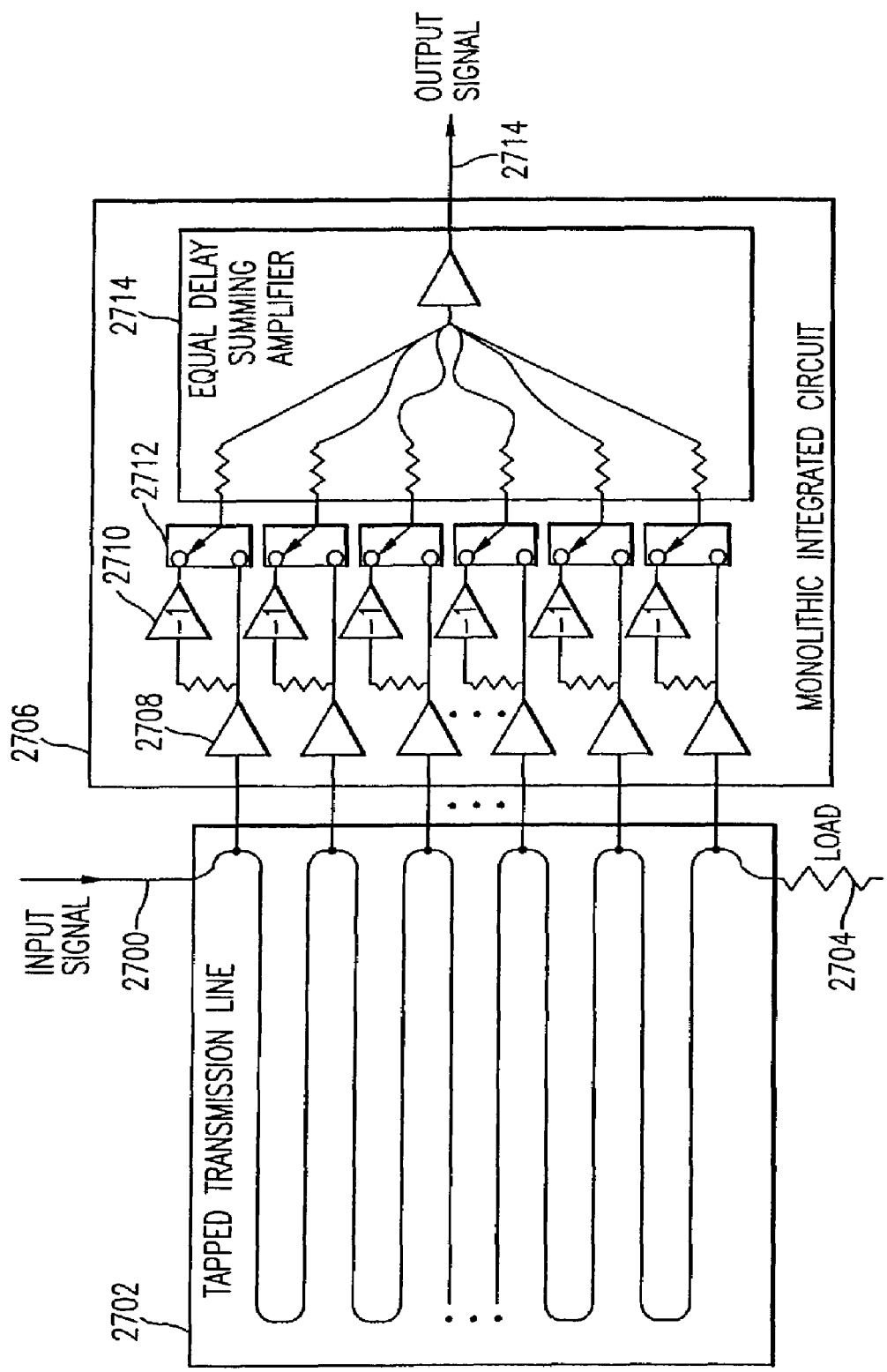
FIG. 34 is a circuit diagram of a programmable dispersive-analog-code circuit that uses a tap transmission line.

FIG. 34 shows an embodiment of a programmable dispersive-analog-code using a tapped transmission line and an active network suitable for integration in a monolithic integrated circuit.

Figure 35:
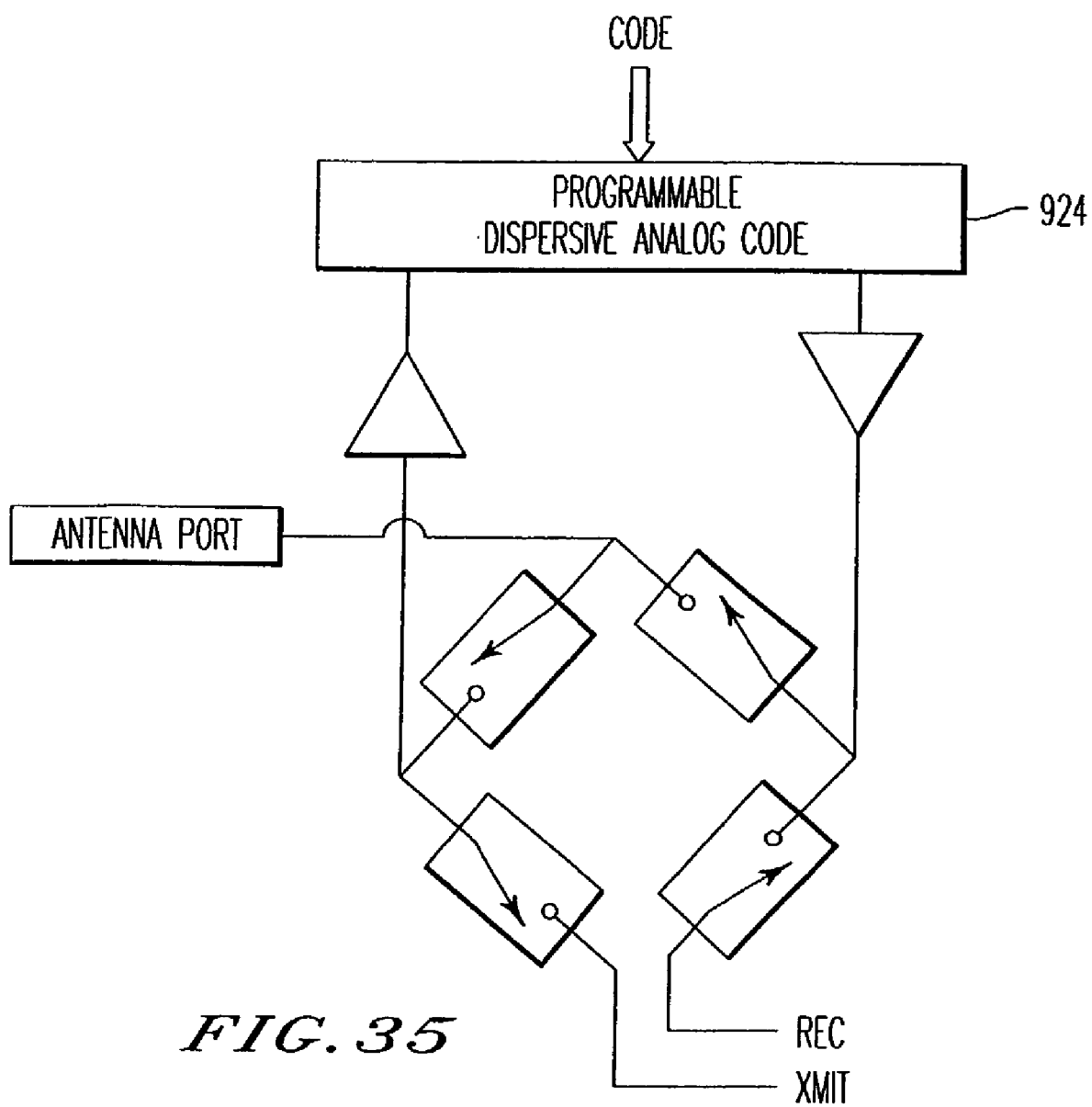
FIG. 35 shows a switching mechanism for a common antenna between a transmitter and receive section in a transceiver embodiment according to the present invention.

FIG. 35 shows an embodiment for switching a common antenna between the transmitter and the receiver, for a transceiver embodiment in which a same dispersive analog code hardware mechanism 924 is shared, even when the dispersive analog code construction is directional. This feature is helpful when amplifiers are buried in the structure of the programmable dispersive-analog-code.

Figure 36A:
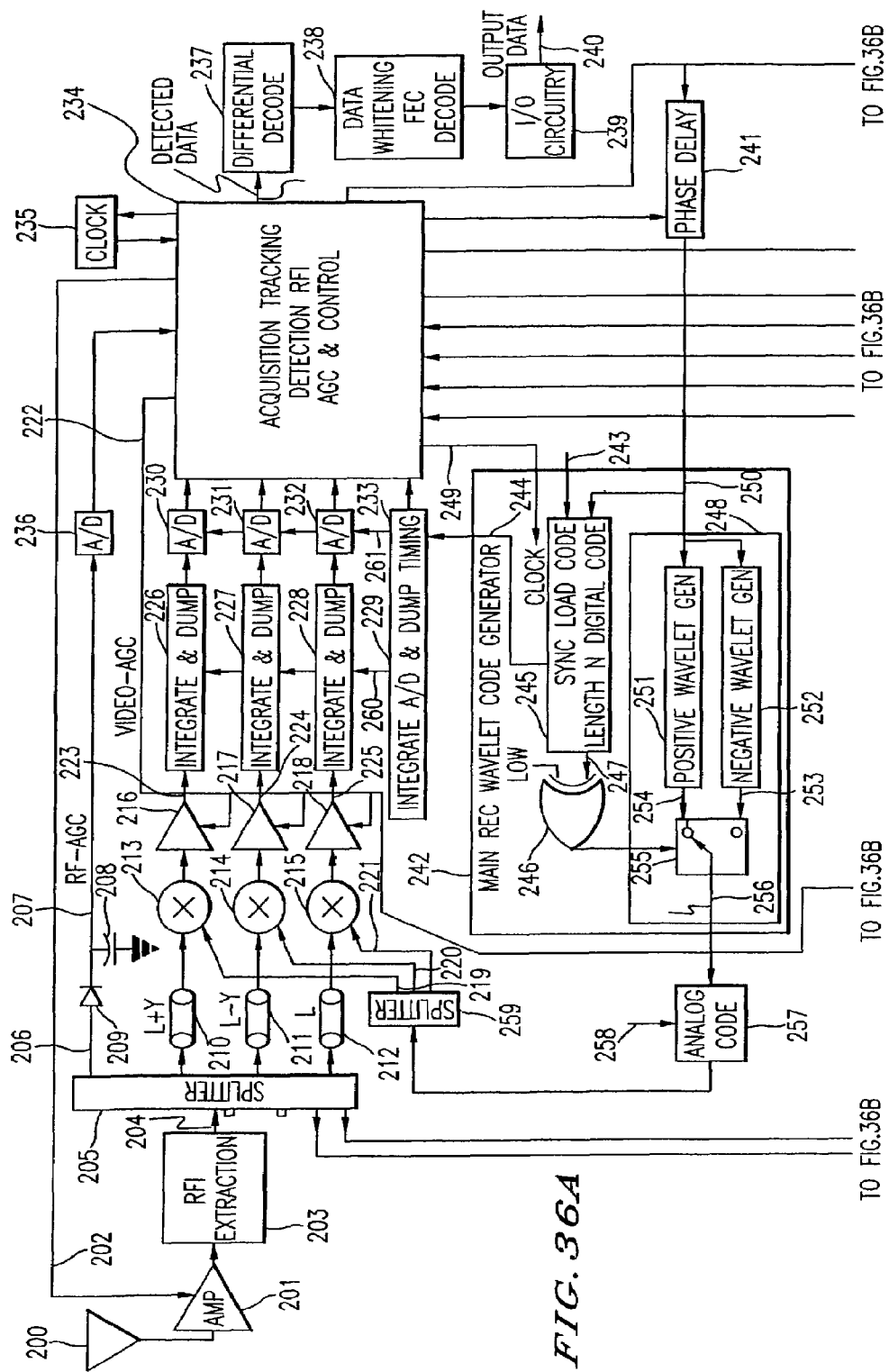
FIG. 36 is a block diagram of a receiver section according to the present invention.
Figure 36B:
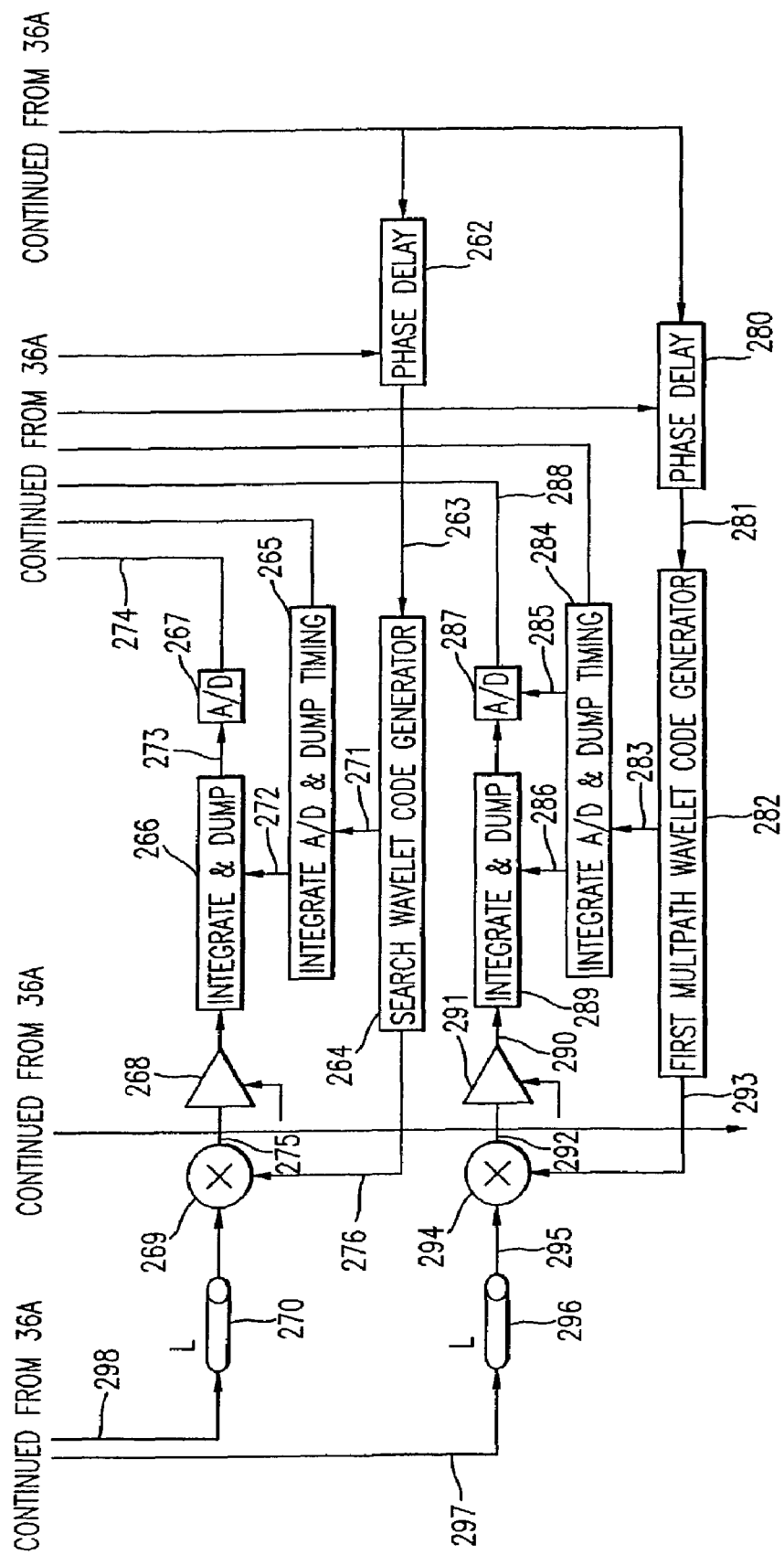
Figure 37A:
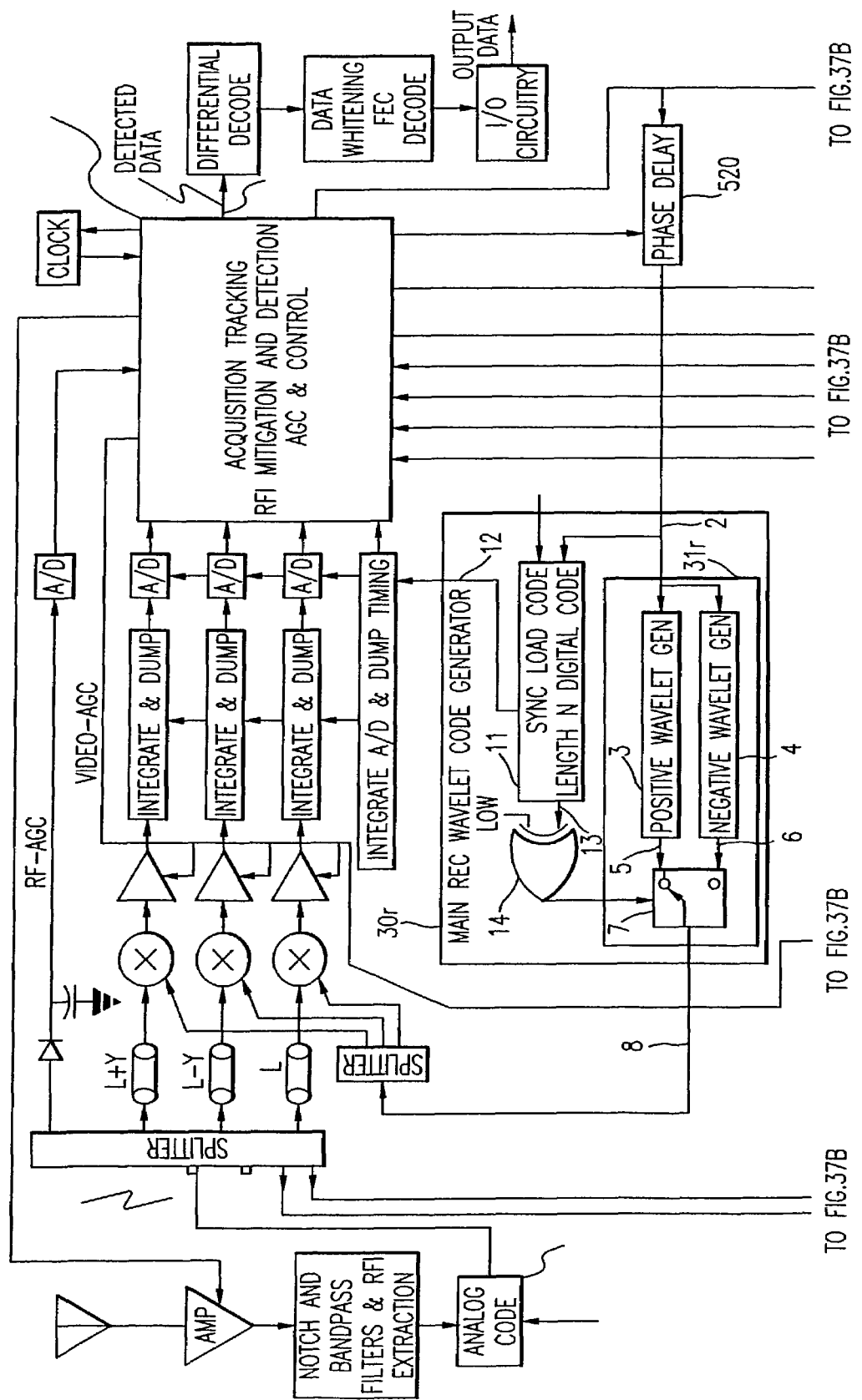
FIG. 37 is an alternative to the receiver shown in FIG. 36.
Figure 37B:
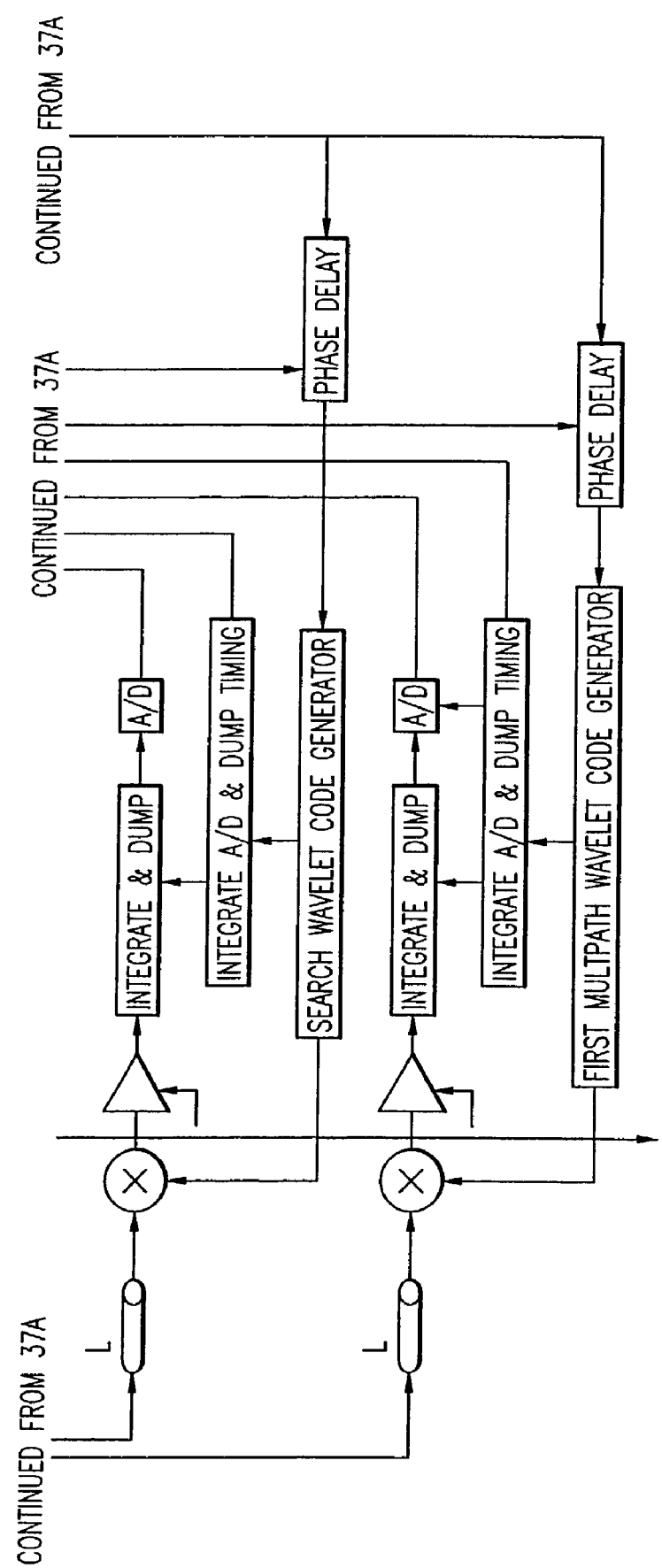

Now turning to the receiver section, the receiver implements a sliding correlator delay locked loop specialized to accommodate short pulse waveforms, as illustrated in the two receiver embodiments shown in the block level diagram of FIG. 36 and FIG. 37. The difference between the two is where the analog code is inserted. In FIG. 36, the analog code affects the wavelet sequence going into the "LO" of the mixer/multiplier correlators. In FIG. 37 the analog code is used as a compressive matched filter. Whereas the analog code in the transmitter spreads a single pulse to a sequence of pulses, the receive analog code does the reverse, and compresses the sequence of pulses back into a single pulse.

The receiver has two main operating modes (1) acquisition and (2) tracking and detection. Below is a description of the sliding correlator DLL implemented in the present system.

FIG. 36 shows block diagram of a receiver architecture employed in the present invention. This receiver may be included in a single unit with the transmitter of FIG. 21 for example to implement a transceive function. A received signal is received through a planar antenna 200 as shown. The antenna may be of the type described in U.S. patent application Ser. No. 09/563,292, discussed above. Energy from the antenna 200 is provided to a low noise amplifier 201 which receives an adjustment signal from an automatic gain control (AGC) line 202 from acquisition tracking detection RFI, AGC and control circuit 234 as shown. The signal from the amplifier 201 is provided to a RFI extraction circuit 203 that removes narrow band interference from the pass band of the receiver. This interference may be narrow band interference such as cellular telephone transmissions, wireless communication systems within an office or home environment or the like. The signal is then provided to splitter 205 by way of line 204. The splitter generates separate portions of the signal after the RFI extraction circuit 203, where one path for the received signal is provided on line 206 through diode 209 and line 207 which is shunted with capacitor 208. This signal serves as an RF-AGC line that is digitized with A/D converter 236 before being provided to the acquisition tracking RFI AGC and control circuit 234. The control circuit 234 identifies a magnitude of the received signal and other temporal or statistical characteristics associated with the signal in order to adjust a front end gain of the LNA 201 by way of line 202.

Figure 38:
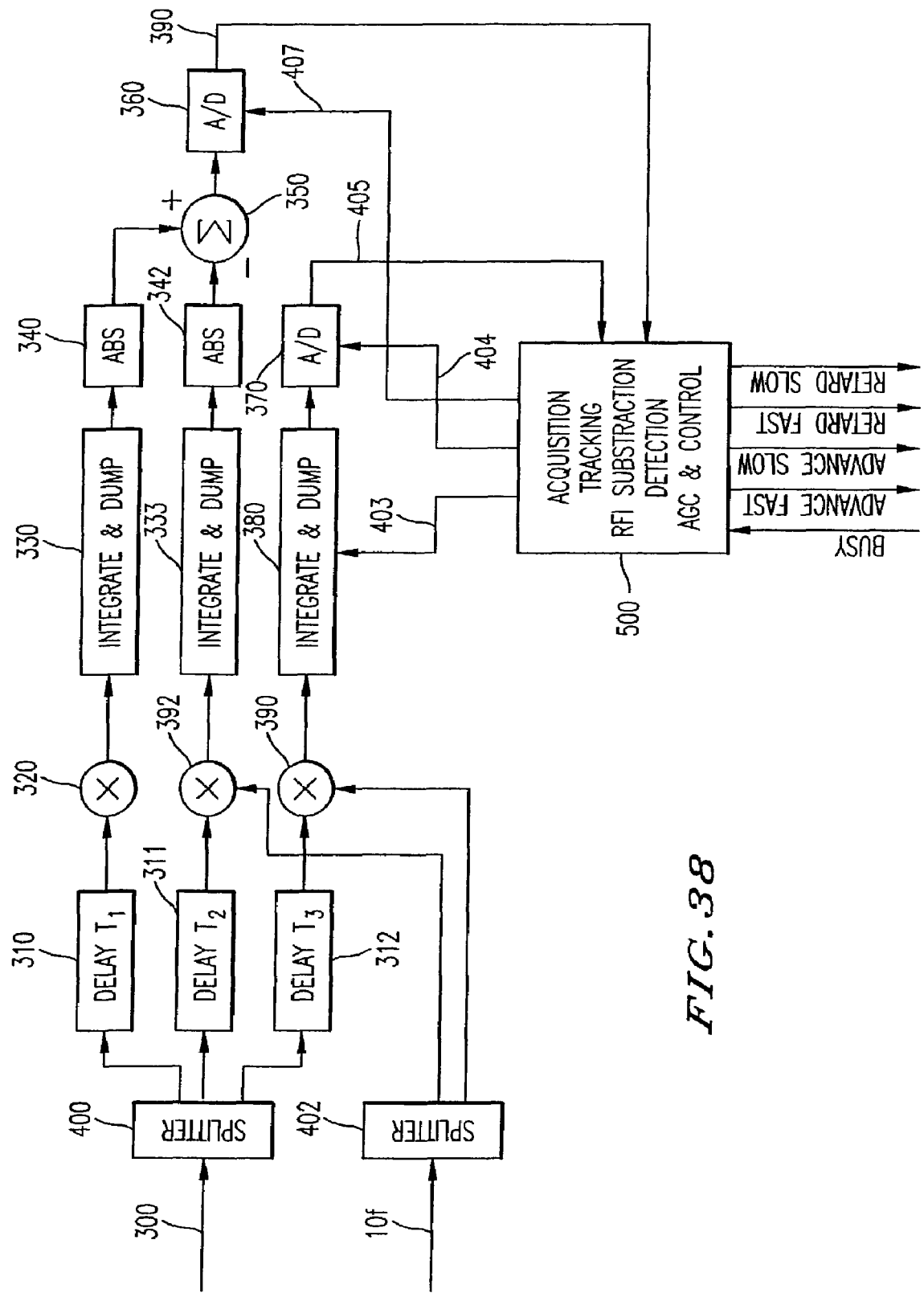
FIG. 38 is a circuit that implements a delayed lock loop according to the present invention.

The separate delay lines 210, 211, 212 and associated mixers 213-215 in lines 219-221 by way of splitter 259, correspond with delay lines 310-312 and mixtures 320, 392 and 390 as shown in FIG. 38, which will be described below. Outputs from the respective mixers 213-215 are provided to amplifiers 216-218 that provide signals on lines 223-225 to integrate and dump circuits 226-228. The integrate and dump circuits 226-228 receive on control line 260 a timing signal through integrate and dump timing circuit 229 which receives a control signal by way of sync load code length N digital code mechanism 245 as shown. Outputs of the integrate and dump circuits are digitized with A/D converters 230-232 and provided to the acquisition tracking detection RFI and AGC control circuit 234 for detection of the different symbols that were sent across the wireless UWB channel. The acquisition tracking detection RFI and AGC control circuit 234 provides an output port for the detected data which is then differentially decoded in decoder 237 and subsequently processed with data whitening FEC decoder 238 in I/O circuit 239 and then output as output data 240.

A control feature of the controller 234 also includes output control lines that adjust an amount of phase delay on phase delay circuits 241, 262 and 280 in addition to providing an output waveform used to trigger when wavelets are generated in each arm of the RAKE arms with respective wavelet code generators 282 and 264. Moreover, the receiver in FIG. 36 includes two arms of a RAKE receiver although the arm fed by delay line 270 implements a searching channel. The arm with input port on line 281 that feeds a wavelet code generator 282 that provides an output to an integrate A/D and dump timing circuit 284 by way of line 283, which in turn provides an input on line 286 to an integrate and dump circuit 289. The output of the integrate and dump circuit 289 provides a signal which is digitized in A/D converter 287 which also receives a sampling input on line 285 as shown so as to provide feedback on line 288 to the acquisition tracking detection RFI AGC and control circuit 234. Similarly, the integrate A/D and dump timing circuit 284 also provides an input to the controller 234. Generator 264, line 271, timing circuit 265, line 272, integrate and dump circuit 266, line 273, A/D converter 267 and line 274 provide a similar function for the second arm in the RAKE although it may be used as a search channel.

Output from the wavelet code generator 282 (for example) is provided to a mixer 294 by way of line 293, which mixes a signal from the splitter 205 by way of line 297 and delay line 296 and line 295 as shown. In this way, the wavelet generator output may be mixed with a delayed version of the signal received through the antenna 200 where the amount of delay is affected by the delay line 296 and phase delay 280 under the control of the controller 234. Consequently, the output of the mixer 294 on line 292 is provided to amplifier 291 for providing the signal to the integrate and dump circuit 289 by way of line 290. Similarly, the signal for the second arm of the RAKE is provided from the splitter 205 through line 298, delay line 270, mixer 269, line 275 and amplifier 268. A clock 235 provides timing to the controller 234.

The main receiver wavelet code generator receives a clock signal from the controller 234 and also receives by way of line 243 a load code for the length N digital code that is also used at the transmitter. The code is provided through gate 246 to provide a control signal switch 255 for selecting either a positive wavelet or negative wavelet through generators 251 and line 254 or 252 and 253 as shown. A sync signal line 244 is provided from the code circuit 245 to the integrate and dump timing circuit 229. The main receiver wavelet code generator 242 selects similar wavelet codes as was done in the transmitter of FIG. 21, which then is further modified by way of the analog code circuit 257 and load line 258 as was the case with the transmitter.

The receiver embodiment of FIG. 37 is like that of FIG. 36 with a difference being that the analog code is applied immediately after the RFI extraction operation so as to implement a compressive matched filter. In the embodiment of FIG. 36 the analog code effects the wavelet sequence input to the "LO port" of a mixer/multiplier correlators.

FIG. 38 is a more detailed block level diagram of the delay locked loop (DLL) circuit employed in the receiver of the present system. After amplification, filtering, and optional RFI extraction, the received signal is input to the DLL on line 300. Splitter 400 separates the received signal into three copies, which are each delayed a different amount. Line lengths of L+Y, L−Y, and L are used, to form lead, lag and on-time signals for the DLL. These line length differences lead to time delays that, during acquisition, are selected to place the on-time signal at the maximum of the pulse code autocorrelation function, and the lead and lag terms symmetrically before and after it. What might be referred to as the "local oscillator" is, in this case, the code of receive wavelets on line 10r. Unique to the present UWB high-speed communications system, this signal is different from the transmit waveform to account for the transmission effects of the antennas. It is generated similarly to the transmit system, except the data line is driven to a logic low state. To improve noise discrimination, bandpass and notch filtering consistent with any applied by the transmitter can also be applied to signal 10r. The effect is to improve the match of the filter. Similar to the received signal, the local code on 10r is split into three copies by splitter 402, however, here the line lengths and path delays are kept identical to the mixers 320, 390, and 392. The reason for this is to allow the lead, lag, and ontime inner products formed by the mixers and gated integrators to all operate with the same control signals.

The acquisition process amounts to finding the time delay that maximizes the inner product of the ontime signal and the local code. Received signal 300 is delayed through 312, the ontime delay, and input to the RF port of mixer 390, while the local code is applied to the LO port of the mixer. The resulting product is the on-time IF signal input to gated integrator 380. Integrate control signal 403 to the integrator is synchronized by controller 500 such that the integration begins when the local code arrives at the integrator input. When the local code ends, controller 500 issues an encode command to analog to digital converter 370 on control line 404. This completes the formation of the inner product, whose value is now present on digital lines 405. The dump signal to integrator 380 is activated by controller 500, clearing the integrated value and preparing the integrator for the next inner product. The gated integrators may be constructed using a ping-pong technique to allow continuous time gated integration.

Figure 39:
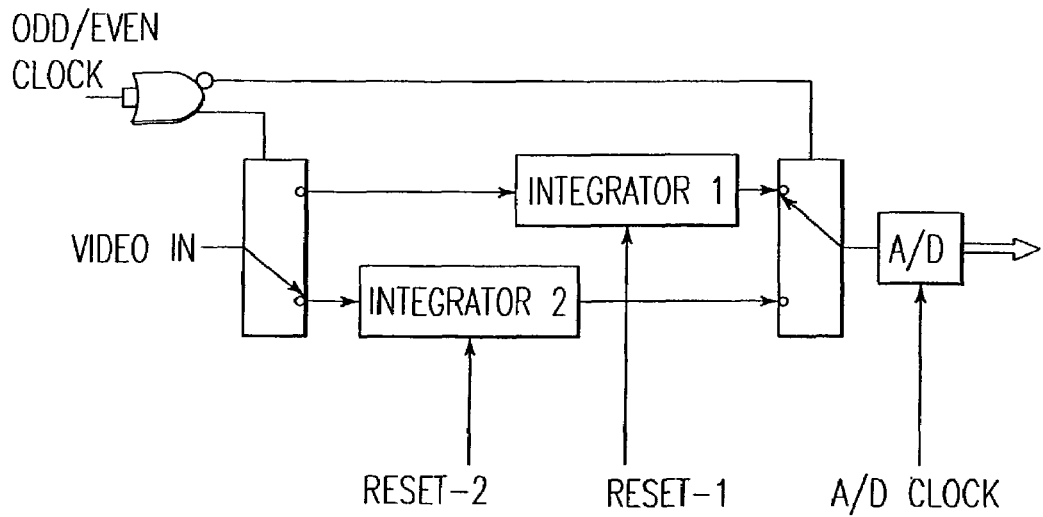
FIG. 39 is a circuit that implements a continuous-time integrator for use in a receiver according to the present invention.

FIG. 39 is a block diagram showing an implementation of a continuous time integrator. The digitized value of the on-time inner product is input to controller 500 (FIG. 38) on line 405 (FIG. 38). At the beginning of the acquisition process, the controller 500 stores this value. The controller 500 then issues an advance command to phase delay circuit 520, and increments its count of the number of advances that have been applied. It also stores the number of advances that correspond to the inner product just collected.

The effect of delay circuit 520 (520a and 520b) is to slide, in time, the local code relative to the received signal.

Figure 40:
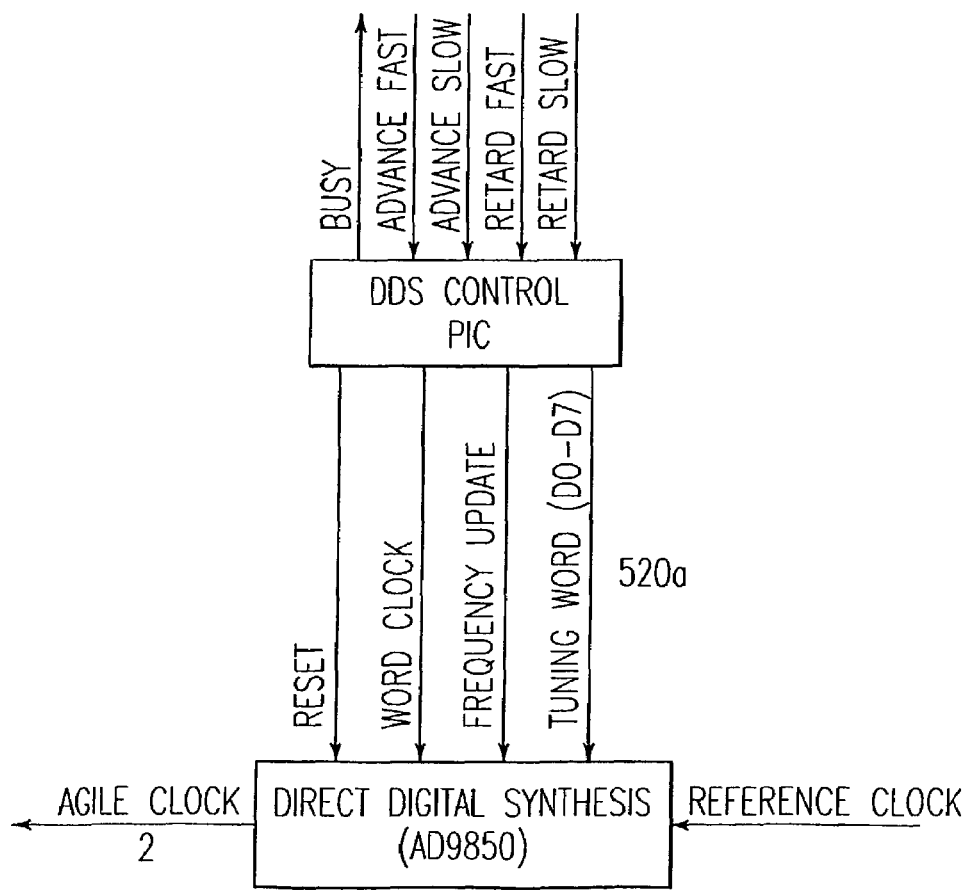
FIG. 40 is a block diagram of a programmable delay phase shift operator that uses a direct digital synthesizer according to the present invention.
Figure 41:
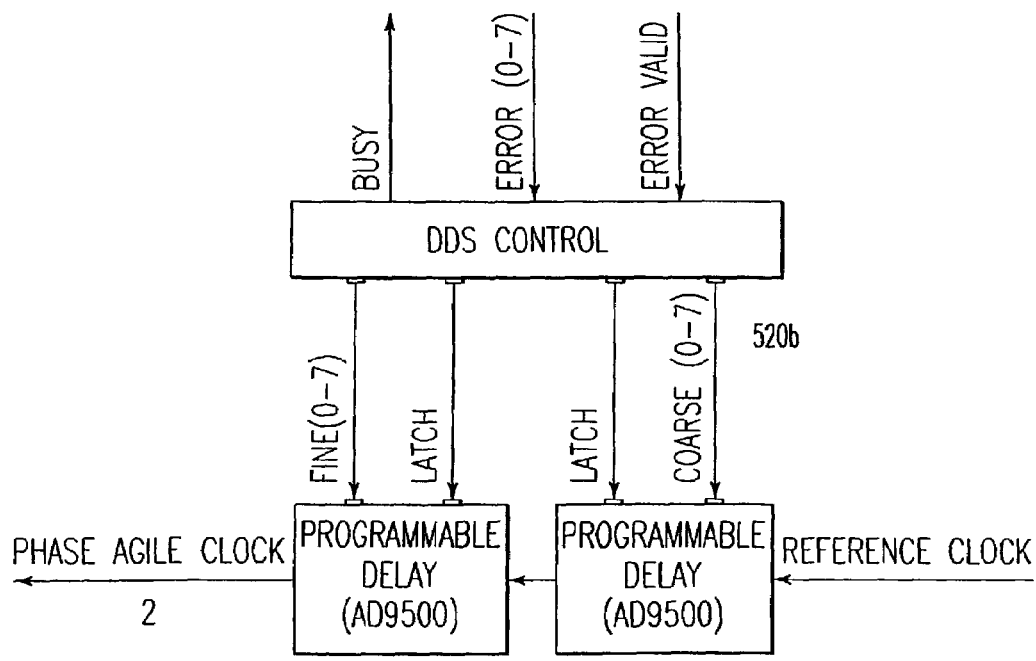
FIG. 41 is a block diagram for a programmable delay embodiment using concatenated programmable one-shot circuits.

FIG. 40 and FIG. 41 give block level diagrams of circuits capable of sliding the clock. The circuit of FIG. 40 operates by increasing or decreasing the frequency of the reference oscillator a short time in order to slide the phase of the clock. FIG. 41 operates by directly programming a delay term. Both change the start time of the codes generated by circuits implementing FIG. 22. Controller 500 continues to advance the phase and collect inner products, and their associated advance counts, for the on-time term. Each inner product formed is compared against the last stored. If it is greater, it replaces it, and its advance count is noted. When the total amount of time the local code has been slid equals the duration of a single code, it can be said the code wheel has been turned. After some number of turns of the code wheel, the acquisition process is halted. The unknown phase between the transmitter and receiver oscillators and codes is taken to be the delay of the maximum on-time inner product found. At this point the system switches to a tracking and detection mode.

Referring again to FIG. 38, lead and lag inner products, similar to the ontime term, are formed by delays 310 and 311, and mixers 320 and 392 respectively. Integrate and dump circuits 330 and 333 complete the integration of these terms. These are synchronized with the local code by controller 500 in the same manner as the ontime term. After the inner products have been formed, circuits 340 and 342 take their absolute value.

The difference of these terms is formed by summer 350, and is digitized by analog to digital convert 360 on encode command 407 from the controller. The timing of the encode command is such that the difference of the lead and lag inner products has had sufficient time to propagate through to the A/D.

The lead and lag terms are formed at symmetric time delays before and after the ontime term. Because the correlation function is also symmetric, these values will be equal when the local code is synchronized with the received signal. If the controller detects a non-zero value, it will advance or retard the phase in order to zero the error. As a way of improving the signal to noise ratio of the error term, many of these may be summed together before making an advance or retard decision.

Detection is performed by a window comparison on the ontime inner product. Values greater than zero map to a one, those less than zero map to a zero. An erasure zone may be added as well. The detected data is differentially decoded, whitening decoded, and forward error corrected.

Referring to FIG. 36, a "search" channel, shown as elements 262 through 270 also referred to as the second RAKE arm, is used to continually scan for multipath signals which may be stronger than the one (or several) being used. In the event that a stronger correlation peak is found by 234, then the main channel, or an auxiliary RAKE channel, can be moved to track the larger peak via adjustment of phase delay 241 or 280. This operation allows the system to operate in dynamic multipath conditions.

The first RAKE channel, shown as elements 280 through 297 is used to track the second strongest signal so that the next strongest correlation can be added to the main channel signal. This summation is the first term in a time domain RAKE filter that takes advantage of multipath to improve the BER performance. Although FIG. 36 shows only one RAKE channel, and one search channel, both may be used as RAKE channels, or even a greater number of RAKE channels may be included to handle differing number of multipath signals (one RAKE channel per multipath signal).

A conventional RAKE receiver is described on pages 151 and 152 of "Wireless and Personal Communication Systems", V. Garg., and Wilkes, Prentice-Hall, 1996, ISBN 0-13234626-5, the entire contents of which being incorporated herein by reference. The RAKE receiver is capable of resolving into separately fading channels and cross-correlating the received signal with multiple time-shifted versions of the transmitted signal. In this way, the respective signals received through the different arms of the RAKE receiver may be combined with a diversity combiner to provide a single output.

Figure 42:
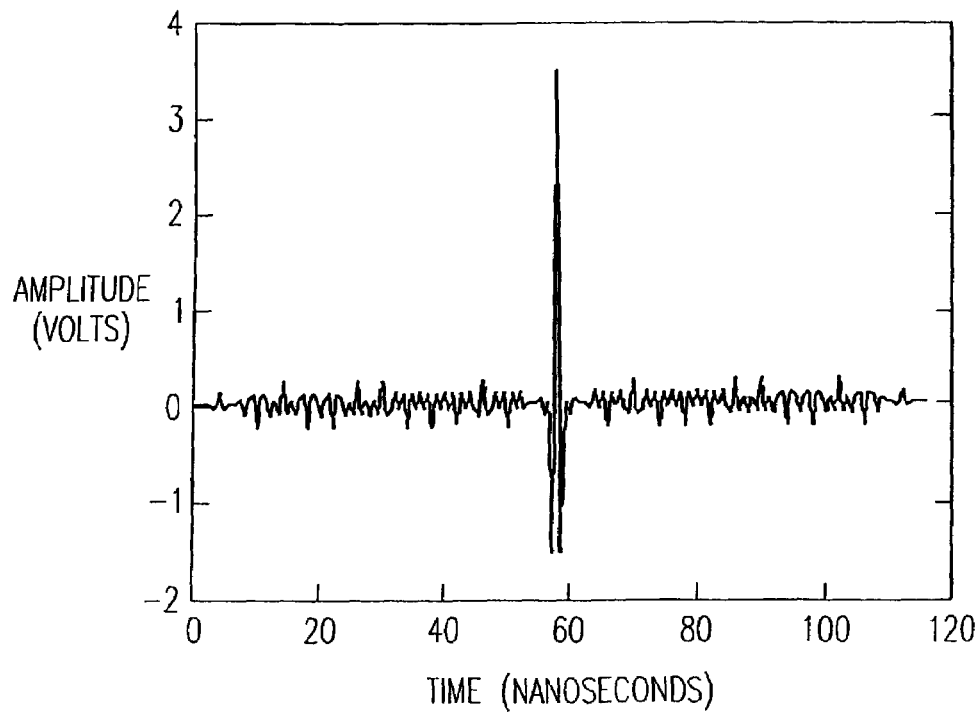
FIG. 42 is a amplitude versus time graph of a correlated signal of a transmit code showing that high spacial resolution allows operation to occur in severe multipath environments.
Figure 43:
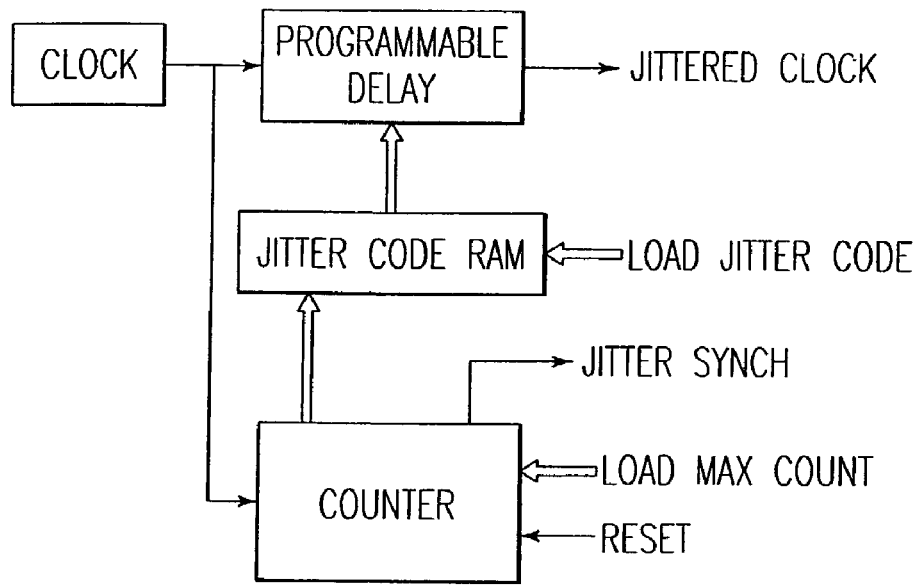
FIG. 43 is a circuit for generating a clock using a jitter code stored in memory according to the present invention.
Figure 44:
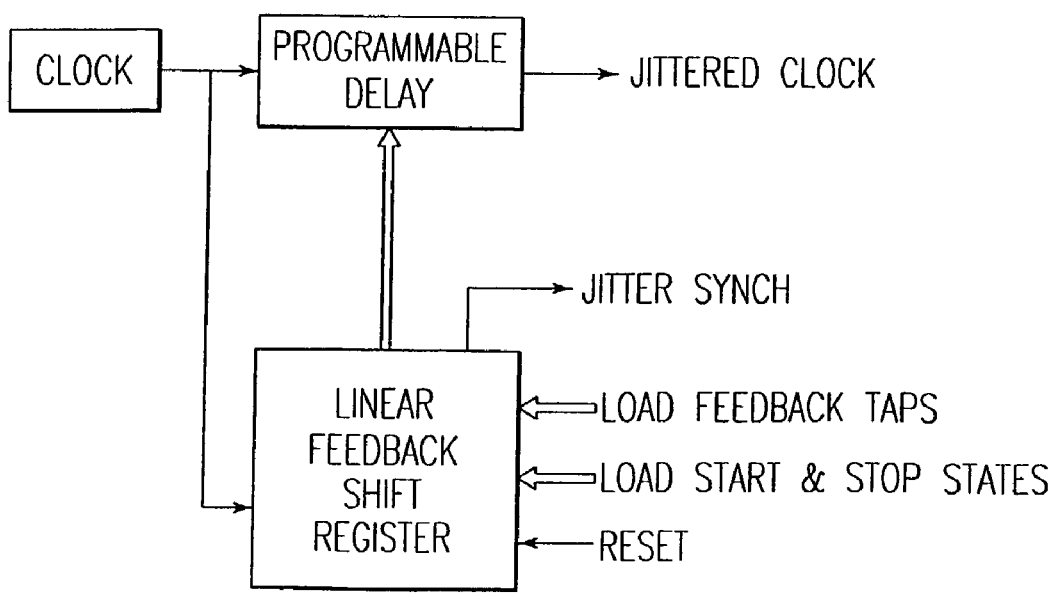
FIG. 44 shows an alternative embodiment to the circuit shown in FIG. 43.
Figure 45:
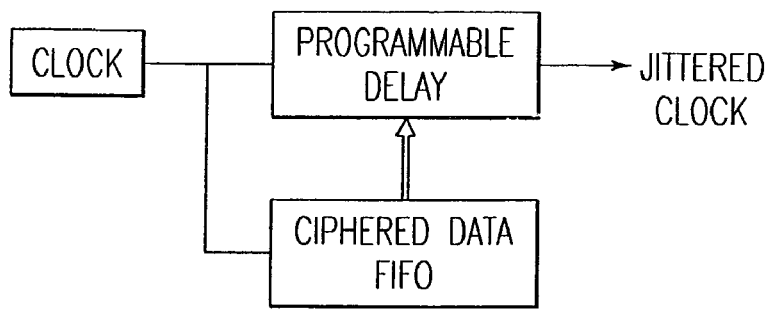
FIG. 45 is another alternative embodiment for jittering a clock using a ciphered data sequence.

FIG. 42 is a graph showing amplitude versus time for a signal output of a correlator of the receiver in FIG. 36. The correlator is formed in the control circuit 234. As can be seen, the correlation peak is very narrow in time, thus providing a significant indicator for when correlation has in fact been obtained.

FIGS. 22 through 24 describe different embodiments for providing a jittered clock signal previously discussed.

Figure 46:
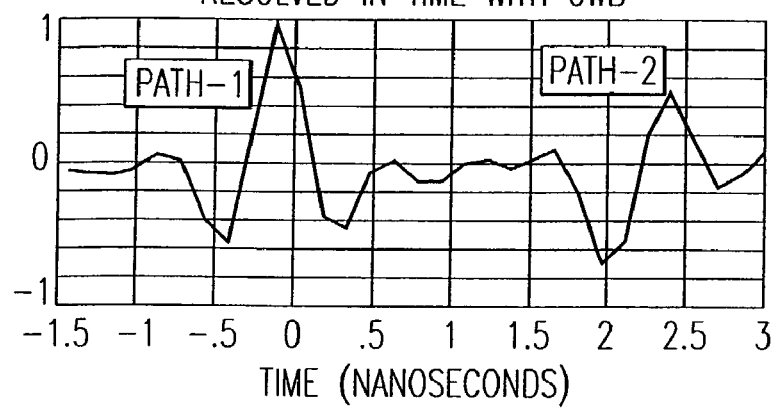
FIGS. 46 and 47 show time and frequency plots of a UWB signal according to the present invention and a conventional signal, respectively, when experiencing a multipath in a communications channel.

Multipath in most communication systems, narrowband or other types of ultra wide band communications systems causes a loss of performance generally. The problem with such systems is that there exists many resolvable path-links between the carrier and the receiver and when signal energy that traverses the different paths falls on top of one another for time-continuous signals, then the signals add out of phase sometimes. This can be seen for example in comparing FIGS. 46 and 47. FIG. 46 shows a time-domain signal with a pulse-by-pulse discrete time modulated signal for the present UWB system. As can be seen, a pulse received from one path (path-1), will have a different time of reception (and perhaps a different orientation) than that of path-2, seen to be an inverting path. Nonetheless, due to the time-modulated nature of the UWB wavelet signaling in the present invention, it is possible to resolve the two different paths and once resolved, it can be seen that the energy in the different paths correlate with one another and thus using a RAKE, it is possible to overlap the energies from the different paths so that the energy can be added coherently, thus improving signal reception performance.

Figure 47:
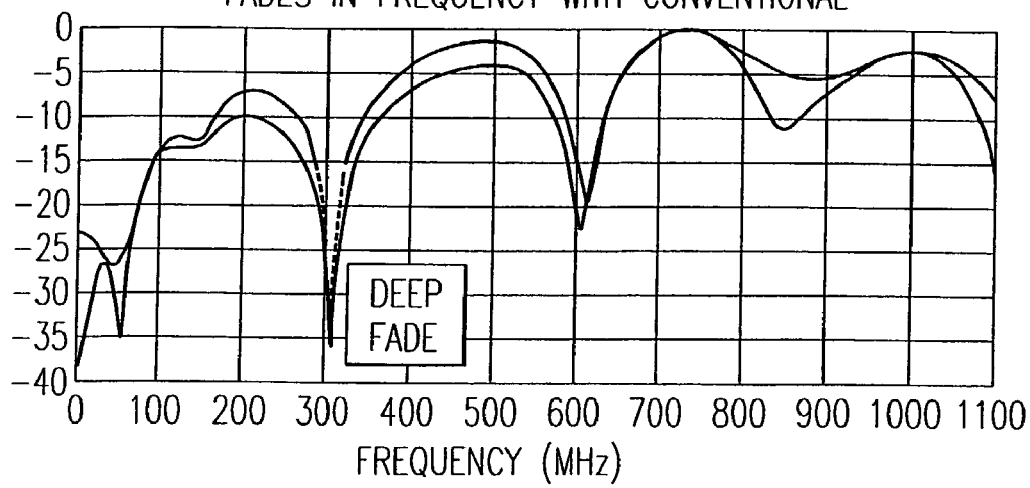

FIG. 47, on the other hand, shows a problem with conventional signaling schemes that use narrower band signals having time-continuous signals (more than one of a carrier). As can be seen, the two traces in FIG. 47 merely show different instances of typical fades experienced in a communication channel with a conventional narrow band system, where extremely deep fades in signal reception occur (such as near 300 MHZ). In such deep fades signal performances falls off dramatically. As a consequence, the probability of bit error rate increases dramatically and the quality of the channel degrades. For instance, in a cellular telephone type system during a signal fade the signal may be lost and the telephone conversation may be terminated as a result of this fade.

One technique for overcoming this problem is to increase the signal level of the conventional transmission system. However, this has a greater effect on adjacent channel interference and disturbing communications with other users in other systems. Thus, a feature of the present invention is that multipath is actually used to some benefit in an indoor environment such as an office environment where the multiple signal paths may be resolved and thus combined coherently with the direct communication path so that a magnification, or an addition, of the signal energy from the other multipaths may be used to actually enhance the received signal.

Figure 48:
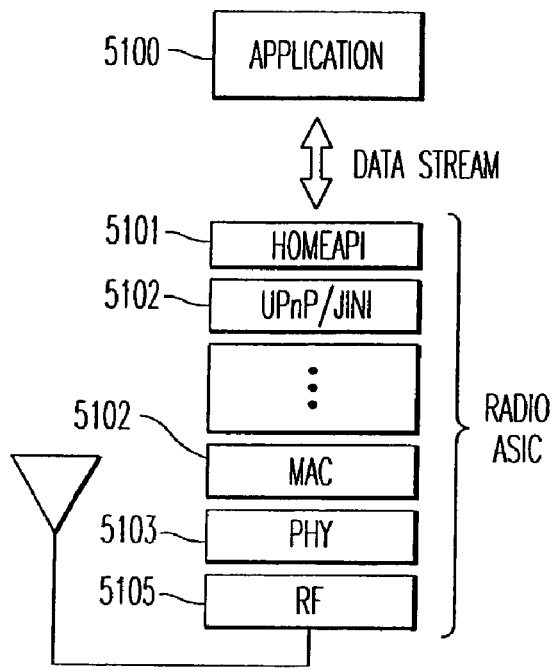
FIG. 48 shows a protocol stack using a radio ASIC according to the present invention for using an embodiment of the present invention for applications that generate data and communicate with external sources.

FIG. 48 shows how the transceiver functions of the present invention (the features shown in both the previously shown transmitter and receiver) may be incorporated into a "radio ASIC", where "ASIC" stands for Applications Specific Integrated Circuit. The radio ASIC performs a radio transport function for interfacing with different applications as part of a stacked protocol architecture. This radio ASIC performs the signal creation, transmission and reception functions as a communication service to applications that send data to it, or receive data from it—much like a wired IO port. For example, a particular application 5100, may be a video signal from a camera in an office environment and provides a data stream to the radio ASIC by way of a home application program interface (API) 5101. The home API 5101 would receive the data and format the data for use by the next component in the communication protocol stack, which in this instance would be Microsoft's Universal Plug 'n Play (UPnP) or Sun Microsystem's JINI application 5102. These particular features would format the data by way of the home API 5101 from the application 5100 so as to provide an input data stream for use by the radio ASIC. The data will then be serviced and formatted by a media access control (MAC) component as well as the physical layer for transforming the data into a signal antenna as shown.

In this vein, the radio ASIC may be viewed as the base of a protocol stack similar to an OSI protocol stack. In this way, the radio ASIC may serve as the basis for different physical layers to extend short range communications, but allow the radio to provide a wireless communication function for any one of a variety of appliances. Thus, the radio ASIC may be used to route information from appliances such as refrigerators, power meters or the like from households, or even digital appliances such as computers or wireless telephony systems in an office environment so that when appliances are to be distributed throughout the house, there is no need to interconnect the different appliances with wires.

Figure 49:
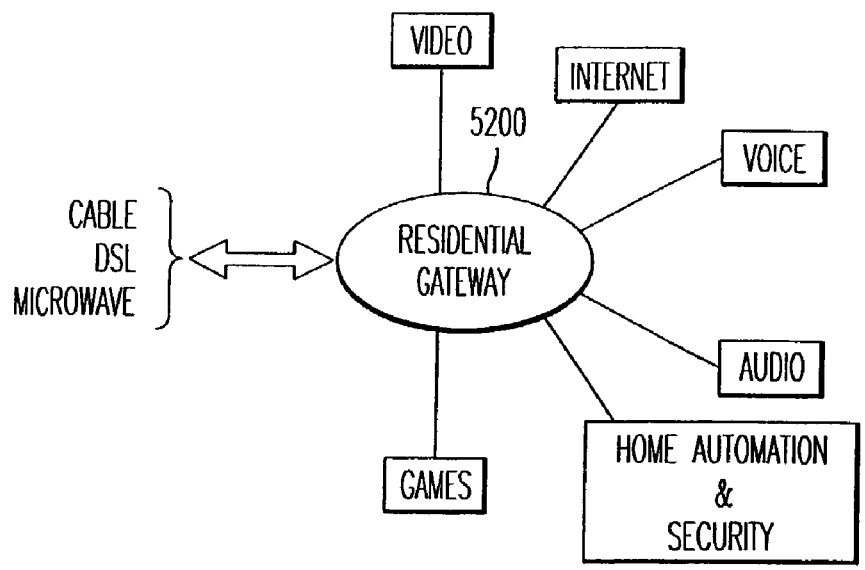
FIG. 49 shows a transceiver embodiment of the present invention being employed for facilitating communications between different home and office equipment for communications by way of gateway to an access provider.

An example of this wireless integration is shown in FIG. 49. FIG. 49 shows how different appliances, such as games, home automation and security functions, audio devices such as radios, whole house audio, voice applications such as telephony or teleconference, Internet applications or video applications such as DVD applications may be employed within the homes. Each of these different devices may include an interconnection either by way of wired technology or using a radio ASIC according to the present invention. A residential gateway 5200 also includes a transceiver that includes a radio ASIC according to the present invention that receives and fuses information according to the present invention and provides the concentrated data to external sources by way of cable connections, digital subscriber lines, or even wireless microwave links, for example. In this way, an inexpensive wireless infrastructure within a home or office is created to provide a mechanism for routing distributed data between appliances or externally.

Figure 52:
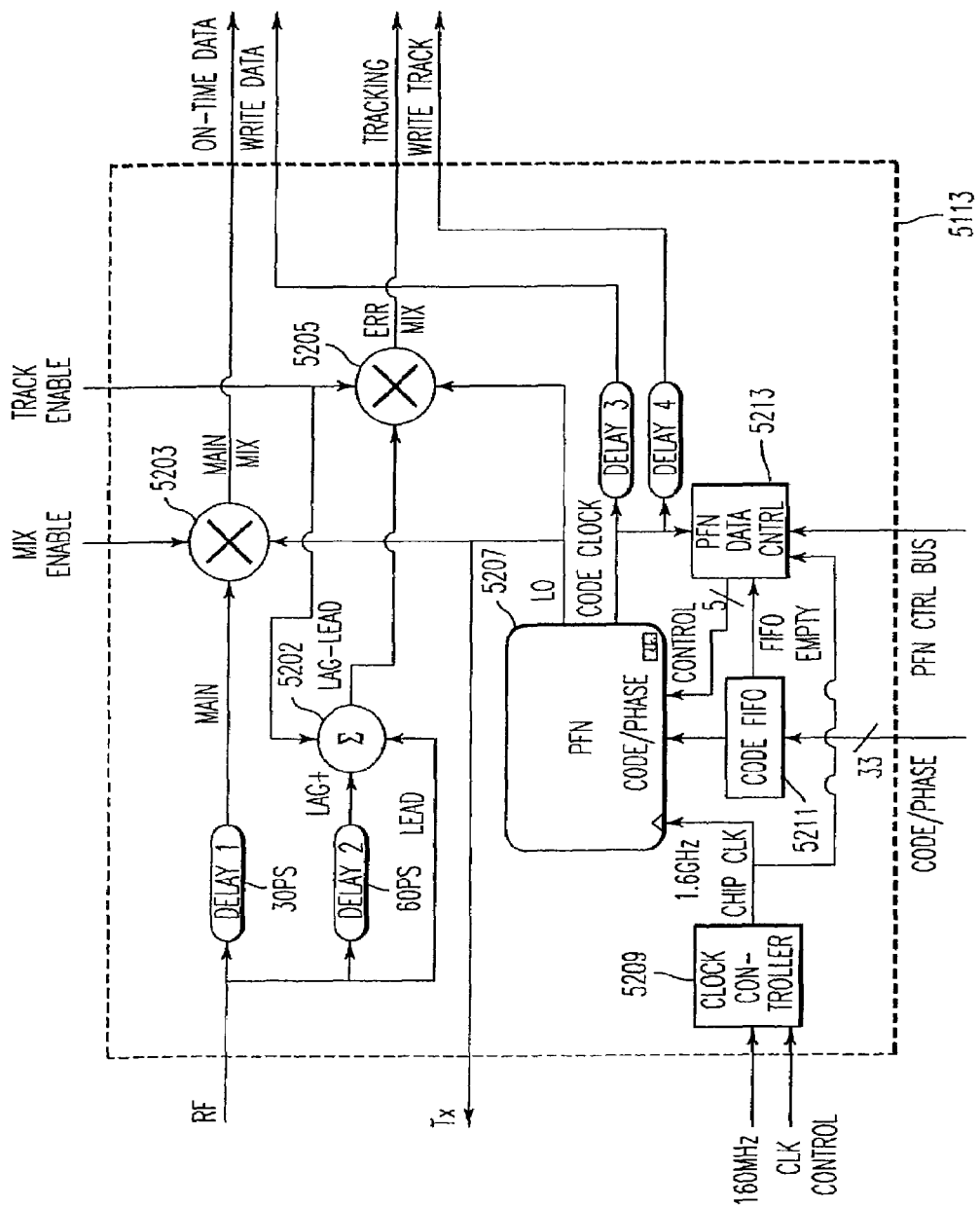
FIG. 52 is a block diagram showing an expanded view of one of the mixing tracking arms according to FIG. 51.

While FIG. 52 illustrated a home or office environment, the present invention, because it can be implemented on relatively small devices such as application specific integrated circuits, may also be included in vehicles, or on hand-held devices such as palm computing devices, for example.

The radio ASIC may also be used for ranging application sin addition to the imaging (for vehicle or hand-held applications). In ranging applications the radio may be used to determine the distance from the particular transceiver, by observing the rate and position of return of reflections from a particular object. As a consequence, the radio ASIC according to the present invention may be incorporated as part of a home security system so as to provide a ranging sensor for intruder detection and observation.

Furthermore, the radio ASIC may be incorporated into vehicles or in fixed structures that are approached by vehicles so as to trigger audible or visual alarms or take corrective action if it appears as though that a moving object becomes dangerously close to another object.

The radio ASIC may also be employed in test equipment for uses in antenna testing or even channel sounding for low inexpensive approaches for determining the adequateness of UWB in both antenna testing and in applicability for other communication scenarios. In communication systems, the radio ASIC may incorporate it into wireless security systems, wireless factory settings for process control, for example, wireless public branch exchanges for a variety of different telephone uses or wireless local loop applications so as to provide a telephony interface to the public switched telephone network, for example.

The use of the radio ASIC may also be employed as a wireless substitute for different high speed interfaces. For example, the radio ASIC may be used as an interface for a local area network such as a 100 BaseT, firewire (IEEE 1394), universal serial bus, or the like. Furthermore, the radio ASIC may provide a wireless link so as to facilitate communications between a digital video recorder, video camera, DVD, MP3 player, general purpose computer or the like. In this way, the radios provide a simple convenient mechanism for connecting to nearby devices as well as the Internet.

Furthermore, the present radio ASIC may be included as part of UWB WPAN that extends home phone network association (home PNA), home plug (which operates over power lines for 10 MBIT per second) and 10 or 100 BaseT Ethernet networks. The present inventors have recognized that limitations with conventional systems, such as computers, digital video recorders and the like, make it difficult and time consuming to convey information from the device that records the information to another device. Accordingly, the present radio ASIC may be used to convey information from digital still cameras (DSC), digital light projectors (DLP), game applications, voice-over IP, MP3 audio applications, streaming video, or personal digital assistance devices, for example, so as to facilitate file transfer.

Using an ASIC UWB radio according to the present invention enables high rate wide band personal area networks to extend local area networks. Furthermore, using WPAN topology enables the use of free multimedia information sources so that additional subscriber fees are not required. Thus the present radio ASIC can serve as an alternative to subscription-based services such as wireless cellular and the like. Conventional interfaces may enable the radio ASIC to provide a facility for digital camera to kiosk data transfer, camera to camera transfer, camera to printer data transfer, camera to PC data transfer or even camera to set top box transfer for later viewing on a television monitor or other display device.

The present inventors also recognized that the transceiver, employing a radio ASIC according to the present invention, need not only work with a radio system according to the present invention, but also in multiple modes of operation. For example, one embodiment of the present invention is to include a receiver mechanism for receiving signals transmitted according to the "blue tooth" specification. See, e.g., "Specification of the Blue Tooth System", v. 1.0B, Dec. 1, 1999, Core Specification—vol. 1, Profiles Specification—vol. 2, the entire contents of which being incorporated herein by reference. To this end, the present invention incorporates transceivers that operate not only in a UWB mode of operation, but also in other wireless communication modes so as to provide a "universal" radio operation.

Other embodiments of the present invention include embedding a transceiver, or radio ASIC in a mobile computing device, such as a wireless telephone, personal digital assistant, or palmtop computer. In this way, individuals using the mobile computing device may quickly and easily convey information stored in the mobile computer device to another transceiver (or just a receiver). For example, the mobile communications device could provide a wireless access mechanism, a calender correlation mechanism (calender contents of for one user being sent to the other user, perhaps for the purpose of identifying a mutually agreeable date or time to conduct some event), map distribution mechanism (a convenient way for a individual to explain to another individual how to travel to a predetermined destination, such as the person's office or home), personal profile distribution mechanism (similar to conveying an electronic business card information), or the like.

In one configuration, an office environment is established with a wired network that includes, among other things, a wireless transceiver that cooperates with and receives information sent by UWB bi-phase pulses according to the present invention. In this way, data gathering radios may be used as part of a personal area network (PAN). When communicating information from one of the radio ASICs, the network with different data gathering transceivers distributed around the room, or building, will rebroadcast the energy for reception by other devices.

Furthermore, this communication network may interconnect adjacent buildings, or the respective networks are interconnected by a wireline, perhaps a FDDI network, with different broadcast transceivers in the rooms. For example, suppose one room is equipped with at least one wireless transceiver that receives wireless transmissions from portable radio ASICs within that particular room or building, and sends data received by the ASIC radio through the wire line to the adjacent office space, perhaps across town, or even in a different state for example. When the data is received by the transceiver in the other location, that transceiver rebroadcasts the energy using ultra wide band transmission according to the present invention for reception by other devices at that rmote location. In this way, wireless "portal areas" are provided for communicating information from one location to another.

Alternatively, in publicly located areas such as airports, for example, rather than having specific telephone bays, for example, where individuals must use dedicated telephone systems provided by the airport's facilities, one or a network of radio transceivers may be equipped in the airport for receiving and distributing information to users who are using their own personal communication devices that transmit and receive bi-phase communication information according to the present invention. In this way, the present invention facilitates the use of UWB communications so as to avoid individuals having to go to a particular location to communicate, but rather be in the same proximate area (even with obstructions therebetween), so as to remain in communications with whoever the party is to whom the communications are directed.

One of the advantages with using UWB bi-phase communications according to the present invention is that the number of multiple access users is far greater than that of conventional cellular technology or other multiple access techniques wherein a particular radio frequency spectrum is shared. For example, UWB codes available for the present invention are more than 100 times longer than conventional split spectrum codes. Thus enables millions of unique addresses to be assigned to different individuals within a relatively small space. As a consequence, all these millions of unique addresses may be used simultaneously rather than a round-robin approach or limited access according to spread spectrum systems.

Another feature of the bi-phase modulation scheme according to the present invention is that it adds additional security that is not the subject of eavesdropping due to the much larger code spaces would be required for searching and also that the signals appear to be both smooth in space and in time. Moreover, there are no edges to search for.

Figure 50:
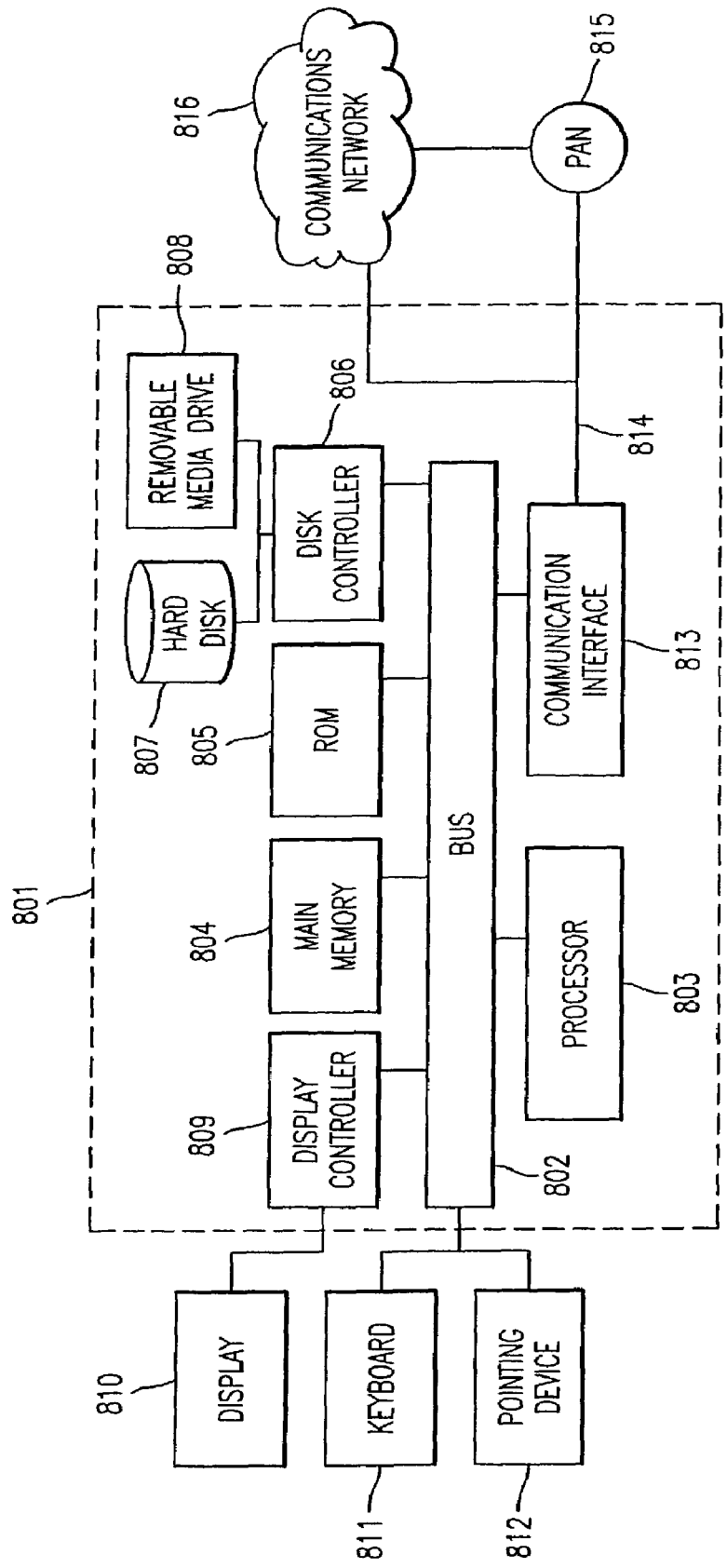
FIG. 50 is a block diagram of a system-level controller according to the invention.

FIG. 50 illustrates a processor system 801 upon which a controller and application interface embodiment of the present invention may be implemented. The processor system 801 includes a bus 802 or other communication mechanism for communicating information, and a processor 803 coupled with the bus 802 for processing the information. The processor system 801 also includes a main memory 804, such as a random access memory (RAM) or other dynamic storage device (e.g., dynamic RAM (DRAM), static RAM (SRAM), and synchronous DRAM (SDRAM)), coupled to the bus 802 for storing information and instructions to be executed by processor 803. In addition, the main memory 804 may be used for storing temporary variables or other intermediate information during the execution of instructions by the processor 803. The processor system 801 further includes a read only memory (ROM) 805 or other static storage device (e.g., programmable ROM (PROM), erasable PROM (EPROM), and electrically erasable PROM (EEPROM)) coupled to the bus 802 for storing static information and instructions for the processor 803.

The processor system 801 also includes a disk controller 806 coupled to the bus 802 to control one or more storage devices for storing information and instructions, such as a magnetic hard disk 807, and a removable media drive 808 (e.g., floppy disk drive, read-only compact disc drive, read/write compact disc drive, compact disc jukebox, tape drive, and removable magneto-optical drive). The storage devices may be added to the processor system 801 using an appropriate device interface (e.g., small computer system interface (SCSI), integrated device electronics (IDE), enhanced-IDE (E-IDE), direct memory access (DMA), or ultra-DMA).

The processor system 801 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The processor system 801 may also include a display controller 809 coupled to the bus 802 to control a display 810, such as a cathode ray tube (CRT), LCD display or the like for displaying information to a computer user. The computer system includes input devices, such as a keyboard 811 and a pointing device 812, for interacting with a computer user and providing information to the processor 803. The pointing device 812, for example, may be a mouse, a trackball, or a pointing stick for communicating direction information and command selections to the processor 803 and for controlling cursor movement on the display 810. In addition, a printer may provide printed listings of the data structures/information stored and/or generated by the processor system 801.

The processor system 801 performs a portion or all of the processing steps of the invention in response to the processor 803 executing one or more sequences of one or more instructions contained in a memory, such as the main memory 804. Such instructions may be read into the main memory 804 from another computer readable medium, such as a hard disk 807 or a removable media drive 808. One or more processors in a multi-processing arrangement may also be employed to execute the sequences of instructions contained in main memory 804. In alternative embodiments, hard-wired circuitry may be used in place of or in combination with software instructions. Thus, embodiments are not limited to any specific combination of hardware circuitry and software.

As stated above, the processor system 801 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the processor system 801, for driving a device or devices for implementing the invention, and for enabling the processor system 801 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 803 for execution. A computer readable medium may take many forms, including but not limited to, non-volatile media, volatile media, and transmission media. Non-volatile media includes, for example, optical, magnetic disks, and magneto-optical disks, such as the hard disk 807 or the removable media drive 808. Volatile media includes dynamic memory, such as the main memory 804. Transmission media includes coaxial cables, copper wire and fiber optics, including the wires that make up the bus 802. Transmission media also may also take the form of acoustic or light waves, such as those generated during radio wave and infrared data communications.

Various forms of computer readable media may be involved in carrying out one or more sequences of one or more instructions to processor 803 for execution. For example, the instructions may initially be carried on a magnetic disk of a remote computer. The remote computer can load the instructions for implementing all or a portion of the present invention remotely into a dynamic memory and send the instructions over a telephone line using a modem (or other communication channel, wired or wireless). A modem local to the processor system 801 may receive the data on the telephone line and use an infrared transmitter to convert the data to an infrared signal. An infrared detector coupled to the bus 802 can receive the data carried in the infrared signal and place the data on the bus 802. The bus 802 carries the data to the main memory 804, from which the processor 803 retrieves and executes the instructions. The instructions received by the main memory 804 may optionally be stored on storage device 807 or 808 either before or after execution by processor 803.

The processor system 801 also includes a communication interface 813 coupled to the bus 802. The communication interface 813 provides a two-way UWB data communication coupling to a network link 814 that is connected to, for example, a personal area network (PAN) 815, or to another communications network 816 such as the Internet. For example, the UWB communication interface 813 may be a network interface card to attach to any packet switched UWB-enabled PAN. As another example, the communication interface 813 may be an UWB-accessible asymmetrical digital subscriber line (ADSL) card, an integrated services digital network (ISDN) card or a modem to provide a data communication connection to a corresponding type of communications line.

The network link 814 typically provides data communication through one or more networks to other data devices. For example, the network link 814 may provide an RF connection to another computer through a personal area network 815 (e.g., a PAN) or through equipment operated by a service provider, which provides communication services through a communications network 816. In preferred embodiments, the local network 814 and the communications network 816 preferably use electrical, electromagnetic, or optical signals that carry digital data streams. The signals through the various networks and the signals on the network link 814 and through the communication interface 813, which carry the digital data to and from the processor system 801, are exemplary forms of carrier waves transporting the information. The processor system 801 can transmit and receive data, including program code, through the network(s) 815 and 816, the network link 814 and the communication interface 813.

Figure 51:
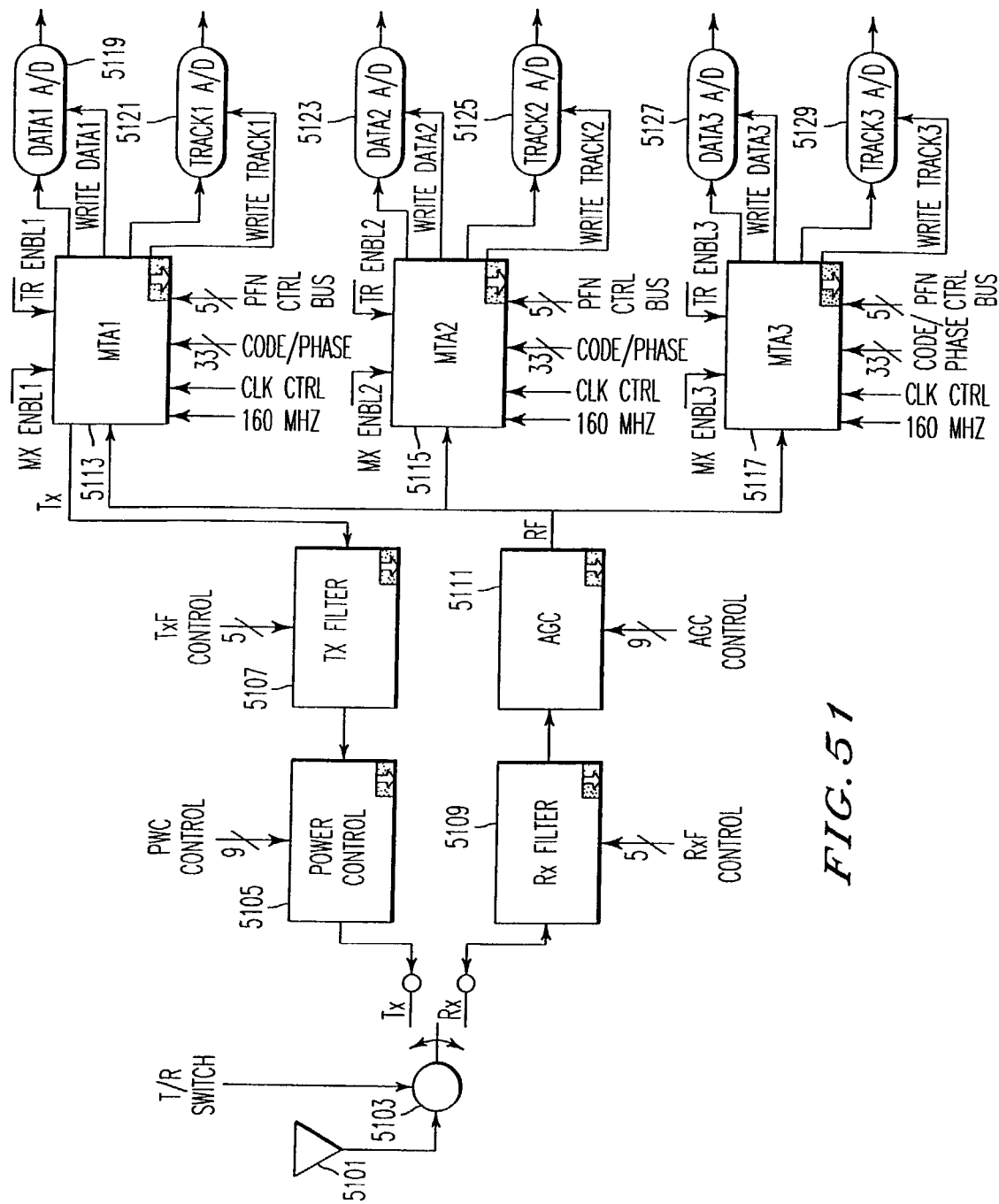
FIG. 51 is a block diagram of a transceiver implementation according to the present invention and includes a plurality of mixing tracking arms (MTA) used to take advantage of multipath effects on the receive portion of the transceiver.

FIG. 51 is a block diagram of a transceiver embodiment according to the present invention. The transceiver employs an antenna 5101 for transmitting and receiving UWB signals according to the present invention. The antenna 5101 couples to a transmit/receive (T/R) switch 5103. When transmitting the T/R switch 5103 is controlled through a T/R switch control signal to connect to a transmit arm of the transceiver (the upper path as shown in FIG. 51). When receiving the T/R switch 5103 is controlled by the T/R switch line to couple energy from the antenna 5101 to the receive signal path, the first component of which is the Rx filter 5109.

In the transmit mode of operation, the first mixing tracking arm 5113 (MTA1) is enabled to operate in transmit mode. During a transmit mode of operation, the waveform to be transmitted is passed from a transmit line to a transmit filter 5107. The transmit filter 5107 is an adaptive filter that adjusts the output signal spectral energy to be transmitted. The output of the transmit filter 5107 is passed to a power control device 5105 that receives control signals from the remote controller by way of control line UWB control as shown in FIG. 51. The power control device 5105 adjusts the transmit power of the total energy being transmitted. In a typical mode of operation, the transceiver shown in FIG. 51 will operate in a power spectral density regulated environment. Accordingly, the power control device 5105 will reduce the output power such that the power spectral density at any particular part within the band complies with the power spectral density requirements. The output of the power control device 5101 is then passed through the T/R switch 5103 and subsequently radiated by way of antenna 5101 to create a wireless UWB waveform according to the present invention.

During the receive mode of operation, energy from the antenna 5101 is passed through the T/R switch 5103 to a receive filter 5109. The receive filter 5109 is adaptive in that it reduces the effects of narrow band interference (referred to previously as "RFI". Once filtered, the received signal is passed from the received filter 5109 to an automatic gain control (AGC) circuit 5111 which adjusts an overall level of the signal energy before being subsequently processed. The control operations for the RX filter 5109 and AGC operation are provided by way of "RxF control" and "AGC control" signal lines as shown. The output of the AGC device 5111 is divided and distributed to three different mixing tracking arms, 5113, 5115, and 5117. Each of the three mixing tracking arms performs similar operations and may be independently controllable so that the different mixing tracking arms are able to detect and receive different multipath components of the receive signal. Accordingly, each mixing tracking arm 5113, 5115 and 5117 includes the following components: A 160 MHz clock is applied to the respective mixing tracking arm 5113. Other reference signals are provided based on operation. A clock control signal is also input to the mixing tracking arm, as well as a code/phase control signal shown to a be a digital control signal and a pulse forming network control bus having a predetermined number of control lines. The mixing tracking arm correlates the received signal energy with a local version of the signal energy for subsequent detection. When operated in a receive mode, the mixing enable signal configures the mixing tracking arm to operate in a receive mode of operation. When operating in a receive mode of operation, an analog output signal is provided to an analog-to-digital converter 5119 and a tracking signal is provided to a tracking analog-to-digital converter 5121 as shown. Similar operations are performed with the analog-to-digital converters 5123, 5125, 5127, and 5129 for mixing tracking arms 5115 and 5117.

FIG. 52 shows a block diagram of mixing tracking arm 5113 of FIG. 51. The block diagram in FIG. 52 is most easily understood by referring to the corresponding signal waveform shown in FIGS. 53A–53D, FIGS. 54A–54D, FIGS. 55A–55C, FIG. 56 and FIG. 57. Referring to FIG. 52, a pulse forming network 5207 produces UWB bi-phase pulses according to the present invention, under control of a clock controller 5209, and particular code provided by way of code FIFO 5211 and PFN data controller 5213, as shown. The clock controller 5209 receives an input signal reference at 160 MHz and a clock control signal. Typically an output from the clock controller 5209 is a chip clock operating at 1.6 GHz that is applied to both the pulse forming network

5207 and the pulse forming network data controller 5213. A code/phase control signal is applied to the code FIFO, which is unique for a particular user in which reception is attempted. The code FIFO simply provides data to the pulse forming network 5207 through a set of N (shown as 33) signal lines. The pulse forming control network 5213 is provided with a control input that also determines what subset of code is ultimately output from the pulse forming network 5207. A code clock produced by the pulse forming network 5207 is delayed by a predetermined amount and provided as output signals write data and write track as shown. A series of pulses provided by the pulse forming network 5207 are provided to mixers 5203 and 5205 as will be discussed below.

The incoming RF signal, as shown in FIG. 52, is divided into three separate signals, "lead", "lag", and "main". The lead signal is applied to a negative input of summer 5202. A "main" signal is delayed through delay 1 by 30 picoseconds (in a preferred embodiment, although other delays may be employed as well). The third input is delayed by delay 2 by 60 picoseconds (although the input may also be delayed by a varying amount) to form the "lag" signal, which is applied to the positive input of the summer 5202. The summer 5202 is enabled by a track enable signal as shown, as is a tracking mixer 5205. A mixer enable control signal enables the operation of the mixer 5203. Accordingly, the lead signal is 30 picoseconds ahead of the main signal and a lag signal is 30 picoseconds behind the main signal as shown in FIGS. 53A-55C. An output of the summer 5202 is the aggregation of the lag and the lead signals, and is referred to as "lag-lead".

Figure 54A:
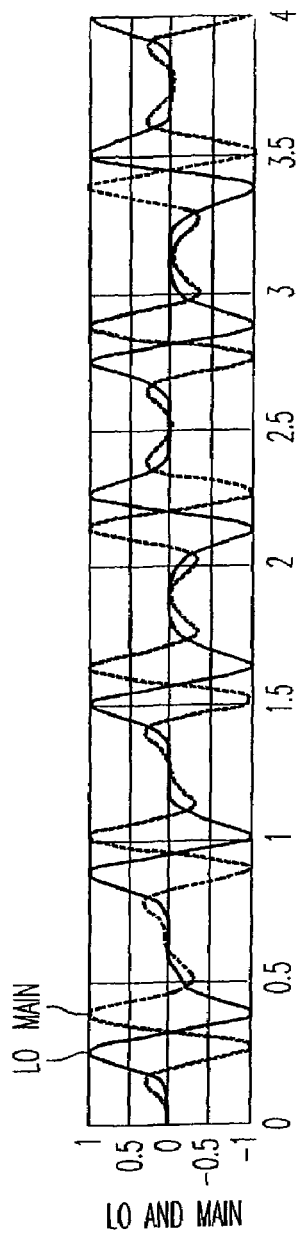
FIGS. 54A-54D show additional time-based waveforms according to the mixing tracking arm shown in FIG. 52.
Figure 54B:
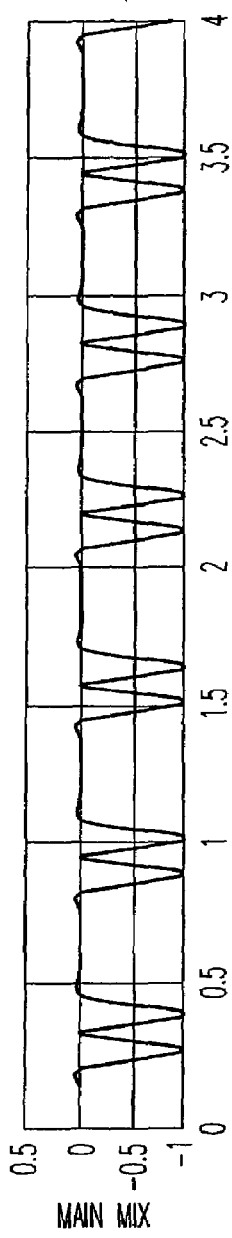
Figure 54C:
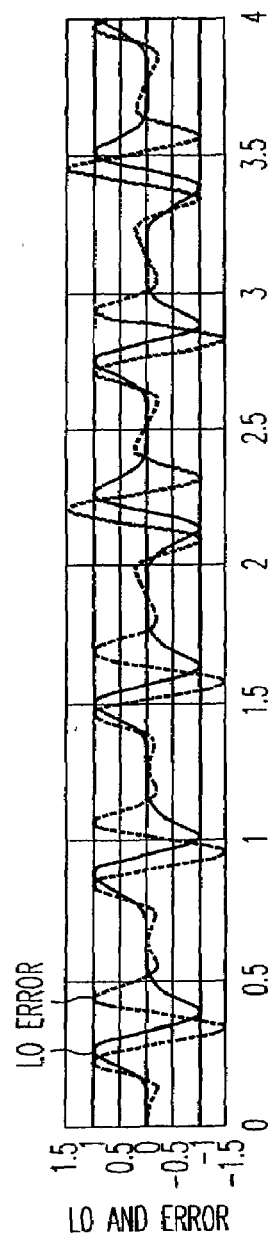
Figure 54D:
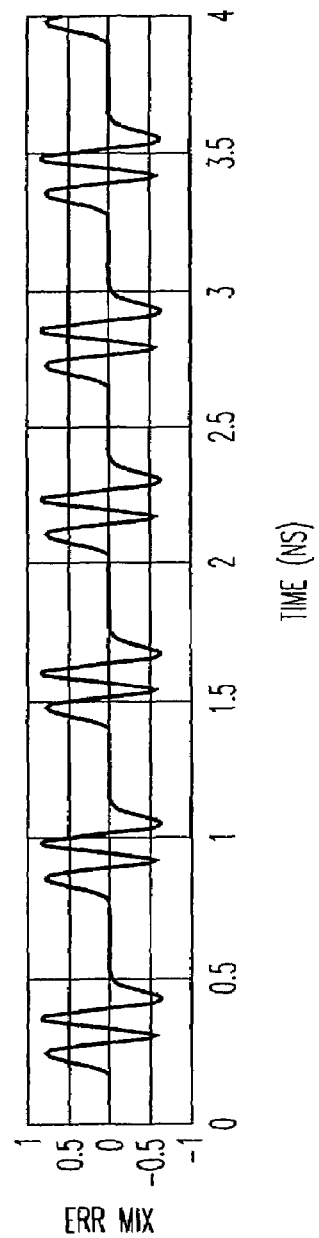

FIGS. 54A-54D show signals after being passed through mixers and processed by the LO waveform. As shown in FIG. 54A, the LO waveform is perhaps shifted in time with the main signal. Accordingly, the output mixer 5203, as shown in FIG. 54B, shows that an appreciable amount of energy is collected below zero volts. Similarly, the LO signal and error signal (lag-lead) are shown in FIG. 54C and are applied to the mixer 5205. The output of the mixer 5205 provides a signal entitled "ERR-MIX", which is shown in FIG. 54D. The output of the mixer 5203 is provided in an output data signal referred to as "ON-DATA". The output of the tracking mixer 5205 is a signal referred to as "tracking".

Figure 55A:
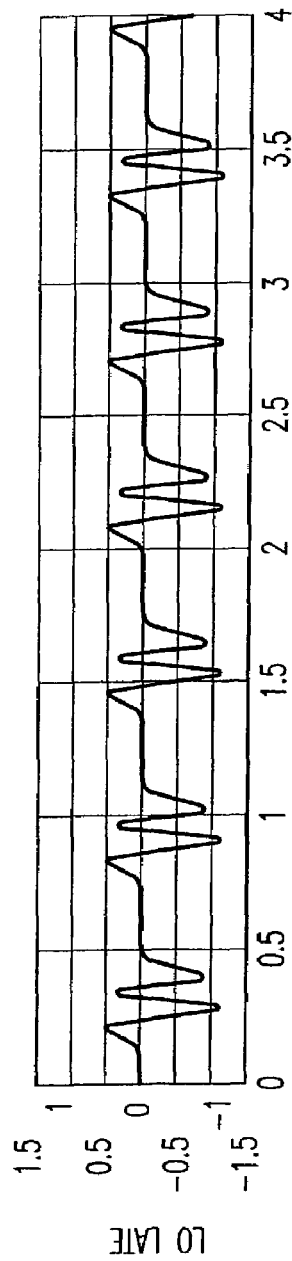
FIGS. 55A-55C show additional waveforms according to the mixing tracking arm of FIG. 52.
Figure 55B:
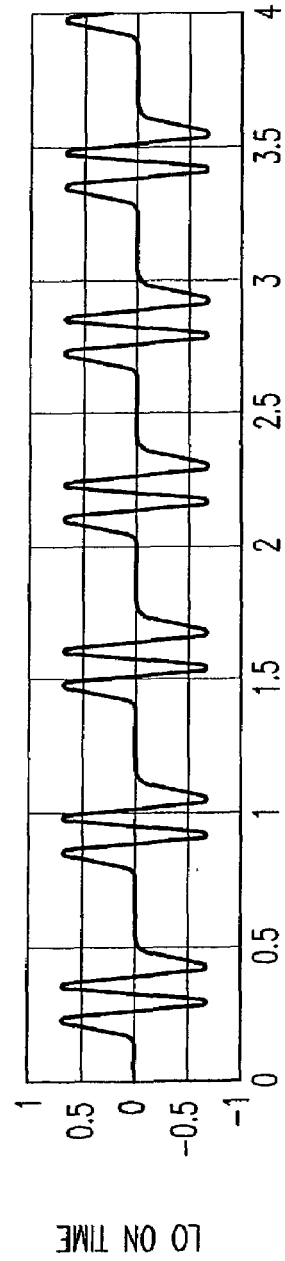
Figure 55C:
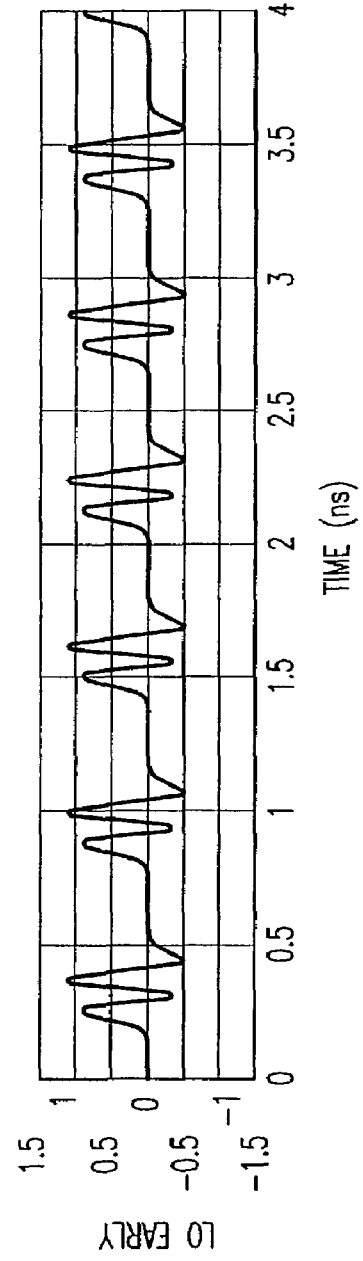

FIG. 55A shows an event where, with a 130 picosecond peak to peak pulse width and a local oscillator signal that is too late, the energy is not equally distributed around zero volts, but rather has a negative DC bias term. FIG. 55B shows an event where the local oscillator is directly in time with the RF signal so that the total energy integrates to zero. FIG. 55C shows an event where the local oscillator is early and there is a DC shift towards positive voltage.

Figure 56:
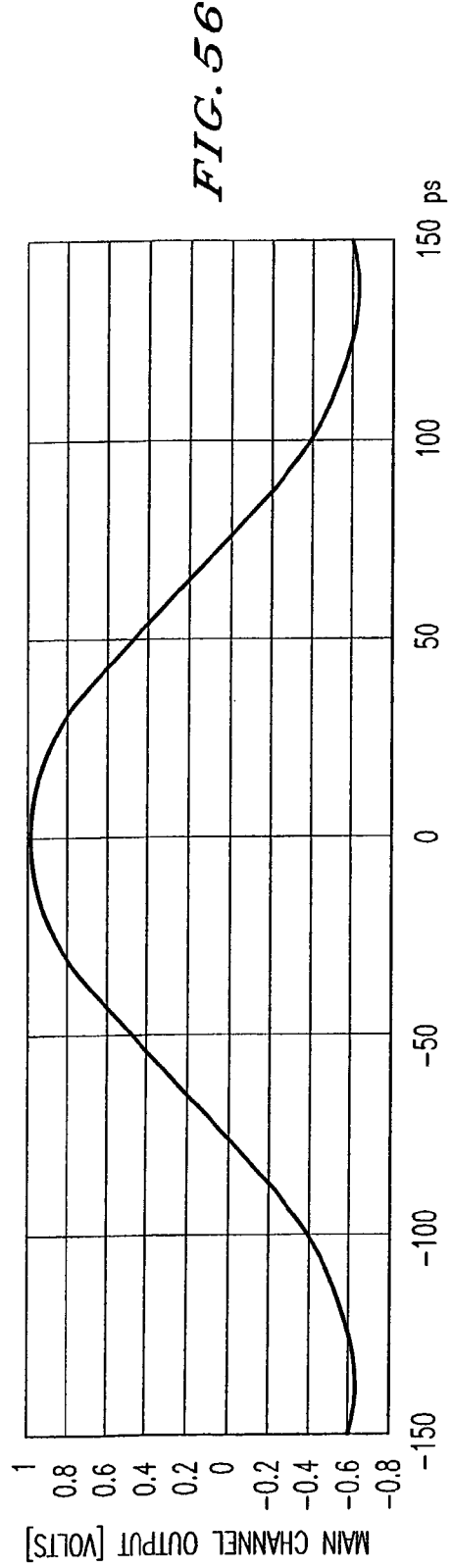
FIG. 56 shows a mixer output when a tracking area is high, low or correct.

FIG. 56 shows the mixer output when the tracking area is high, low or correct. The mixer output is combined with the alignment error in picoseconds shown in FIG. 57. When there is no alignment error (showing that the error channel output is zero volts), then a maximum main channel output is obtained. However, when the alignment error deviates from zero picoseconds, the main channel output falls from the maximum available detection voltage. Thus, the communication system performance is sub-optimal since the LO signal is not precisely aligned with the main RF channel.

Figure 57:
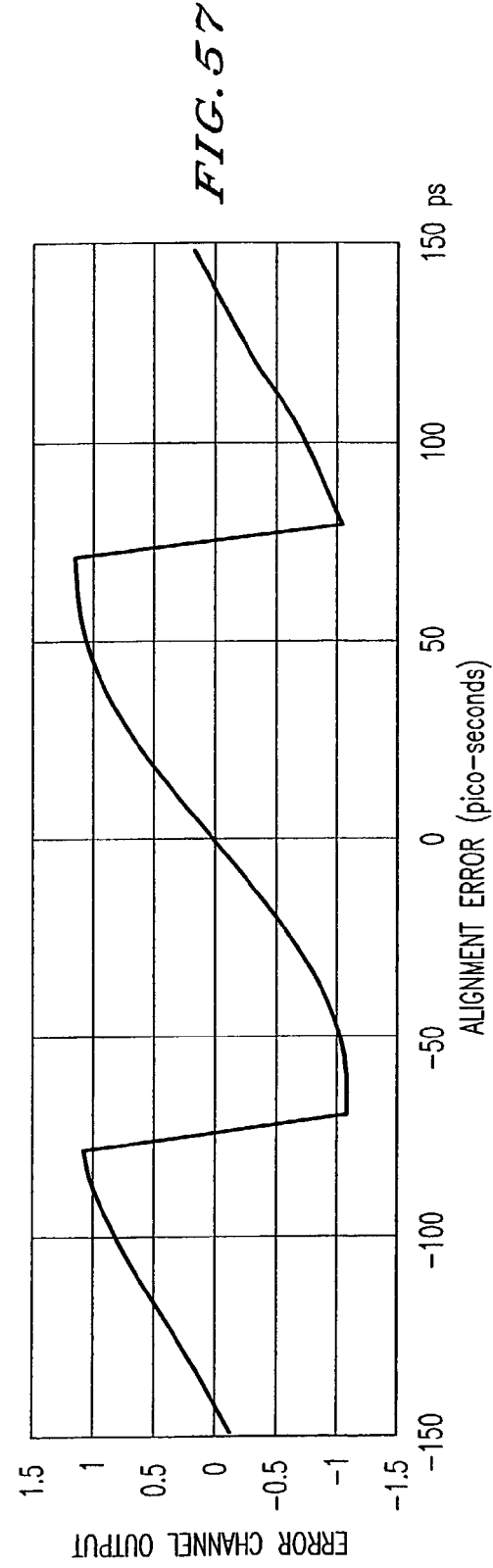
FIG. 57 is a plot of a post-integrator output versus tracking error according to the present invention.

FIG. 57 shows that if an alignment error is observed either above or below zero volts, then the PFN data controller 5213 will assert control, alternatively, by way of control line "code/phase" so that the LO output of PFN 5207 (FIG. 52) may be steered toward optimum protection where the LO is precisely aligned with the main channel.

FIG. 58 is a block diagram showing a transmit architecture according to the present invention that produces piece-wise continuous UWB bi-phase transmit waveform. A code generation mechanism 5800 produces a code unique to a particular user and passes the code with data to a pulse forming network 5801. The pulse forming network 5801 produces piece-wise continuous bi-phase UWB signals according to the present invention, using semiconductor technology. The output is then amplified through amplifier 5803 and transmitted on antenna 5804. A common clock is input to both the code generation circuit 5800 and PFN 5801 so both devices operate in synchronization.

As shown in FIG. 59, the uppermost waveform, a digital logic signal, is provided showing a code 110 that is input to the PFN 5801. The PFN 5801 is constructed on an integrated circuit and may be in the form of ECL, CMOS, bi-CMOS, or even silicon-germanium. The PFN 5801 produces a pulse for each data signal. The pulse however is created using digital logic "edges" 5910-5912, as shown. The lower two traces entitled "ECL" and modern CMOS also show inherent rise times with the semiconductor circuits used to produces these waveforms. In the case of ECL, a 330 ps rising time is observed (edge) and a 330 ps falling time is observed as well. The present matters are observed using modern CMOS devices in which rise and fall times of 100 ps (or times certainly less than 200 ps) are believed to be possible.

The present inventors have recognized that by using advancements in technology, the rise and fall times of present, as well as next generation, components will continue to be shortened. Consequently, the use of edges of semiconductor logic circuits to piece-wise produce a UWB signal according to the present invention, will tend to improve the bandwidth available for such communications systems as the semiconductor devices continue to improve in time. This is shown in FIG. 60, which has two spectral graphs that correspond to the slower ECL waveform of FIG. 59 and the more modern CMOS logic edge as shown in FIG. 59. The spectrum that corresponds to the slower ECL logic has a certain predetermined bandwidth $B_1$, while the faster modern CMOS technology has three times the bandwidth. Moreover, by using discrete edges like those shown in FIG. 59 (the lower two traces) to construct a piece-wise continuous waveform, the performance for a radio that implements the present invention will tend to increase in time according to Gordon Moore's law. Gordon Moore's law states that integrated circuits tend to get two times faster at half the size every 18 months. Accordingly, by using such integrated circuits in the present invention to make the waveforms, it is thus possible that radio implementations according to the present inventions will also be two times faster at half the size every 18 months. Unlike conventional radios that improve performance as the log of the processing power, the present invention improves performance in a linear fashion with IC performance improvements.

The mechanisms and processes set forth in the present description may be implemented using a conventional general purpose microprocessor programmed according to the teachings in the present specification, as will be appreciated to those skilled in the relevant art(s). Appropriate software coding can readily be prepared by skilled programmers based on the teachings of the present disclosure, as will also be apparent to those skilled in the relevant art(s).

The present invention thus also includes a computer-based product which may be hosted on a storage medium and include instructions which can be used to program a computer to perform a process in accordance with the present invention. This storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

What is claimed is:

1. An apparatus for transmitting data comprising:
   wavelet generating means for generating a wavelet having predefined time domain and frequency domain characteristics;
   code generating means, coupled to said wavelet generating means, for generating a group of wavelets of varying polarities in accordance with a predefined code; and
   data encoding means for modifying a polarity of said group of wavelets, as a whole, as a function of a bit of said data to be transmitted.

2. The apparatus according to claim 1 wherein said wavelet generating means comprises means for generating the wavelet which includes a Gaussian monocycle.

3. The apparatus according to claim 2 wherein said wavelet has a pulse width in a range from about 100 to about 2000 picoseconds.

4. The apparatus according to claim 3 wherein said wavelet generating means is adapted for generating wavelets in a range from about 10 gigahertz to about 500 megahertz.

5. The apparatus according to claim 2 wherein said wavelet has a pulse width of 1000 picoseconds and frequency of 1 gigahertz.

6. The apparatus according to claim 1, wherein the data to be transmitted is scrambled so as to be uncorrelated.

7. The apparatus according to claim 1, further comprising a whitening encoder for scrambling the data to be transmitted, and providing scrambled data to the data encoding means.

8. The apparatus according to claim 1,
   wherein the group of wavelets are made of N consecutive wavelets generated by the wavelet generating means, N being an integer greater than 0, and
   wherein the data encoding means modifies the polarities of the N consecutive wavelets as a function of a given data bit.

9. An apparatus fix transmitting data comprising:
   a wavelet generator for producing a plurality of wavelets, each of the plurality of wavelets having predefined time domain and frequency domain characteristics;
   a code generator for modifying the polarities of N consecutive wavelets individually in accordance with a predefined length-N code; and
   a data encoder for modifying polarities of the N consecutive wavelets as a group as a function of one bit of the data to be transmitted,
   wherein N is an integer greater than zero.

10. The apparatus according to claim 9, wherein each of the plurality of wavelets includes a Gaussian monocycle.

11. The apparatus according to claim 10, wherein each of the plurality of wavelets has a pulse width in a range from about 100 to about 2000 picoseconds.

12. The apparatus according to claim 10, wherein the wavelet generator produces the plurality of wavelets in a range from about 10 gigahertz to about 500 megahertz in frequency.

13. The apparatus according to claim 9, wherein the data to be transmitted is scrambled so as to be uncorrelated.

14. The apparatus according to claim 9, further comprising a whitening encoder for scrambling the data to be transmitted, and providing scrambled data to the data encoder.

15. The apparatus according to claim 9, wherein the data encoder modifies the polarity of the length-N code.

16. A method for transmitting data comprising:
   generating a plurality of wavelets, each having predefined time domain and frequency domain characteristics;
   modifying polarities of N consecutive wavelets individually in accordance with a predefined length-N code; and
   modifying the polarities of the N consecutive wavelets as a group as a function of one bit of the data to be transmitted,
   wherein N is an integer greater than zero.

17. A method according to claim 16, wherein the data to be transmitted is scrambled so as to be uncorrelated.

18. A method according to claim 16, wherein the one bit of the data to be transmitted modifies the polarity of the length-N code.

* * * * *

UNITED STATES PATENT AND TRADEMARK OFFICE
CERTIFICATE OF CORRECTION

| | | |
|---|---|---|
| PATENT NO. | : 7,280,607 B2 | Page 1 of 1 |
| APPLICATION NO. | : 10/305109 | |
| DATED | : October 9, 2007 | |
| INVENTOR(S) | : John W. McCorkle | |

It is certified that error appears in the above-identified patent and that said Letters Patent is hereby corrected as shown below:

In Column 50, Line 1, Claim No. 9:
    Change "An apparatus fix transmitting data comprising:" to --An apparatus for transmitting data comprising:--

Signed and Sealed this

Twenty-second Day of July, 2008

JON W. DUDAS
*Director of the United States Patent and Trademark Office*